United States Patent
Jenkins

(10) Patent No.: US 9,892,546 B2
(45) Date of Patent: Feb. 13, 2018

(54) PURSUIT PATH CAMERA MODEL METHOD AND SYSTEM

(71) Applicant: PRIMAL SPACE SYSTEMS, INC., Raleigh, NC (US)

(72) Inventor: Barry L. Jenkins, Pottsville, PA (US)

(73) Assignee: PRIMAL SPACE SYSTEMS, INC., Raleigh, NC (US)

( * ) Notice: Subject to any disclaimer, the term of this patent is extended or adjusted under 35 U.S.C. 154(b) by 0 days.

(21) Appl. No.: 15/013,784

(22) Filed: Feb. 2, 2016

(65) Prior Publication Data

US 2016/0155260 A1   Jun. 2, 2016

Related U.S. Application Data

(63) Continuation-in-part of application No. 13/420,436, filed on Mar. 14, 2012, now abandoned, which is a
(Continued)

(51) Int. Cl.
*G06T 19/00* (2011.01)
*G06T 15/20* (2011.01)
*G06T 15/40* (2011.01)

(52) U.S. Cl.
CPC ............ *G06T 15/20* (2013.01); *G06T 19/003* (2013.01); *G06T 15/40* (2013.01); *G06T 2200/28* (2013.01); *G06T 2210/08* (2013.01)

(58) Field of Classification Search
None
See application file for complete search history.

(56) References Cited

U.S. PATENT DOCUMENTS 5,553,206 A   9/1996   Meshkat
5,914,721 A   6/1999   Lim
(Continued)

FOREIGN PATENT DOCUMENTS

CN   1305619 A   7/2001
CN   1691069 A   11/2005
(Continued)

OTHER PUBLICATIONS

Zach, Christopher, and Konrad Karner. "Prefetching policies for remote walkthroughts." (2002).*
(Continued)

*Primary Examiner* — Ryan D McCulley
(74) *Attorney, Agent, or Firm* — Oblon, McClelland, Maier & Neustadt, L.L.P.

(57) ABSTRACT

A method of pursuit path camera model navigation includes, providing, via processing circuitry of one server, a future viewpoint located at a first location and a current viewpoint located at a second location and calculating a first prefetch region including one or more viewcells and one or more visibility even packets, the first prefetch region corresponding to the first location of the future viewpoint and the second location of the current viewpoint. The method further includes receiving commands to modify the first location of the future viewpoint to a third location at a first velocity, calculating a navigational intent of the future viewpoint based on the commands, and calculating a second prefetch region including the viewcells and the visibility event packets by collapsing the calculated first prefetch region into the second prefetch region, the second prefetch region corresponding to a predicted pursuit path based on the calculated navigational intent.

30 Claims, 24 Drawing Sheets

Related U.S. Application Data continuation-in-part of application No. PCT/US2011/051403, filed on Sep. 13, 2011, which is a continuation of application No. PCT/US2011/042309, filed on Jun. 29, 2011, said application No. 13/420,436 is a continuation-in-part of application No. PCT/US2011/042309, filed on Jun. 29, 2011, application No. 15/013,784, filed on Feb. 2, 2016, which is a continuation-in-part of application No. 13/807,824, filed as application No. PCT/US2011/042309 on Jun. 29, 2011, now Pat. No. 9,472,019.

(60) Provisional application No. 62/110,774, filed on Feb. 2, 2015, provisional application No. 61/476,819, filed on Apr. 19, 2011, provisional application No. 61/474,491, filed on Apr. 12, 2011, provisional application No. 61/452,330, filed on Mar. 14, 2011, provisional application No. 61/384,284, filed on Sep. 19, 2010, provisional application No. 61/382,056, filed on Sep. 13, 2010, provisional application No. 61/360,283, filed on Jun. 30, 2010.

(56) References Cited

U.S. PATENT DOCUMENTS

| | | | |
|---|---|---|---|
| 5,999,187 | A | 12/1999 | Dehmlow et al. |
| 6,028,608 | A | 2/2000 | Jenkins |
| 6,057,847 | A | 5/2000 | Jenkins |
| 6,111,582 | A | 8/2000 | Jenkins |
| 6,259,452 | B1 | 7/2001 | Coorg et al. |
| 6,782,130 | B2 | 8/2004 | Guo |
| 6,933,946 | B1 | 8/2005 | Silva et al. |
| 2002/0167518 | A1 | 11/2002 | Migdal et al. |
| 2006/0001974 | A1 | 1/2006 | Uehara et al. |
| 2006/0082571 | A1 | 4/2006 | McDaniel |
| 2007/0206008 | A1 | 9/2007 | Kaufman et al. |
| 2008/0180440 | A1 | 7/2008 | Stich |
| 2009/0207169 | A1 | 8/2009 | Wakayama |
| 2009/0276541 | A1 | 11/2009 | Lock et al. |
| 2010/0045670 | A1 | 2/2010 | O'Brien et al. |
| 2010/0060640 | A1 | 3/2010 | Melikian et al. |
| 2012/0229445 | A1 | 9/2012 | Jenkins |
| 2013/0321593 | A1* | 12/2013 | Kirk .................. G06T 15/04 348/51 |
| 2014/0306866 | A1* | 10/2014 | Miller ................ G06T 19/006 345/8 |

FOREIGN PATENT DOCUMENTS

| | | |
|---|---|---|
| CN | 1696978 A | 11/2005 |
| CN | 1806260 A | 7/2006 |
| CN | 101145245 A | 3/2008 |
| CN | 101149842 A | 3/2008 |
| JP | 2004-45266 A | 2/2004 |

OTHER PUBLICATIONS

Klimke, Jan, Benjamin Hagedorn, and Jürgen Döllner. "A Service-Based Concept for Camera Control in 3D Geovirtual Environments." Progress and New Trends in 3D Geoinformation Sciences. Springer Berlin Heidelberg, 2013. 101-118.*
Döllner, Jürgen, Benjamin Hagedorn, and Steffen Schmidt. "An approach towards semantics-based navigation in 3D city models on mobile devices."Location Based Services and TeleCartography. Springer Berlin Heidelberg, 2007. 357-368.*
Aila, Timo. "SurRender Umbra: A Visibility Determination Framework for Dynamic Environments." MS thesis. Helsinki U of Technology, 2000. Print.
Aila, Timo, and Ville Miettinen. "dPVS: An Occlusion Culling System for Massive Dynamic Environments." IEEE Computer Graphics and Applications 24.2 (2004): 86-97.
Aila, Timo, Ville Miettinen, and Otso Makinen. "DPVS Reference Manual." Aug. 2006. PDF file.
Aliaga, Daniel, et al. "MMR: An Interactive Massive Model Rendering System Using Geometric and Image-Based Acceleration." Proceedings of the 1999 Symposium on Interactive 3D Graphics . Proc. of Symposium on Interactive 3D Graphics, Apr. 1999, Atlanta. New York: ACM, 1999. 199-206. ACM Portal. Web. Jun. 9, 2010. <http://portal.acm.org>.
Aliaga, Daniel G., et al. "Sea of Images." Proceedings of the Conference on Visualization '02. Washington, DC: IEEE Computer Society, 2002. 331-38. ACM Portal. Web. Jun. 20, 2010. <http://portal.acm.org>.
Amanatides, John, and Andrew Woo. "A Fast Voxel Traversal Algorithm for Ray Tracing." Paper presented at Eurographics 1987. PDF file.
Bajaj, Chandrajit. "Computational Visualization." N.d. PDF file. Dec. 11-15, 2002.
Banerjee, Raja, and Jarek R. Rossignac. "Topologically Exact Evaluation of Polyhedra Defined in CSG with Loose Primitives." Computer Graphics Forum 15.4 (1996): 205-17. Print.
Batagelo, Harlen Costa, and Shin-Ting Wu. "Dynamic Scene Occlusion Culling using a Regular Grid." Proceedings of the 15th Brazilian Symposium on Computer Graphics and Image Processing. Washington, DC: IEEE Computer Society, 2002. 43-50. ACM Portal. Web. Jun. 21, 2010. <http://portal.acm.org>.
Bernardini, Fausto, Jihad El-Sana, and James T. Klosowski. "Directional Discretized Occluders for Accelerated Occlusion Culling." Eurographics '2000. Ed. M. Gross and F. R. A. Hopgood. vol. 19. N.p.: n.p., n.d. N. pag. Print.
Bittner, Jiri. "Efficient Construction of Visibility Maps using Approximate Occlusion Sweep." Proceedings of the 18th Spring Conference on Computer Graphics . New York: ACM, 2002. 167-175. ACM Portal. Web. Jun. 24, 2010. <http://portal.acm.org>.
"Hierarchical Techniques for Visibility Computations." Diss. Czech Technical U in Prague, 2002. Print.
Bittner, Jiri, Vlastimil Havran, and Pavel Slavik. "Hierarchical Visibility Culling with Occlusion Trees." Proceedings of the Computer Graphics International 1998. Washington, DC: IEEE Computer Society, 1998. 207. ACM Portal. Web. Jun. 19, 2010. <http://portal.acm.org>.
Bittner, Jiri, and Michael Wimmer. Report on Visibility Algorithms. N.p.: n.p., 2005. Print.
Bittner, Jiri, et al. "Coherent Hierarchical Culling: Hardware Occlusion Queries Made Useful." Eurographics 2004. Ed. M.-P. Cani and M. Slater. vol. 23. Oxford: Blackwell Publishing, 2004. N. pag. Print.
Blythe, David. "The Direct3D 10 System." ACM Transactions on Graphics (TOG) 25.3 (2006): 724-34. ACM Portal. Web. Jun. 20, 2010. <http://portal.acm.org>.
Bronnimann, H., et al. "Lines Tangent to Four Triangles in Three-Dimensional Space." Discrete & Computational Geometry 37.3 (2007): 369-80. ACM Portal. Web. Jun. 27, 2010. <http://portal.acm.org>.
Bronnimann, H., et al. Transversals to Line Segments in R3. N.p.: n.p., 2003. Print.—Transversals to Line Segments in R3. N.p.: n.p., 2003. Print.
Brunet, Pere, and Isabel Navazo. "Solid Representation and Operation Using Extended Octrees." ACM Transactions on Graphics (TOG) 9.2 (1990): 170-97. Print.
Brunet, Pere, et al. "Hoops: 3D Curves as Conservative Occluders for Cell-Visibility." Eurographics 2001. Ed. A. Chalmers and T.-M. Rhyne. vol. 20. N.p.: n.p., n.d. N. pag. Print.
Butchart, J. H. "The Altitude Quadric of a Tetrahedron." The American Mathematical Monthly 47.6 (1940): 383-84. Print.
Campbell, A. T., III, and Donald S. Fussell. "Adaptive Mesh Generation for Global Diffuse Illumination." Proceedings of the 17th Annual Conference on Computer Graphics and Interactive Techniques . New York: ACM, 1990. 155-64. ACM Portal. Web. Jun. 24, 2010. <http://portal.acm.org>.
Cano, Pedro, and Juan Carlos Torres. Representation of Polyhedral Objects using SP-Octrees. Granada: n.p., n.d. Print. (created Jan. 5, 2002.).

(56) References Cited

OTHER PUBLICATIONS

Cano, Pedro, Juan Carlos Torres, and Francisco Velasco. "Progressive Transmission of Polyhedral Solids using a Hierarchical Representation Scheme." Journal of WSCG 11.1 (2003): n. pag. PDF file.
Chan, Timothy. "A Minimalist's Implementation of the 3-d Divide-and-Conquer Convex Hull Algorithm." Jun. 4, 2003. University of Waterloo School of Computer Science. Timothy M. Chan's Publications. Web. May 30, 2010. <http://www.cs.uwaterloo.ca/~tmchan/.html>.
Charneau, Sylvain, Lillian Aveneau, and Laurent Fuchs. "Exact, Robust and Efficient Full Visibility Computation in Plucker Space." The Visual Computer 23 (Jun. 2007): 773-82. Print.
Chen, Wei-Chao, et al. "Light Field Mapping: Hardware-Accelerated Visualization of Surface Light Fields." ACM Transactions on Graphics (TOG) 21.3 (2002): 447-56. ACM Portal. Web. Jun. 20, 2010. <http://portal.acm.org>.
Chhugani, Jatin. "High Fidelity Walkthroughs of Large Virtual Environments." Diss. The Johns Hopkins U, 2004. Print.
Chhugani, Jatin, et al. "vLOD: High-Fidelity Walkthrough of Large Virtual Environments." IEEE Transactions on Visualization and Computer Graphics 11.1 (2005): 35-47. ACM Portal. Web. Jun. 8, 2010. <http://portal.acm.org>.
Chin, Norman, and Steven Feiner. "Fast Object-Precision Shadow Generation for Area Light Sources Using BSP Trees." Proceedings of the 1992 Symposium on Interactive 3D Graphics . Proc. of Symposium on Interactive 3D Graphics, 1992, Cambridge, Massachusetts. New York: Association for Computing Machinery, 1992. 21-30. ACM Portal. Web. May 30, 2010. <http://portal.acm.org>.
Chin, Norman, and Steven Feiner, "Near Real-Time Shadow Generation Using BSP Trees." ACM SIGGRAPH Computer Graphics 23.3 (1989): 99-106. ACM Portal. Web. May 31, 2010. <http://portal.acm.org>.
Chrysanthou, Yiorgos, Daniel Cohen-Or, and Dani Lischinski. "Fast Approximate Quantitative Visibility for Complex Scenes." Proceedings of the Computer Graphics International 1998. Washington, DC: IEEE Computer Society, 1998. 220. ACM Portal. Web. Jun. 20, 2010. <http://portal.acm.org>.
Chrysanthou, Yiorgos, and Mel Slater. "Shadow Volume BSP Trees for Computation of Shadows in Dynamic Scenes." Proceedings of the 1995 Symposium on Interactive 3D Graphics . Proc. of Symposium on Interactive 3D Graphics, 1995, Monterey, California. New York: Association for Computing Machinery, 1995. 45-50. ACM Portal. Web. May 30, 2010. <http://portal.acm.org>.
Chrysanthou, Yiorgos, and Mel Slater. "Incremental Updates to Scenes Illuminated by Area Light Sources." Proceedings of the Eurographics Workshop on Rendering Techniques '97 . London: Springer-Verlag, 1997. 103-14. ACM Portal. Web. May 29, 2010. <http://portal.acm.org>.
Cohen, Jonathan. "Rendering Software Acceleration." Spring 2000. PDF file.
Cohen-Or, Daniel, et al. "A Survey of Visibility for Walkthrough Applications." IEEE Transactions on Visualization and Computer Graphics 9.3 (2003): 412-31. Print.
Cohen-Or, Daniel, et al. "Conservative Visibility and Strong Occlusion for Viewspace Partitioning of Densely Occluded Scenes." Eurographics '98. Comp. N. Ferreira and M. Gobel. vol. 17. N.p. n.p., n.d. N. pag. Print. vol. 17, (1998) No. 3.
Cohen-Or, Daniel, and Eyal Zadicarlo. "Visibility Streaming for Network-Based Walkthroughs." Proceedings of Graphics Interface, 1998. N.p. n.p., 1998. N. pag. Print.
Comba, Joao, and Bruce Naylor. "Conversion of Binary Space Partitioning Trees to Boundary Representation." Geometric Modeling: Theory and Practice: The State of the Art (Focus on Computer Graphics). Ed. Wolfgang Strasser, Reinhard Klein, and Rene Rau. N.p.: Springer Verlag, 1997. 286-301. Print.
Coorg, Satyan, and Seth Teller. "Temporally Coherent Conservative Visibility." Computational Geometry: Theory and Applications 12.1-2 (1999): 105-124. ACM Portal. Web. Jun. 19, 2010. <http://portal.acm.org>.
Coorg, Satyan, and Seth Teller. "Real-Time Occlusion Culling for Models with large Occluders." Proceedings of the 1997 Symposium on Interactive 3D Graphics . Symposium on Interactive 3D Graphics, Providence, RI. New York: ACM, 1997. 83-ff. ACM Portal. Web. Jun. 19, 2010. <http://portal.acm.org>.
Correa, Wagner T., James T. Klosowski, and Claudio T. Silva. "Fast and Simple Occlusion Culling." Game Programming Gems 3. Ed. Dante Treglia. N.p.: Charles River Media, 2002. N. pag. Print. Game Programming Gems ser. 3.
Correa, Wagner T., James T. Klosowski, and Claudio T. Silva. IWalk: Interactive Out-Of-Core Rendering of Large Models. N.p.: n.p., n.d. N. pag. Print. (modified Sep. 4, 2013).
Correa, Wagner T., James T. Klosowski, and Claudio T. Silva. "Out-of-Core Sort-First Parallel Rendering for Cluster-Based Tiled Displays." Proceedings of the Fourth Eurographics Workshop on Parallel Graphics and Visualization . vol. 29. Aire-la-Ville: Eurographics Association, 2002. 89-96. ACM Portal. Web. Jun. 20, 2010. <http://portal.acm.org>.
Correa, Wagner T., James T. Klosowski, and Claudio T. Silva. "Visibility-Based Prefetching for Interactive Out-Of-Core Rendering." Proceedings of the 2003 IEEE Symposium on Parallel and Large-Data Visualization and Graphics. Washington, DC: IEEE Computer Society, 2003. N. pag. ACM Portal. Web. Jun. 20, 2010. <http://portal.acm.org>.
Cozzi, Patrick John. "Visibility Driven Out-of-Core HLOD Rendering." MS thesis. U of Pennsylvania, 2008. Print.
Dachsbacher, Carsten, et al. "Implicit Visibility and Antiradiance for Interactive Global Illumination." ACM Transactions on Graphics (TOG) 26.3 (2007): n. pag. ACM Portal. Web. Jun. 20, 2010. <http://portal.acm.org>.
Decoret, Xavier, Gilles Debunne, and Francois Sillion. "Erosion Based Visibility Preprocessing." Proceedings of the 14th Eurographics Workshop on Rendering. Proc. of ACM International Conference Proceeding Series; vol. 44. Aire-la-Ville: Eurographics Association, 2003. 281-88. ACM Portal. Web. Jun. 8, 2010. <http://portal.acm.org>.
Demouth, Julien, et al. "Between Umbra and Penumbra." Proceedings of the Twenty-Third Annual Symposium on Computational Geometry . New York: ACM, 2007. 265-74. ACM Portal. Web. Jun. 29, 2010. <http://portal.acm.org>.
Drettakis, George, and Eugene Fiume. "A Fast Shadow Algorithm for Area Light Sources Using Backprojection." Proceedings of the 21st Annual Conference on Computer Graphics and Interactive Techniques . New York: ACM, 1994. 223-30. ACM Portal. Web. Jun. 27, 2010. <http://portal.acm.org>.
Drettakis, Georgios. Structured Sampling and Reconstruction of Illumination for Image Synthesis. Diss. U of Toronto, 1994. Toronto: UMI, 1994. AAINN92651. ACM Portal. Web. Jun. 24, 2010. <http://portal.acm.org>.
Durand, Fredo. "3D Visibility: Analytical Study and Applications." Diss. U of Grenoble, 1999. Print.
Durand, Fredo. "Some Thoughts on Visibility." N.d. PDF file. (created Oct. 18, 2000).
Durand, Fredo, George Drettakis, and Claude Puech. "The 3D Visibility Complex: A New Approach to the Problems of Accurate Visibility." Proceedings of the Eurographics Workshop on Rendering Techniques '96 . London: Springer-Verlag, 1996. 245-56. ACM Portal. Web. Jun. 30, 2010. <http://portal.acm.org>.
Durand, Fredo, et al. "Conservative Visibility Preprocessing using Extended Projections." Proceedings of the 27th Annual Conference on Computer Graphics and Interactive Techniques. Proc. of International Conference on Computer Graphics and Interactive Techniques. New York: ACM Press/Wesley Publishing Co., 2000. 239-48. ACM Portal. Web. Jun. 8, 2010. <http://portal.acm.org>.
Edelsbrunner, Herbert. "Triangulations and Meshes in Computational Geometry." Cambridge Journals 9 (Mar. 2001): 133-213. Cambridge Journals. Web. Jun. 20, 2010. <http://journals.cambridge.org>.
Eppstein, David. "Asymptotic Speed-Ups in Constructive Solid Geometry." Algorithmica 13.5 (1995): 462-471. Print.
Fogel, Efi, et al. "A Web Architecture for Progressive Delivery of 3D Content." Proceedings of the Sixth International Conference on 3D Web Technology. Proc. of Virtual Reality Modeling Language

(56) References Cited

OTHER PUBLICATIONS

Symposium, Paderbon, Germany, 2001. New York: ACM, 2001. 35-41. ACM Portal. Web. Jun. 20, 2010. <http://portal.acm.org>.
Funkhouser, Thomas A. "Visibility." Spring 2006. PDF file.
Funkhouser, Thomas A. "A Visibility Algorithm for Hybrid Geometry-and Image-Based Modeling and Rendering." Computers and Graphics 23.5 (1999): 719-28. Print.
Funkhouser, Thomas A. "Database Management for Interactive Display of Large Architectural Models." Proceedings of the Conference on Graphics Interface '96. Toronto: Canadian Information Processing Society, 1996. 1-8. ACM Portal. Web. Jun. 20, 2010. <http://portal.acm.org>.
Ghali, Sherif. "A Geometric Framework for Computer Graphics Addressing Modeling, Visibility, and Shadows." N.d. HTML file. (Created Jun. 8, 1999).
Ghali, Sherif. "A Survey of Practical Object Space Visibility Algorithms." N.d. MS. Max Planck Institute for Computer Science, Saarbrucken. (Created May 14, 2001).
Ghali, Sherif. "Object Space Visibility." Paper presented at SIGGRAPH 2001. PDF file.
Ghali, Sherif, and Chris Smith. "Computing the Boundary of a Class of Labeled-Leaf BSP Solids." Proceedings of the 17th Canadian Conference on Computational Geometry (CCCG'05). Proc. of Canadian Conference on Computational Geometry, 2005, Windsor, Ontario. N.p.: n.p., 2005. 302-5. The Canadian Conference on Computational Geometry. Web. May 29, 2010. <http://www.cccg.ca/>.
Gigus, Ziv, John Canny, and Raimund Seidel. Efficiently Computing and Representing Aspect Graphics of Polyhedral Objects. Berkeley: U of California, Berkeley, n.d. Print. (Created Sep. 13, 2002).
Gigus, Ziv, and Jitendra Malik. "Computing the Aspect Graph for Line Drawings of Polyhedral Objects." IEEE Transactions on Pattern Analysis and Machine Intelligence 12.2 (1990): 113-22. ACM Portal. Web. Jun. 27, 2010. <http://portal.acm.org>.
Goodrich, Michael T. "A Polygonal Approach to Hidden-Line and Hidden-Surface Elimination." CVGIP: Graphical Models and Image Processing 54.1 (1992): 1-12. ACM Portal. Web. Jun. 27, 2010. <http://portal.acm.org>.
Gorjanc, Sonja. Some Examples of using Mathematica in Teaching Geometry. Zagreb: U of Zagreb, n.d. N. pag. Print. (Created Aug. 29, 2013).
Gotsman, Craig, Oded Sudarsky, and Jeffrey A. Fayman. "Optimized Occlusion Culling Using Five-Dimensional Subdivision." Computers & Graphics 23.5: 645-54. Print. (1999).
Gran, Carlos Andujar. "Octree-Based Simplification of Polyhecral Solids." Diss. Polytechnical U of Catalunya, 1999. Print.
Gu, Xianfeng, Steven J. Gortler, and Michael F. Cohen. "Polyhedral Geometry and the Two-Plane Parameterization." Proceedings of the Eurographics Workshop on Rendering Techniques '97. London: Springer-Verlag, 1997. 1-12. ACM Portal. Web. Jun. 29, 2010. <http://portal.acm.org>.
Gueziec, Andre, et al. "Cutting and Stitching: Converting Sets of Polygons to Manifold Surfaces." IEEE Transactions on Visualization and Computer Graphics 7.2 (2001): 136-151. Print.
Haines, Eric. "An Introductory Tour of Interactive Rendering." IEEE Computer Graphics and Applications 26.1 (2006): 76-87. ACM Portal. Web. Jun. 20, 2010. <http://portal.acm.org>.
Hardt, Stephen, and Seth J. Teller. "High-Fidelity Radiosity Rendering at Interactive Rates." Proceedings of the Eurographics Workshop on Rendering Techniques '96 . London: Springer-Verlag, 1996. N. pag. ACM Portal. Web. Jun. 29, 2010. <http://portal.acm.org>.
Haumont, D., O. Makinen, and S. Nirenstein. "A Low Dimensional Framework for Exact Polygon-to-Polygon Occlusion Queries." Proceedings of the Eurographics Symposium on Rendering. Ed. Kavita Bala and Philip Dutre. N.p.: n.p., 2005. N. pag. Print.
Havemann, Sven, and Deiter W. Fellner. Generative Mesh Modeling. Braunschweig: U of of Technology Muhlenpfordtstr, 2003. Print.

Heckbert, Paul S. "Discontinuity Meshing for Radiosity." Eurographics '92. N.p. n.p., 1992. 203-16. Print.
Hedley, David. Discontinuity Meshing for Complex Environments. Bristol: U of Bristol, 1998. ACM Portal. Web. Jun. 27, 2010. <http://portal.acm.org>.
Hertzmann, Aaron, and Denis Zorin. "Illustrating Smooth Surfaces." Proceedings of the 27th Annual Conference on Computer Graphics and Interactive Techniques. New York: ACM Press/Wesley Publishing Co., 2000. 517-26. ACM Portal. Web. Jun. 29, 2010. <http://portal.acm.org>.
Hey, Heinrich, and Werner Purgathofer. "Occlusion Culling Methods." Paper presented at Eurographics 2001. Print.
Hoffmann, Christoph M. "The Problems of Accuracy and Robustness in Geometric Computation." IEEE Transactions on Visualization and Computer Graphics (Mar. 1989): 31-41. Print.
Hoffmann, Christoph M. Robustness in Geometric Computations. N.p. n.p., 2001. Print.
Hosseini, Mojtaba, and Nicolas D. Georganas. "MPEG-4 BIFS Streaming of Large Virtual Environments and their Animation on the Web." Proceedings of the Seventh International Conference on 3D Web Technology . Proc. of 3D Technologies for the World Wide Web conference, Tempe, AZ, 2002. New York: ACM, 2002. 19-25. ACM Portal. Web. Jun. 20, 2010. <http://portal.acm.org>.
Hubbard, Philip M. Constructive Solid Geometry for Triangulated Polyhedra. Providence: Brown University, 1990. Print.
Hudson, T., et al. "Accelerated Occlusion Culling using Shadow Frusta." Proceedings of the Thirteenth Annual Symposium on Computational Geometry . New York: ACM, 1997. 1-10. ACM Portal. Web. Jun. 19, 2010. <http://portal.acm.org>.
Keyser, John, et al. "ESOLID—A System for Exact Boundary Evaluation." Paper presented at Proceedings of the Seventh ACM Symposium on Solid Modeling and Applications, 2002, Saarbrücken, Germany. ACM Symposium on Solid and Physical Modeling. Web. May 23, 2010.
Kirsanov, D., P. V. Sander, and S. J. Gortler. "Simple Silhouettes for Complex Surfaces." ACM International Conference Proceeding Series. Proc. of the 2003 Eurographics/SIGGRAPH Symposium on Geometry Processing. vol. 43. Aire-la-Ville: Eurographics Association, 2003. 102-6. ACM Portal. Web. Jun. 17, 2010. <http://portal.acm.org>.
Kleinberg, Jon, and Eva Tardos. "Algorithm Design." N.d. PDF file. Copyright 2005.
Klosowski, James T., and Claudio T. Silva. "Efficient Conservative Visibility Culling Using the Prioritized-Layered Projection Algorithm." IEEE Transactions on Visualization and Computer Graphics 7.4 (2001): 365-79. ACM Portal. Web. Jun. 9, 2010. <http://portal.acm.org>.
Koltun, Vladen, Yiorgos Chrysanthou, and Daniel Cohen-Or. "Virtual Occluders: An Efficient Intermediate PVS Representation." Proceedings of the Eurographics Workshop on Rendering Techniques 2000. London: Springer-Verlag, 2000. 59-70. ACM Portal. Web. Jun. 19, 2010. <http://portal.acm.org>.
Koltun, Vladlen, Yiorgos Chrysanthou, and Daniel Cohen-Or. "Hardware-Accelerated from-Region Visibility Using a Dual Ray Space." Proceedings of the 12th Eurographics Workshop on Rendering Techniques . London: Springer-Verlag, 2001. 205-16. ACM Portal. Web. Jun. 19, 2010. <http://portal.acm.org>.
Krishnan, Shankar. "Efficient and Accurate Boundary Evaluation Algorithms for Sculptured Solids." Diss. U of North Carolina at Chapel Hill, 1997. Print.
Krishnan, Shankar, and Dinesh Manocha. Global Visibility and Hidden Surface Removal Algorithms for Free Form Surfaces. Chapel Hill: U of North Carolina at Chapel Hill, 1994. Print.
Laidlaw, David H., W. Benjamin Trumbore, and John F. Hughes. "Constructive Solid Geometry for Polyhedral Objects." ACM SIGGRAPH Computer Graphics 20.4 (1986): 161-170. ACM Portal. Web. May 31, 2010. <http://portal.acm.org>.
Laine, Samuli. "A General Algorithm for Output-Sensitive Visibility Preprocessing." Proceedings of the 2005 Symposium on Interactive 3D Graphics and Games. New York: ACM, 2005. 31-40. ACM Portal. Web. Jun. 21, 2010. <http://portal.acm.org>.
Laurentini, Aldo. "The Visual Hull Concept for Silhouette-Based Image Understanding." IEEE Transactions on Pattern Analysis and

(56) References Cited

OTHER PUBLICATIONS

Machine Intelligence 16.2 (1994): 150-62. ACM Portal. Web. Jun. 27, 2010. <http://portal.acm.org>.

Leyvand, Tommer, Olga Sorkine, and Daniel Cohen-Or. "Ray Space Factorization for From-Region Visibility." ACM SIGGRAPH 2003 Papers. Proc. of International Conference on Computer Graphics and Interactive Techniques, San Diego, CA, 2003. New York: ACM, 2003. 595-604. ACM Portal. Web. Jun. 29, 2010. <http://portal.acm.org>.

Lim, Hong Lip. "Toward a Fuzzy Hidden Surface Algorithm." Proceedings of the 10th International Conference of the Computer Graphics Society on Visual computing: Integrating Computer Graphics with Computer Vision: Integrating Computer Graphics with Computer Vision . New York: Springer-Verlag New York, Inc, 1992. 621-35. ACM Portal. Web. Jun. 8, 2010. <http://portal.acm.org>.

Lischinski, Dani, Filippo Tampieri, and Donald P. Greenberg. "A Discontinuity Meshing Algorithm for Accurate Radiosity." IEEE Computer Graphics and Applications 12.6 (1997): 25-39. Print.

Lorensen, William E., and Harvey E. Cline. "'Marching Cubes: A High Resolution 3D Surface Construction Algorithm." ACM SIGGRAPH Computer Graphics 21.4 (1987): 163-69. ACM Portal. Web. Jun. 20, 2010. <http://portal.acm.org>.

Luebke, David. Collection of various lecture slides. N.d. Microsoft PowerPoint file. (Last printed Jul. 27, 1998).

Luebke, David, and Chris Georges. "Portals and Mirrors: Simple, Fast Evaluation of Potentially Visible Sets." Proceedings of the 1995 Symposium on Interactive 3D Graphics . Proc. of Symposium on Interactive 3D Graphics, 1995, Monterey, CA. New York: ACM, 1995. N. pag. ACM Portal. Web. Jun. 9, 2010. <http://portal.acm.org>.

Luka, Peter. "Generalized Conservative Visibility Algorithms." May 30, 2003. MS. Massachusetts Institute of Technology, Cambridge.

Mantyla, Martti. "Boolean Operations of 2-Manifolds through Vertex Neighborhood Classification." ACM Transactions on Graphics 5.1 (1986): 1-29. ACM Portal. Web. May 31, 2010. <http://portal.acm.org>.

Mattausch, Oliver, Jiri Bittner, and Michael Wimmer. "CHC++: Coherent Hierarchical Culling Revisited." Eurographics 2008. Ed. G. Drettakis and R. Scopigno. vol. 27. N.p. Blackwell Publishing, 2008. 221-30. Print.

McKenna, Michael. "Worst-Case Optimal Hidden-Surface Removal." ACM Transactions on Graphics (TOG) 6.1 (1987): 19-28. ACM Portal. Web. Jun. 29, 2010. <http://portal.acm.org>.

Meyer, Tom. "Introduction to Time-Critical Scheduling." Oct. 5, 1995. PostScript file.

Mora, F., L. Aveneau, and M. Meriaux. "Coherent and Exact Polygon-to-Polygon Visibility." Journal of WSCG (Jan.-Feb. 2005): n. pag. Print.

Moreira, Fabio O., Joao Comba, and Carla Maria Dal Sasso Freitas. "Smart Visible Sets for Networked Virtual Environments." Proceedings of the 15th Brazilian Symposium on Computer Graphics and Image Processing . Washington, DC: IEEE Computer Society, 2002. 373-80. ACM Portal. Web. Jun. 20, 2010. <http://portal.acm.org>.

Mount, David M. "CMSC 754 Computational Geometry." Fall 2002. U of Maryland Dept. of Computer Science, College Park. CMSC 754 Computational Geometry. Web. May 31, 2010. <http://www.cs.umd.edub~mount//>.

Myllarniemi, Varvana. "Dynamic Scene Occlusion Culling." Paper presented at Computer Graphics Seminar, Spring 2003. Print.

Naylor, Bruce F. "Partitioning Tree Image Representation and Generation from 3D Geometric Models." Proceedings of the Conference on Graphics Interface '92 . San Francisco: Morgan Kaufmann Publishers, Inc., 1992. 201-12. ACM Portal. Web. Jun. 20, 2010. <http://portal.acm.org>.

Nehab, Diego, Joshua Barczak, and Pedro V. Sander. "Triangle Order Optimization for Graphics Hardware Computation Culling." Proceedings of the 2006 Symposium on Interactive 3D Graphics and Games . New York: ACM, 2006. 207-11. ACM Portal. Web. Jun. 30, 2010. <http://portal.acm.org>.

Nirenstein, S., E. Blake, and J. Gain. "Exact From-Region Visibility Culling." Proceedings of the 13th Eurographics Workshop on Rendering. Proc. of ACM International Conference Proceeding Series, Pisa, Italy, 2002. vol. 28. Aire-la-Ville: Eurographics Association, 2002. 191-202. ACM Portal. Web. Jun. 24, 2010. <http://portal.acm.org>.

Nishita, Tomoyuki, Isao Okamura, and Eihachiro Nakamae. "Shading Models for Point and Linear Sources." ACM Transactions on Graphics (TOG) 4.2 (1985): 124-46. ACM Portal. Web. Jun. 29, 2010. <http://portal.acm.org>.

"NVIDIA GPU Programming Guide." N.d. PDF file. (Created Oct. 12, 2007).

Panne, Michiel Van de, and A. James Stewart. "Effective Compression Techniques for Precomputed Visibility." Paper presented at Eurographics 1999. Print.

Petitjean, Sylvain. "A Computational Geometric Approach to Visual Hulls." International Journal of Computational Geometry and Applications 8.4 (1998): 407-36. Print.

Plantinga, Harry. "Conservative Visibility Preprocessing for Efficient Walkthroughs of 3D Scenes." Proceedings of Graphics Interface 93. Toronto: Canadian Information Processing Society, 1993. 166-73. Print.

Plantinga, Harry, and Charles R. Dyer. "Visibility, Occlusion, and the Aspect Graph." International Journal of Computer Vision 5.2 (1990): 137-60. ACM Portal. Web. Jun. 29, 2010. <http://portal.acm.org>.

Poulin, Pierre, and John Amanatides. "Shading and Shadowing with Linear Light Sources." Paper presented at Eurographics 90. Print. Comput. & Graphics vol. 15, No. 2, pp. 259-265. 1991. Printed in Great Britain.

Rege, Ashu. "Occlusion (HP and NV Extensions)." N.d. Microsoft PowerPoint file. (Created Sep. 25, 2013).

Requicha, Aristides A. G., and Herbert B. Voelcker. "Boolean Operations in Solid Modelling: Boundary Evaluation and Merging Algorithms." File last modified on Jan. 1984. U of Rochester Coll of Engineering and Applied Science. UR Research. Web. May 31, 2010. <https://urresearch.rochester.edu/.action?institutionalltemld=990>.

Rusinkiewicz, Szymon, and Marc Levoy. "Streaming QSplat: A Viewer for Networked Visualization of Large, Dense Models." Proceedings of the 2001 Symposium on Interactive 3D Graphics . New York: ACM, 2001. 63-8. ACM Portal. Web. Jun. 20, 2010. <http://portal.acm.org>.

Samet, Hanan. "Spatial Data Structures." Modern Database Systems: The Object Model, Interoperability, and Beyond. Reading: Addison Wesley/Press, 1995. N. pag. Print.

Sander, Pedro V., et al. "Silhouette Clipping." Proceedings of the 27th Annual Conference on Computer Graphics and Interactive Techniques. Proc. of International Conference on Computer Graphics and Interactive Techniques, 2000. New York: ACM Press/Wesley, 2000. 327-34. ACM Portal. Web. Jun. 19, 2010. <http://portal.acm.org>.

Saona-Vasquez, Carlos, Isabel Navazo, and Pere Brunet. "Data Structures and Algorithms for Navigation in Highly Polygon-Populated Scenes." N.d. PDF file. (Created Nov. 7, 2007).

Saona-Vasquez, Carlos, Isabel Navazo, and Pere Brunet. "The Visibility Octree. A Data Structure for 3D Navigation." Computers & Graphics 23.5 (1999): 635-43. Print.

Schaufler, Gernot, et al. "Conservative Volumetric Visibility with Occluder Fusion." Proceedings of the 27th Annual Conference on Computer Graphics and Interactive Techniques. New York: ACM Press/Wesley Publishing Co., 2000. 229-38. ACM Portal. Web. Jun. 27, 2010. <http://portal.acm.org>.

Schrocker, Gerald. "Visibility Culling for Game Applications." Diss. Graz U of Technology, 2001. Print.

Seidel, Raimund. "Small-Dimensional Linear Programming and Convex Hulls Made Easy." Discrete & Computational Geometry 6.5 (1991): 423-434. ACM Portal. Web. May 31, 2010. <http://portal.acm.org>.

Sharman, James. "The Marching Cubes Algorithm." N.d. HTML file. (Created Sep. 11, 2013).

(56) References Cited

OTHER PUBLICATIONS

Sigueira, Marcelo, et al. "A New Construction of Smooth Surfaces from Triangle Meshes Using Parametric Pseudo-Manifolds." Computers and Graphics 33.3 (2009): 331-40. ACM Portal. Web. Jun. 17, 2010. <http://portal.acm.org>.
Soler, Cyril, and Francois X. Sillion. "Fast Calculation of Soft Shadow Textures Using Convolution." Proceedings of the 25th Annual Conference on Computer Graphics and Interactive Techniques. Proc. of International Conference on Computer Graphics and Interactive Techniques. New York: ACM, 1998. 321-32. ACM Portal. Web. Jun. 8, 2010. <http://portal.acm.org>.
Staneker, D. "An Occlusion Culling Toolkit for OpenSG Plus." Paper presented at OpenSG Symposium, 2003. PDF file. OpenSG Symposium (2003).
Stewart, A. James, and Sherif Ghali. "Fast Computation of Shadow Boundaries Using Spacial Coherence and Backprojections." Proceedings of the 21st Annual Conference on Computer Graphics and Interactive Techniques. New York: ACM, 1994. N. pag. ACM Portal. Web. Jun. 29, 2010. <http://portal.acm.org>.
Takusagawa, Ken. "Representing Smooth Surfaces." Oct. 23, 2001. HTML file.
Teller, Seth, and John Alex. Frustum Casting for Progressive, Interactive Rendering. Computer Graphics Group Publications. Massachusetts Institute of Technology, Jan. 1998. Web. Jun. 9, 2010. <http://groups.csail.mit.edu//.html#Technical_Reports>.
Teller, Seth J. "Computing the Antipenumbra of an Area Light Source." ACM SIGGRAPH Computer Graphics 26.2 (1992): 139-48. ACM Portal. Web. Jun. 29, 2010. <http://portal.acm.org>.
Teller, Seth J. "Computing the Antipenumbra of an Area Light Source." 1992. PDF file.
Teller, Seth J. Visibility Computations in Densely Occluded Polyhedral Environments. Diss. U of California at Berkeley, 1992. Berkeley: U of California at Berkeley, 1992. GAX93-30757. ACM Portal. Web. Jun. 29, 2010. <http://portal.acm.org>.
Teller, Seth J., and Pat Hanrahan. "Global Visibility Algorithms for Illumination Computations." Proceedings of the 20th Annual Conference on Computer Graphics and Interactive Techniques . New York: ACM, 1993. 239-46. ACM Portal. Web. Jun. 29, 2010. <http://portal.acm.org>.
Teller, Seth J., and Michael E. Hohmeyer. Stabbing Oriented Convex Polygons in Randomized O(n2) Time. ACM Portal. N.p., n.d. Web. Jun. 29, 2010. <http://portal.acm.org>.
Thibault, William C., and Bruce F. Naylor. "Set Operations on Polyhedra Using Binary Space Partitioning Trees." ACM SIGGRAPH Computer Graphics 21.4 (1987): 153-162. ACM Portal. Web. May 31, 2010. <http://portal.acm.org>.
Vlachos, Alex. "Preparing Sushi: How Hardware Guys Write a 3D Graphics Engine." 2001. PDF file.
Wald, Ingo, Andreas Dietrich, and Philipp Slusallek. "An Interactive Out-of-Core Rendering Framework for Visualizing Massively Complex Models." ACM SIGGRAPH 2005 Courses . Proc. of International Conference on Computer Graphics and Interactive Techniques . New York: ACM, 2005. N. pag. ACM Portal. Web. Jun. 20, 2010. <http://portal.acm.org>.
Wang, Yigang, Hujun Bao, and Qunsheng Peng. "Accelerated Walkthroughs of Virtual Environments Based on Visibility Preprocessing and Simplification." Computer Graphics Forum 17.3 (1998): 187-94. Print.
Wang, Yusu, Pankaj K. Agarwal, and Sariel Har-Peled. "Occlusion Culling for Fast Walkthrough in Urban Areas." Eurographics 2001. N.p.: n.p., 2001. N. pag. Print.
Weiler, Kevin, and Peter Atherton. "Hidden Surface Removal using Polygon Area Sorting." Proceedings of the 4th Annual Conference on Computer Graphics and Interactive Techniques. New York: ACM, 1977. 214-22. ACM Portal. Web. Jun. 30, 2010. <http://portal.acm.org>.
Weiler, Kevin, and Peter Atherton. Slides explaining polygon clipping. N.d. PDF file. (Created Oct. 23, 2006).
Wloka, Matthias. "Batch, Batch, Batch: What Does it Really Mean?" N.d. Microsoft PowerPoint file. (Created Mar. 12, 2003).
Wonka, Peter. "Occluder Shadows for Fast Walkthroughs of Urban Environments." Eurographics 1999. vol. 18, No. 3. Oxford: Blackwell Publishers, 1999. N. pag. Print.
Wonka, Peter, Michael Wimmer, and Dieter Schmalstieg. "Visibility Preprocessing with Occluder Fusion for Urban Walkthroughs. " Proceedings of the Eurographics Workshop on Rendering Techniques 2000. London: Springer-Verlag, 2000. 71-82. ACM Portal. Web. Jun. 8, 2010. <http://portal.acm.org>.
Wonka, Peter, Michael Wimmer, and Francois X. Sillion. "Instant Visibility." Eurographics 2001. Ed. A. Chalmers and T.-M. Rhyne. vol. 20. Oxford: Blackwell Publishers, 2001. N. pag. Print.
Wood, Zoe Justine. "Computational Topology Algorithms for Discrete 2-Manifolds." Diss. California Institute of Technology, 2003. Print.
Worrall, Adam. "Dynamic Discontinuity Meshing." Diss. U of Bristol, 1998. Print.
Yoon, Sung-Eui, Brian Salomon, and Dinesh Manocha. "Interactive View-Dependent Rendering with Conservative Occlusion Culling in Complex Environments." Proceedings of the 14th IEEE Visualization 2003 (VIS'03). Washington, DC: IEEE Computer Society, 2003. N. pag. ACM Portal. Web. Jun. 9, 2010. <http://portal.acm.org>.
Zhang, Hongxin, and Jieqing Feng. "Preliminary Mathematics of Geometric Modeling (2)." Nov. 23, 2006. PDF file.
Zheng, Wenting, et al. "Rendering of Virtual Environments Based on Polygonal & Point-Based Models." Proceedings of the ACM Symposium on Virtual Reality Software and Technology. New York: ACM, 2002. 25-32. ACM Portal. Web. Jun. 20, 2010. <http://portal.acm.org>.
Zhou, Kaichi, et al. "Visibility-Driven Mesh Analysis and Visualization through Graph Cuts." IEEE Transactions on Visualization and Computer Graphics 14.6 (2008): 1667-74. Print.
Jean-Eudes Marvie, et al., "Remote Interactive Walkthrough of City Models", IEEE 11th Pacific Conference on Computer Graphics and Applications, 2003, 5 pages.
Shachar Fleishman, et al., "Automatic Camera Placement for Image-Based Modeling", Blackwell Publishers, Computer Graphics Forum, vol. 19, No. 2, 2000, 9 pages.
Frédo Durand, "A Multidisciplinary Survey of Visibility", ACM SIGGRAPH Course Notes on Visibility, 2000, 146 pages.
Combined Office Action and Search Report issued Oct. 29, 2015 in Chinese Patent Application No. 201180042082.0 (with English language translation).
Combined Chinese Office Action and Search Report dated Dec. 19, 2014 in Patent Application No. 201180042082.0 (with English language translation).
El-Sana, J., et al., "Integrating Occlusion Culling with View-Dependent Rendering," Presented at IEEE-Visualization 2001, Total 9 pages, (Oct. 26, 2001).
Lloyd, B. et al., "Horizon Occlusion Culling for Real-time Rendering of Hierarchical Terrains," IEEE Visualization 2002, Total 7 pages, (Nov. 1, 2002).
Diepstraten, J. et al., "Remote Line Rendering for Mobile Devices," Computer Graphics International, 2004 Proceedings, Total 8 pages, (Jun. 19, 2004).
International Search Report dated Jan. 5, 2012 in PCT/US11/42309 Filed Jun. 29, 2011.

\* cited by examiner

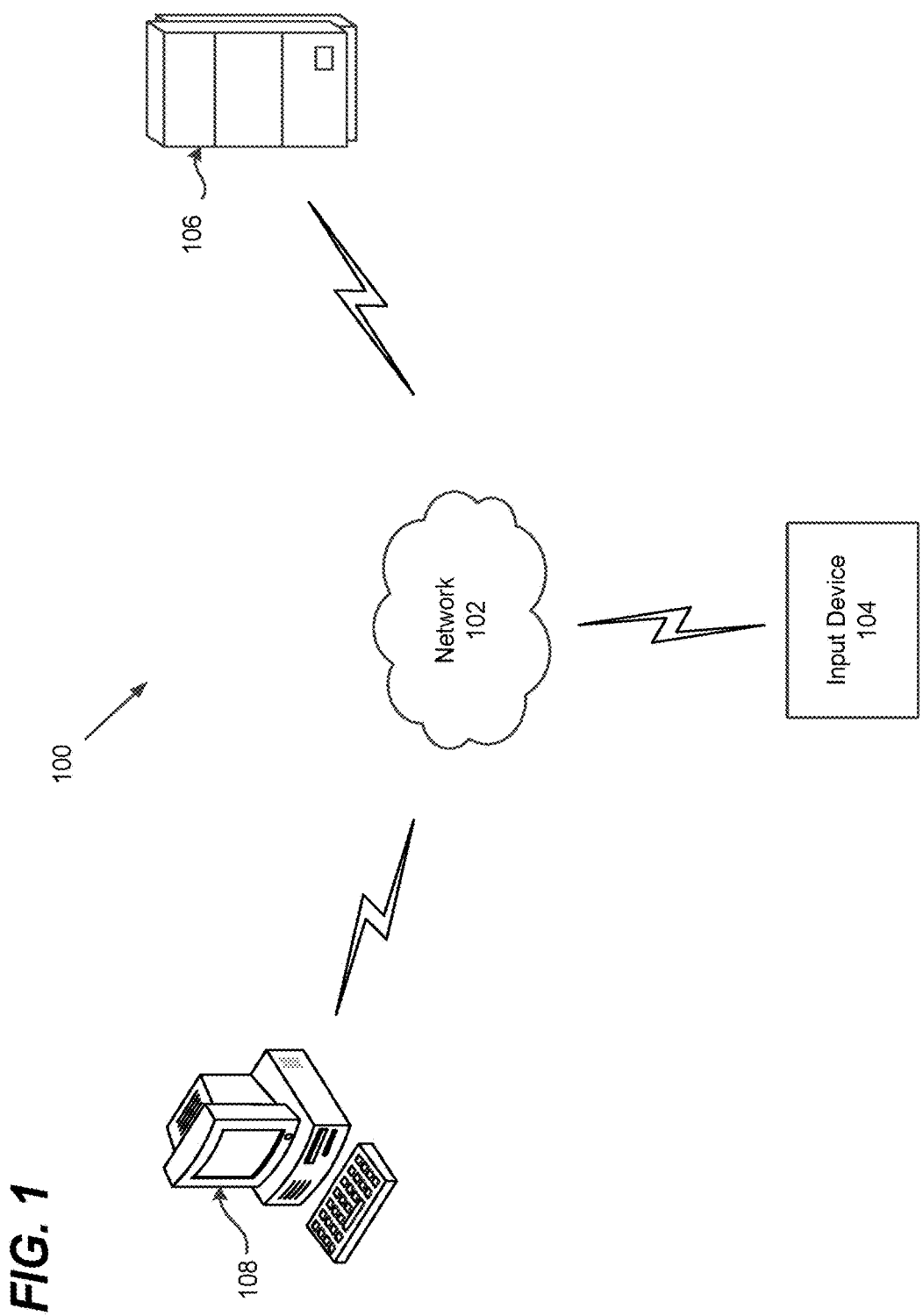

PURSUIT PATH CAMERA MODEL METHOD AND SYSTEM

FIELD

The present invention relates generally to camera navigation models, and more particularly to a method and system for a pursuit path camera model for games and simulations.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Present camera navigation models are utilized in games and simulations to be parameterized and manipulated in a variety of ways. These camera navigation models may be used as real-time devices and may include capabilities to function as static cameras as well as dynamic cameras, in which a particular object may be tracked in the corresponding game or simulation. Problems can arise in camera navigation models when the corresponding games and simulations are streamed from a server to a client device. For instance, streaming camera navigation models can become subject to issues including network latency, late packet arrival, and client side buffer underflow.

SUMMARY

In an exemplary aspect, a method of pursuit path camera model navigation includes, providing, via processing circuitry of at least one server, at least one future viewpoint located at a first location and at least one current viewpoint located at a second location and calculating a first prefetch region including one or more viewcells and one or more visibility even packets, the first prefetch region corresponding to the first location of the future viewpoint and the second location of the current viewpoint. The method further includes receiving commands to modify the first location of the at least one future viewpoint to a third location at a first velocity, calculating a navigational intent of the future viewpoint based on the commands, and calculating a second prefetch region including the viewcells and the visibility event packets by collapsing the calculated first prefetch region into the second prefetch region, the second prefetch region corresponding to a predicted pursuit path based on the calculated navigational intent.

In certain exemplary aspects, a non-transitory computer-readable storage medium, having stored thereon, instruction that when executed by a computing device, cause the computing device to perform a method of pursuit path camera model navigation including, providing, via processing circuitry of at least one server, at least one future viewpoint located at a first location and at least one current viewpoint located at a second location. The non-transitory computer-readable medium also includes calculating, via the circuitry, a first prefetch region including one or more viewcells and one or more visibility event packets corresponding to the one or more viewcells, the first prefetch region corresponding to the first location of the at least one future viewpoint and the second location of the at least one current viewpoint and receiving, via the circuitry, one or more commands to modify the first location of the future viewpoint to a third location at a first velocity. The non-transitory computer-readable medium further includes calculating, via the circuitry, a navigational intent of the at least one future viewpoint based on the one or more commands and calculating, via the circuitry, a second prefetch region including the one or more viewcells and the one or more visibility event packets by collapsing the calculated first prefetch region into the second prefetch region, the second prefetch region corresponding to a predicted pursuit path based on the navigational intent.

In some exemplary aspects, a pursuit path camera model navigation system includes an input device in communication with at least one server and including at least one of a joystick, an eye tracker and a gesture recognition device, wherein the at least one server includes processing circuitry configured to provide at least one future viewpoint located at a first location and at least one current viewpoint located at a second location. The circuitry can further be configured to calculate a first prefetch region including one or more viewcells and one or more visibility event packets corresponding to the one or more viewcells, the first prefetch region corresponding to the first location of the at least one future viewpoint and the second location of the at least one current viewpoint and receive one or more commands to modify the first location of the at least one future viewpoint to a third location at a first velocity via the input device. The circuitry can also be configured to calculate a navigational intent of the at least one future viewpoint based on the one or more commands and calculate a second prefetch region including the one or more viewcells and the one or more visibility event packets by collapsing the calculated first prefetch region into the second prefetch region, the second prefetch region corresponding to a predicted pursuit path based on the calculated navigational intent. The pursuit path camera model navigation system further includes at least one client device in communication with the at least one server and at least one graphical display.

In certain exemplary aspects, the method, conducted on a client device, of receiving at least one future visibility event packet from a server, the at least one future visibility event packet including renderable graphics information occluded from a first viewcell visited by a future viewpoint and not occluded from a second viewcell visited by the future viewpoint, includes calculating, via circuitry of the client device, the future viewpoint from a viewpoint and view direction determined by a current viewpoint. The method further includes transmitting, via the circuitry of the client device, information representing the position of the future viewpoint from the client device to the server, receiving, via circuitry of the server, the at least one future visibility event packet and transforming, via the circuitry of the server, the current viewpoint to follow, after a predetermined delay period, a path of the future viewpoint.

In some exemplary aspects, a method, conducted on a server, of prefetching at least one future visibility event packet to a client device, the at least one future visibility event packet including renderable graphics information occluded from a first viewcell visited by a future viewpoint and not occluded from a second viewcell visited by the future viewpoint, includes transmitting, via circuitry of the client device, the renderable graphics information representing the position of the future viewpoint from the client device to the server and transmitting, via circuitry of the server, the at least one future visibility event packet from the server to the client device.

In other exemplary aspects, a method, conducted on a first client device, of receiving at least one future visibility event packet from a server, the at least one future visibility event packet including renderable graphics information occluded from a first viewcell visited by a future viewpoint and not occluded from a second viewcell visited by the future viewpoint, includes calculating, via circuitry of a first client device, the future viewpoint from a viewpoint and view direction determined by a current viewpoint and transmitting, via the circuitry of the first client device, information representing the position of the future viewpoint from the first client device to the server. The method further includes transmitting, via circuitry of the server, at least one visibility event packet comprising renderable graphics information from the server to a second client device and transforming, via the circuitry of the first client device and circuitry of the second client device, the current viewpoint position to follow a path of the future viewpoint after a predetermined delay period.

In some exemplary aspects, a method, conducted on a client device, of receiving at least one future visibility event packet from a server, the at least one future visibility event packet including renderable graphics information occluded from a first viewcell visited by a future viewpoint and not occluded from a second viewcell visited by a future viewpoint, includes calculating, via circuitry of the client device, the future viewpoint from a viewpoint and view direction determined by a current viewpoint and displaying, via the circuitry of the client device, a representation of the future viewpoint at the client device. The method further includes transmitting, via the circuitry of the client device, information representing the position of the future viewpoint from the client device to the server and transforming, via circuitry of the server, the current viewpoint position to follow a path of the future viewpoint after a specified delay period. The method also includes halting, via the circuitry of the client device, the current viewpoint to a fixed position when a user inputs a braking command at the client device and transforming, via the circuitry of the client device, the future viewpoint to the fixed position of the current viewpoint in response to the braking command.

In certain exemplary aspects, a method, conducted on a client device, of receiving at least one partial future visibility event packet from a server, the at least one partial future visibility event packet including a subset of a complete future visibility event packet, the complete future visibility event packet including renderable graphics information occluded from a first viewcell visited by a future viewpoint and not occluded from a second viewcell visited by the future viewpoint, includes calculating, via circuitry of the client device, the future viewpoint from a viewpoint and view direction determined by a current viewpoint. The method further includes transmitting, via the circuitry of the client device, information representing an orientation of the future viewpoint from the client device to the server and transmitting, via the circuitry of the server, the at least one partial future visibility event packet that intersects a maximal view frustum from the server to the client device, wherein the maximal view frustum includes a volume of space intersected by the maximal view frustum of the future viewpoint during movement of the future viewpoint in the second viewcell.

In some exemplary aspects, a method, conducted on a server, of prefetching at least one partial future visibility event packet to a client device, the at least one partial future visibility event packet including a subset of a complete future visibility event packet, the complete future visibility event packet including renderable graphics information occluded from a first viewcell visited by a future viewpoint and not occluded from a second viewcell visited by a future viewpoint, includes transmitting, via circuitry of the client device, information representing the orientation of the future viewpoint from the client device to the server. The method further includes transmitting, via circuitry of the server, the at least one partial future visibility event packet that intersects a maximal view frustum from the server to the client device, wherein the maximal view frustum includes a volume of space intersected by the maximal view frustum of the future viewpoint during movement of the future viewpoint in the second viewcell.

The foregoing paragraphs have been provided by way of general introduction, and are not intended to limit the scope of the claims. The described aspects, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is an exemplary illustration of a pursuit path camera model navigation system, according to certain aspects;

DETAILED DESCRIPTION

Figure 2A:
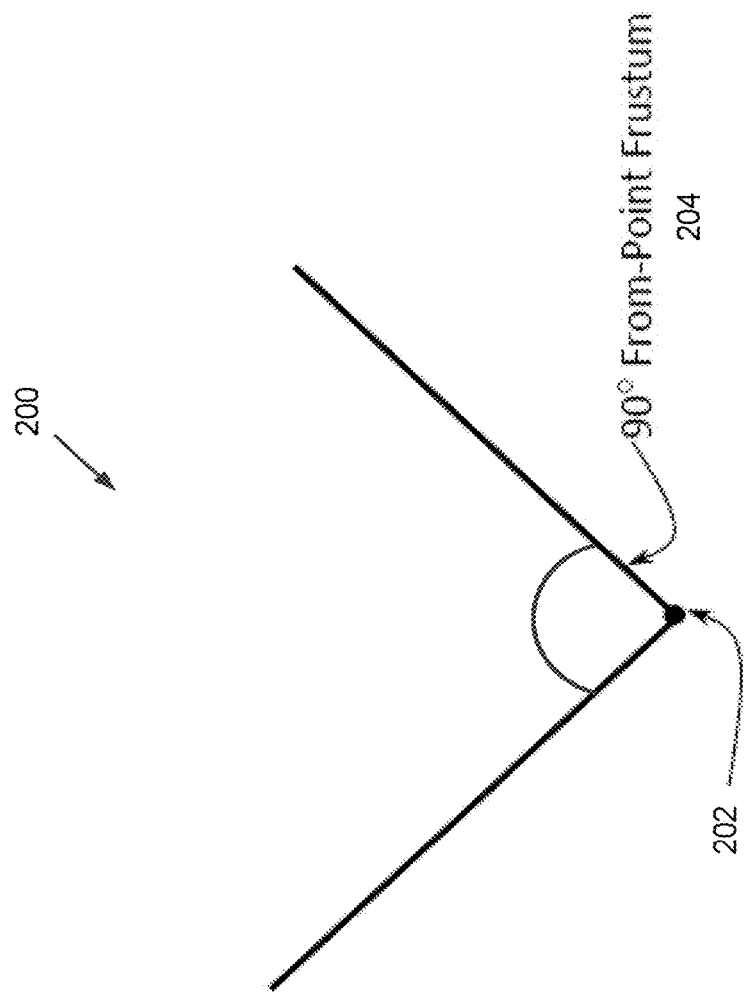
FIG. 2A is an exemplary illustration of an exemplary viewpoint and a corresponding exemplary view frustum having a 90 degree horizontal field of view, according to certain aspects.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In some exemplary aspects, there is described a method to reduce bandwidth requirements for visibility event packet streaming using a pursuit path camera navigation model in which a user exercises real-time control of a representation of a viewpoint and view frustum (also referred to as a viewpoint or camera), wherein the represented viewpoint that is currently being controlled in real-time by the user will later become the actual viewpoint and view frustum from which the current viewpoint is determined. Consistent with this method, the user may thus control, in real time, a representation of the viewpoint (called a future viewpoint, scout viewpoint, or probe viewpoint) while watching this representation from a first-person viewpoint. The viewpoint location and view direction vector of the first-person camera are set to be identical to earlier values of the future viewpoint, using a specified time delay. Thus, in exemplary aspects, the method specifies a camera model in which the future viewpoint is under real-time control of the user, and the current viewpoint, which is being used as a source of the view transformation matrix to generate the image, is under an imposed delay.

By employing the pursuit path camera model, the client user is effectively able to pre-signal navigational intent to the visibility event server, making much of the navigation-driven prefetch deterministic rather than probabilistic. By using certain, earlier, values of a future viewpoint position and orientation, the server navigation prediction algorithm does not need to employ "current" representations of the future viewpoint, which can only be represented on the server with a degree of position and orientation uncertainty that is a function of the value: (Round Trip Time–Elapsed Time).

For a pursuit path camera, in the portion of the camera path for which the elapsed time exceeds the Round Trip Time (RTT), navigation prefetch is deterministic. For these portions of the pursuit path, the visibility event server can prefetch a certain set of visibility event packets corresponding to the viewcell boundaries intersected by the space curve of the future viewpoint. The visibility event server can also prefetch certain subsets of the visibility event packets determined by the known view direction vectors exhibited by the future viewpoint during the traversal viewcell boundaries.

Effectively, on the server side, the method effects a collapse of the expanding, probabilistic positional and directional uncertainty vectors to a determined space curve and bounded range of view direction vectors. This substantially reduces the bandwidth required to deliver the visibility event packets and subpacket information needed to sustain the "current" viewpoint used to render a given environment. Additionally, this method allows the visibility event packet information to be delivered on time, even at high RTT latencies.

Using this pursuit path camera, a user maintains responsive control over the future viewpoint at a client device. This camera structure remains highly responsive since it is being controlled and rendered locally at the client device. An additional benefit of the current method of employing a pursuit path camera model is that the displayed representation of the future viewpoint is viewable by spectators of the given environment in a game or interactive content being streamed, and this displayed representation helps spectators prepare for camera translations and rotations that could otherwise be disorientating without some previous indication/preparation for the upcoming camera movement. This visual indicator of near-future camera direction changes can make the interactive content being controlled by others less disorienting and more enjoyable to spectators.

In some exemplary aspects, the delay between the real-time control input (which immediately affects the future viewpoint, since it is controlled and displayed locally) and the effect of the control input on the current viewpoint (which provides the viewpoint and view direction vector for image generation) can be set to a constant value. the delay is set to a constant value create a predictable delay in the control of the current viewpoint. Users quickly adapt to a predictable delay in a control scheme and can thereby maintain good control over the current viewpoint despite such a delay.

In other exemplary aspects, the delay between the user's real-time control input and the effect of this input on the current viewpoint can be varied. For example, in some aspects, as described herein, the delay between the real-time control of the future viewpoint and the effect on the current viewpoint used to determine the 3D environment is decreased at low future viewpoint linear velocity and/or low future viewpoint view direction vector angular velocity. Under the conditions of such low velocity, the bandwidth requirement for visibility event packet streaming decreases, and the imposed delay between the future viewpoint, which is controlled by the user at the client device, and the current viewpoint used to determine the display, can be reduced.

In other exemplary aspects, the delay can be adaptively increased. For example, as described herein, the delay can be increased under conditions of high visibility gradient (e.g., a high rate at which new surfaces become exposed per unit length traveled), which tends to correspond to high bandwidth requirements for visibility event packet streaming. The increased delay under these conditions creates greater predictability for navigation prefetch by increasing the length of the predictable, deterministic, navigation path used by the circuitry of the server, relative to the length of the probabilistic navigation path, which is affected by the RTT. For example, in a tactical shooter game, a high visibility gradient region of a modeled game environment can correspond to a region with a high "threat gradient," e.g., the rate at which a navigating player becomes exposed to newly visible danger regions of the modeled game environment. In certain exemplary aspects, the increased delay is expressed to the user by an imposed slowing of the current viewpoint with no change in the locomotive performance of the displayed future viewpoint, which is still under responsive control of the user. In this aspect, the increased separation between the current viewpoint and the future viewpoint is an indication to the user to slow the future viewpoint and close the gap therebetween.

In other exemplary aspects, an indicator of such threats is displayed to the user/player in high threat gradient/visibility event gradient regions of the model. In some aspects, the player's intended route (the path of the future viewpoint) is displayed on a heads-up display or similar display. In this aspect, the portion of the player's intended navigational path that puts the player at risk from threat is displayed with a red color or other indicator of increased threat. If the player continues to progress along the navigational path (by not slowing the future viewpoint), then the game system responds by initiating an attack on the player. This attack slows the progress of the current viewpoint and quickly decreases the bandwidth requirement for visibility event packet streaming in a way that is consistent with the tactical game environment. By being tightly integrated with the game environment, this method of reducing bandwidth requirement for visibility event packet streaming is essentially unnoticeable to the player.

In some exemplary aspects, a future viewpoint is under real-time control of a user via a client device. The viewpoint location and/or view direction vector orientation of the future viewpoint is displayed at the client device using an axis or other symbolic or realistic indication, such as a heads-up display (HUD) element. In some aspects, this future viewpoint may be depicted as a small drone, a ground vehicle, or aircraft that is under control of the user and behind which the user will follow. Consistent with other aspects, a current viewpoint may be used to determine the view transformation for generating a first-person view or other perspective view. The location of the center of the current viewpoint may be displayed using a crosshair or other reticle, or its center indication may not be displayed and only inferred from the image generated.

In other exemplary aspects, the future viewpoint can be under real-time control of a first user of a first client device. As such, the first user of the first client device effectively drives the future viewpoint and information representing the position and view direction vector (orientation) of the future viewpoint is transmitted from the first client device to a server. In this aspect, the server receives the future viewpoint and the corresponding future viewpoint information from the first client device. The circuitry of the server can be configured to determine specific viewcell boundaries crossed by the future viewpoint and prefetch the visibility event packets corresponding to the future viewpoint, to both the first client device and a second client device. In exemplary aspects, the second user of the second client device is participating in the same game or simulation as the first user of the first client device. In this instance, the second user of the second client device may be a passive spectator, in which the current viewpoint of the second client device is following the future viewpoint controlled by the first user of the first client device. In other aspects, the user of the second client device has real-time control of a vehicle or avatar that is constrained to stay within a region of the model visible from the current viewpoint that is following the future viewpoint which is being driven by the first user of the first client device.

In certain exemplary aspects, the pursuit path camera model extends the method of a "chase plane" type of camera model to include games and simulations in which a physical object such as a plane is not being controlled. By using a virtual representation of a future viewpoint, the pursuit path camera can also be used for first-person games and simulations, where the current viewpoint follows the future viewpoint.

FIG. 1 is an exemplary illustration of a pursuit path camera model navigation system 100, according to certain aspects. The pursuit path camera model navigation system 100 describes a pursuit path camera navigation model in which a current viewpoint and a future viewpoint are controlled in an environment to determine a predicted path of navigation. The pursuit path camera model navigation system 100 can include a network 102, an input device 104, a server 106, and a client device 108. The input device 104 can be one or more input devices 104 and is connected to the server 106 and the client device 108 via the network 102. The input device 104 can include a joystick, an eye tracker, a gesture recognition device, and the like. The input device 104 can transmit inputs to the server 106, to be processed by the processing circuitry of the server 106. For example, the inputs can include moving the joystick forward, pulling the joystick backwards, leaving the joystick in a neutral position, turning the joystick to the left or the right, etc. The inputs of the input device 104 can correspond to a user's control of the future viewpoint, which is utilized to indicate a user-determined path of navigation.

The server 106 can include one or more servers 106 and is connected to the input device 104 and the client device 108 via the network 102. The server 106 includes processing circuitry that can be configured to provide a current viewpoint and a future viewpoint. The future viewpoint can include one or more future viewpoints and can also be referred to as a reticle, a probe, an avatar, a future camera, a scout camera, a probe camera, a third person camera, and the like. The current viewpoint can include one or more viewpoints and can also be referred to as a current view direction, a camera view, an actual viewpoint, an actual camera, a current camera, a first person camera, and the like. The circuitry of the server 106 can also be configured to determine a first prefetch region including viewcells and visibility event packets corresponding to the viewcells based on the locations of the future viewpoint and the current viewpoint. The first prefetch region can include a region that is stored in memory of the server 106 and accessed by the circuitry of the server 106 prior to the processing and/or rendering of the region. The first prefetch region can include an area and/or a volume based on the locations of the future viewpoint and the current viewpoint.

The circuitry can further be configured to receive commands to modify the location of the future viewpoint at a particular velocity. The commands can correspond to inputs transmitted by the input device 104 to be received by the circuitry of the server 106. The commands can provide local control of the future viewpoint and can include commands such as braking, coasting, acceleration, turning, and the like. For example, the command of braking can include an immediate deceleration of the future viewpoint in response to the joystick being pulled backwards. In another example, the command of coasting can include the current viewpoint coasting towards the location of the future viewpoint as a result of the joystick being moved to a neutral position. Further, in another example the command of acceleration can include an immediate acceleration of the future viewpoint in the response to the joystick being moved in the forwards direction. In certain aspects of the present disclosure, the current viewpoint can be configured to follow the location of the future viewpoint. As such, in some aspects the commands provide direct control of the future viewpoint location and indirect control of the current viewpoint.

The circuitry of the server 106 can further be configured to determine the navigational intent of the future viewpoint based on the commands. The circuitry can also be configured to collapse the first prefetch region to a second prefetch region. The second prefetch region can correspond to a predicted pursuit path based on the navigational intent. In collapsing the area and/or volume of the first prefetch region to a second prefetch region including a precise, navigational path, the pursuit path camera model navigation system 100 can utilize path prediction to reduce network latency as well as bandwidth requirements.

The client device 108 can include one or more client devices 108 and is connected to the input device 104 and the server 106 via the network 102. The client device 108 can include a computer, a tablet, a smartphone, and the like. The client device 108 can also be in communication with a graphical display. The client device 108 can be configured to receive data from the server 106. In certain aspects, the circuitry of the client device 108 can be configured to provide a user with visuals of the future viewpoint and the current viewpoint via the graphical display. In some aspects, the client device 108 can be configured to implement the methods of the pursuit path camera model performed via the circuitry of the server 106.

The network 102 can include one or more networks and is connected to the input device 104, the server 106, and the client device 108. The network 102 can encompass wireless networks such as Wi-Fi, BLUETOOTH, cellular networks including EDGE, 3G and 4G wireless cellular systems, or any other wireless form of communication that is known, and may also encompass wired networks, such as Ethernet.

FIG. 2A is an exemplary illustration of an exemplary viewpoint and a corresponding exemplary view frustum having a 90 degree horizontal field of view 200, according to certain aspects. The viewpoint 202 includes a corresponding view frustum 204 that includes a view direction vector for processing visibility event packets. The use of view direction vectors to compute smaller visibility event packets can be useful for streaming in-game-engine cutscene material with a fixed or limited view direction vector in 3D environments. In some aspects, the pursuit path camera model can be utilized in a walkthrough or flythrough visualization of the 3D environments (e.g., first-person, open-world games), and in this instance a view direction vector provides necessary navigational information as the user navigates through the 3D environment. In the general case, the view direction vector can be pointed in any direction for any viewpoint within any viewcell, corresponding to a view direction vector of a predetermined field of view. For example, FIG. 2A shows a viewpoint 202, and a corresponding view frustum having a 90 degree horizontal field of view 204.

Figure 2B:
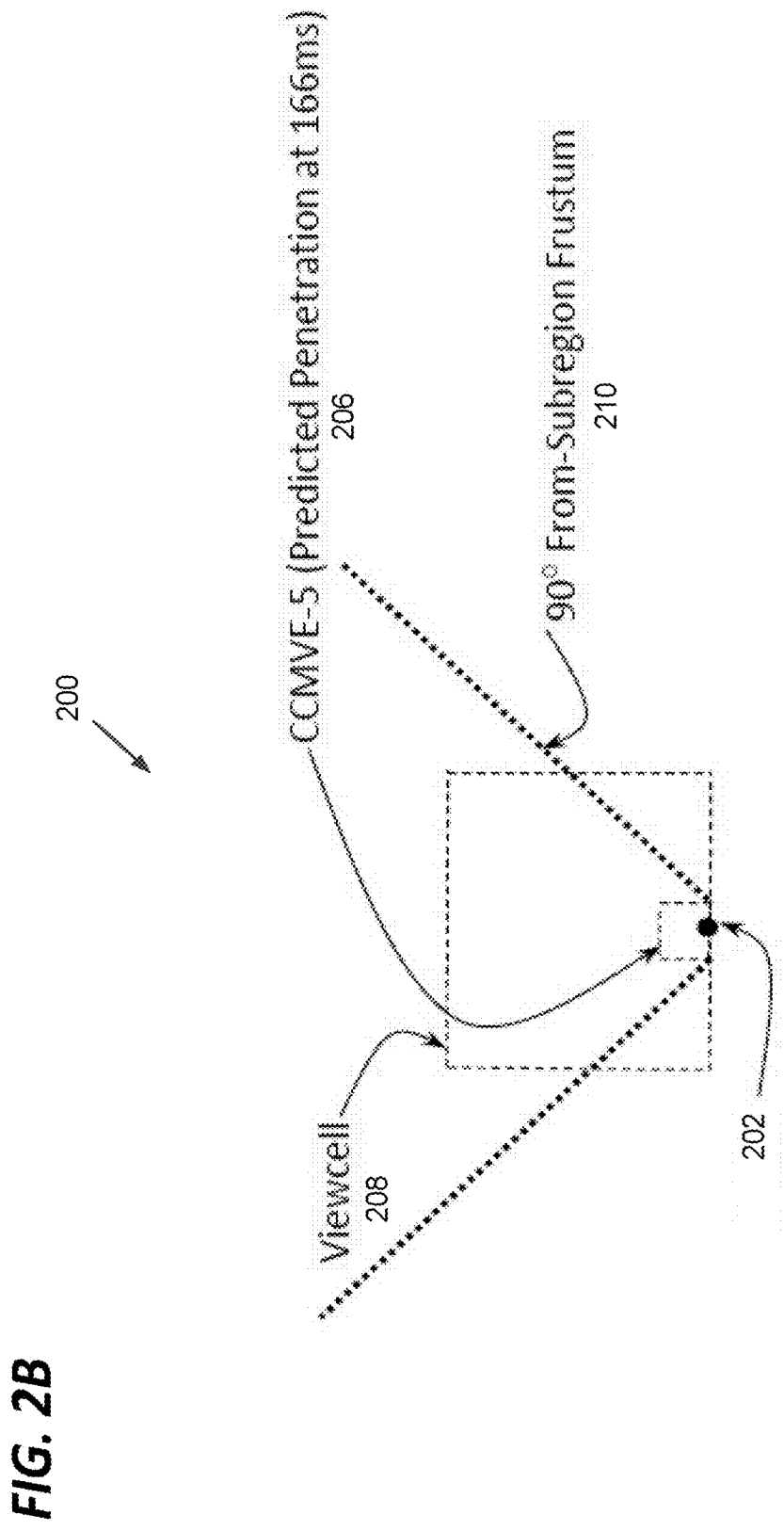
FIG. 2B is an exemplary illustration of a conservative current maximal viewpoint extent (CCMVE) of penetration into a viewcell from a known position after 166 ms of elapsed time using the exemplary view frustum having a 90 degree horizontal field of view, according to certain aspects.

FIG. 2B is an exemplary illustration of a conservative current maximal viewpoint extent (CCMVE) 206 of penetration into a viewcell from a known position after 166 ms of elapsed time using the exemplary view frustum 210 having a 90 degree horizontal field of view 200, according to certain aspects. FIG. 2B shows a top-down view of a 90 horizontal field of view frustum 210 enveloping the CCMVE-5 206. FIG. 2B also shows a conservative current maximal viewpoint extent 206, CCMVE-5, of penetration into the viewcell 208 from a known position after 166 ms of elapsed time. The CCMVE-5 206 is determined from a last known position and the maximal linear and angular velocity and acceleration of the viewpoint 202. For example, for a typical 90 degree field of view such as the 90 degree from-point frustum 204 shown in FIG. 2A, rotation rates of the frustum 204 approaching 130 to 140 degrees per second (such as that of typical multiplayer action video games) can cause difficulty in aiming, especially for people older than 30 years of age, and can cause difficulty in viewing for a spectator. However, a 90 degree yaw ability to scan the environment is more suitable (such as that of more narrative-driven, cinematic campaign-type video games), such that aiming can be improved, and viewing would be more enjoyable for a spectator.

Figure 3:
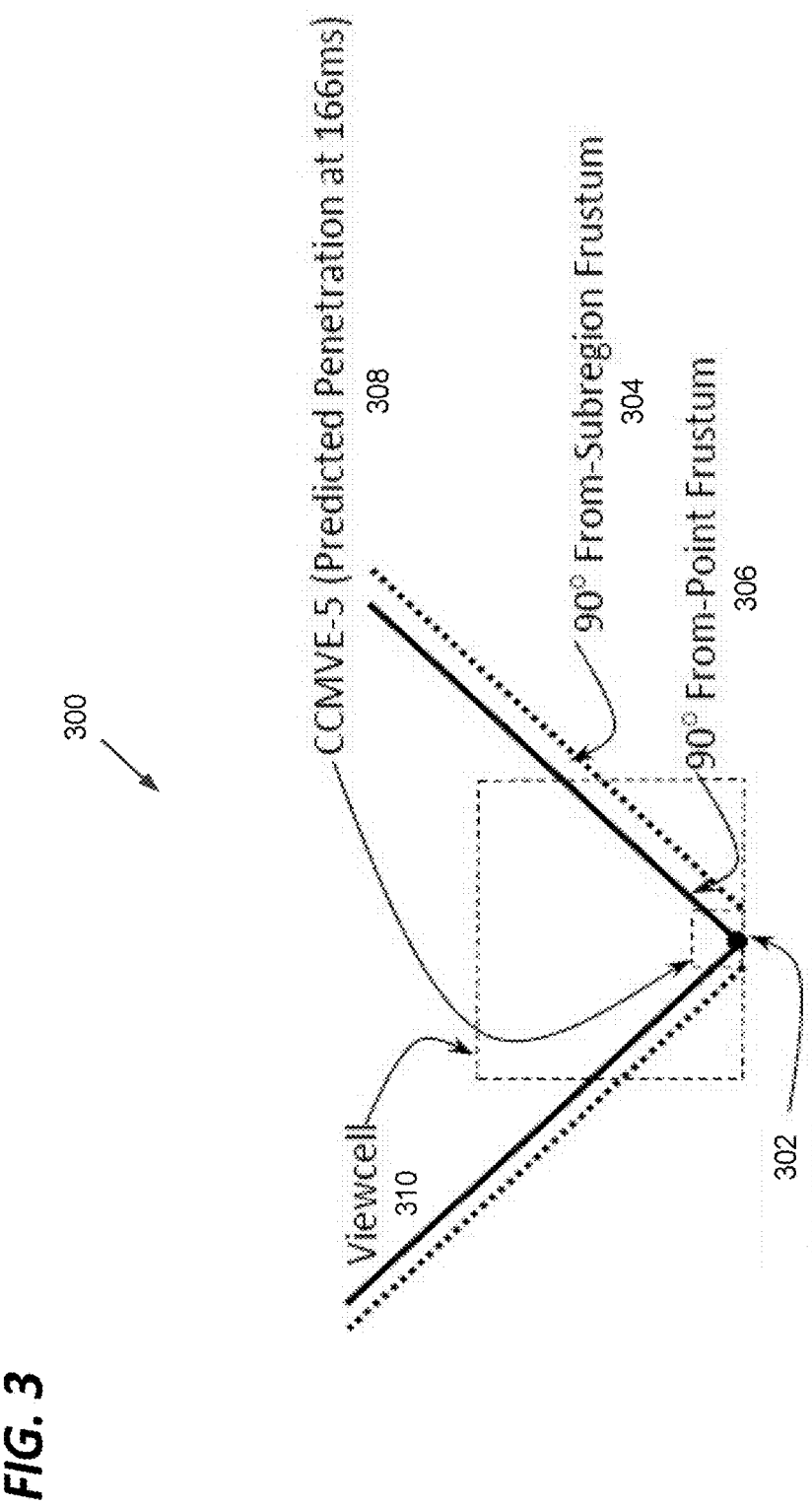
FIG. 3 is an exemplary illustration of a conservative from-subregion frustum, according to certain aspects.

FIG. 3 is an exemplary illustration of a conservative from-subregion frustum 300, according to certain aspects. FIG. 3 shows that the resulting conservative from-subregion frustum 304 is larger than the corresponding from-point frustum 306 at viewpoint 302, even if it assumed that no view direction vector rotation has occurred, for a CCMVE-5 308 representative of predicted viewcell penetration at 166 ms into a viewcell region 310.

Figure 4:
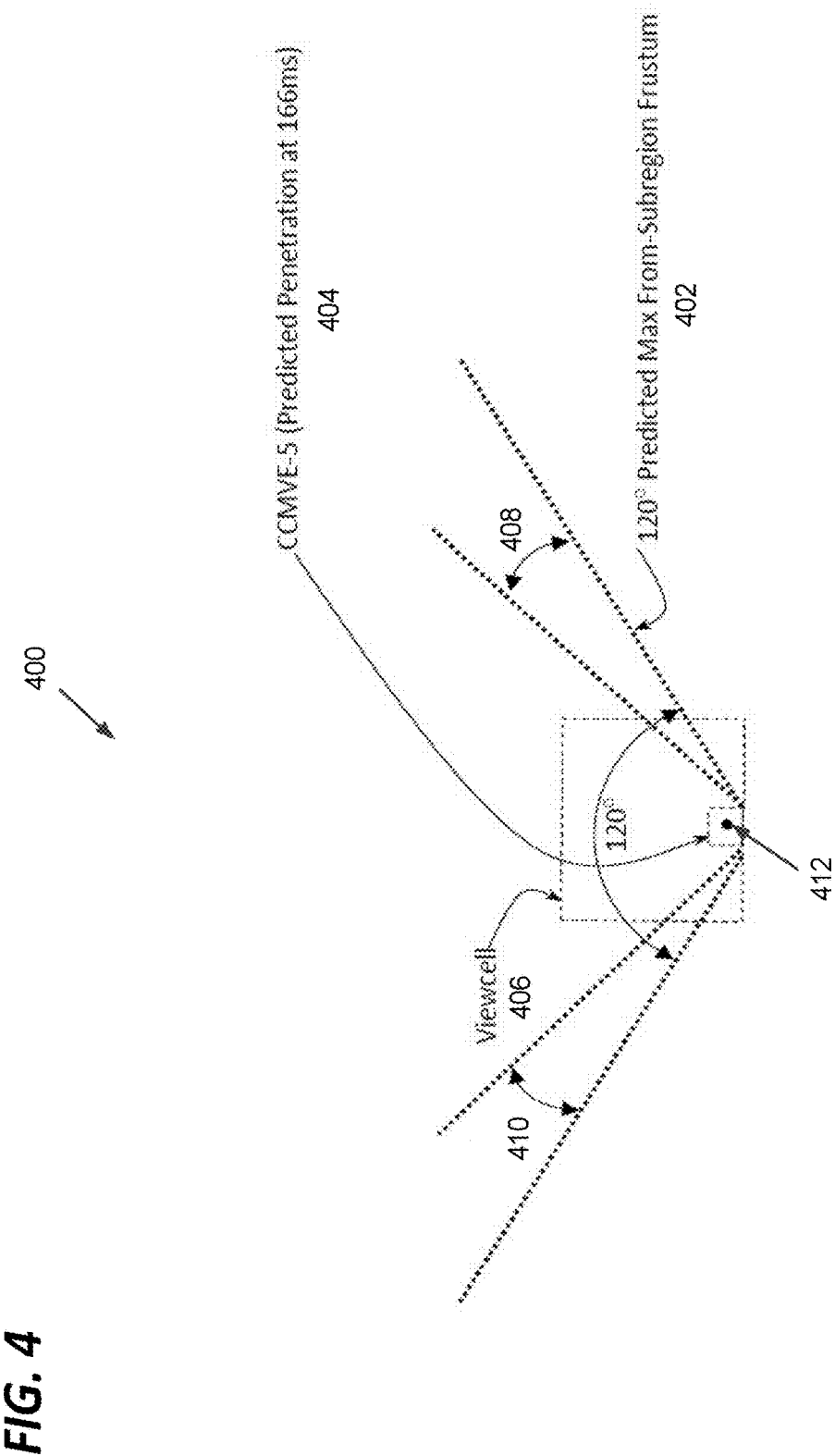
FIG. 4 is an exemplary illustration of conservative from-subregion frustum that results from viewpoint penetration into the viewcell over 166 milliseconds for a CCMVE subregion, according to certain aspects.

FIG. 4 is an exemplary illustration of conservative from-subregion frustum that results from viewpoint penetration into the viewcell over 166 milliseconds for a CCMVE subregion 400, according to certain aspects. FIG. 4 shows a resulting conservative from sub-region frustum 402 that results from a CCMVE-5 404 representative of viewpoint penetration into the viewcell 406 sub-region over 166 milliseconds, together with rotation of the view direction vector 15 degrees to the right 408 or 15 degrees to the left 410 from an initial view direction vector orientation 412. In this exemplary case, assuming a maximum view direction rotation rate of 90 degrees per second, if the ping latency between the client device 108 and the server 106 is 166 ms, the resulting 30 degree rotation would represent the uncertainty of the client device's 108 view direction vector 412, as experienced by the server 106. Accordingly, consistent with aspects of the present disclosure, the server 106 can employ the extended 120 degree frustum 402 (i.e., 120 degree predicted maximum from-subregion frustum) to determine the subset of the visibility event packet data to actually transmit to the client device 108. This determination is made by determining the set of unsent surfaces of the corresponding visibility event packet that intersect the extended frustum.

In certain aspects, the visibility event packet data is precomputed using the method of first-order from region. The set of surfaces belonging to the corresponding PVS, incrementally maintained using the delta-PVS VE packets, that have not already been sent is maintained using the technique of maintaining the shadow PVS on the server 106. In some aspects, the visibility event packets are precomputed assuming a full omnidirectional view frustum spanning 12.56 steradians of solid angle. As described, in certain exemplary aspects, the server 106 can employ the extended view frustum to cull portions of the precomputed visibility event packet that fall outside of the maximum possible predicted extent of the client device 108 view frustum, as determined from the ping latency and the maximal angular velocity and acceleration of the view frustum, as well as the maximum predicted extent of penetration of the viewpoint into the view cell.

This method ensures that all of the potentially visible surfaces are transmitted, while minimizing bandwidth requirements, by deferring the transmission of visibility event packet surfaces that are not within the current conservative extended frustum, or which happen to be backfacing with respect to the conservative current maximal viewpoint extent of penetration into the viewcell. In exemplary aspects, there is also described a method of using reduced level-of-detail models in periphery of extended view frustum to reduce bandwidth requirements for buffering against view direction vector rotation, i.e., level-of-detail vs. predicted exposure durations.

The above-disclosed methods comprise determining a conservative representation of the client device's 108 view frustum from the temporal reference frame of the server 106, and using this extended frustum to cull those surfaces of the corresponding visibility event packet that could not possibly be in the client device's 108 view frustum. Consistent with aspects of the present disclosure, all of the transmitted surface information is represented at the highest level-of-detail. The visibility event packets can be encoded using geometric and surface models at a plurality of levels-of-detail, including a plurality of levels of geometric, texture, and other surface detail. In some aspects, however, the visibility event packets can be transmitted at a lower level-of-detail during periods of low bandwidth availability, and/or high bandwidth requirement, in order to maximize the probability that the information encoding newly exposed surfaces arrives on time (e.g., before the surface is actually exposed in the client device 108 viewport). Under some conditions, a visibility event packet containing relatively low level-of-detail surface information can initially be transmitted and later replaced by a visibility event packet containing higher level-of-detail information. This exploits the fact that the human visual system has lower visual acuity for newly exposed surfaces.

Figure 5:
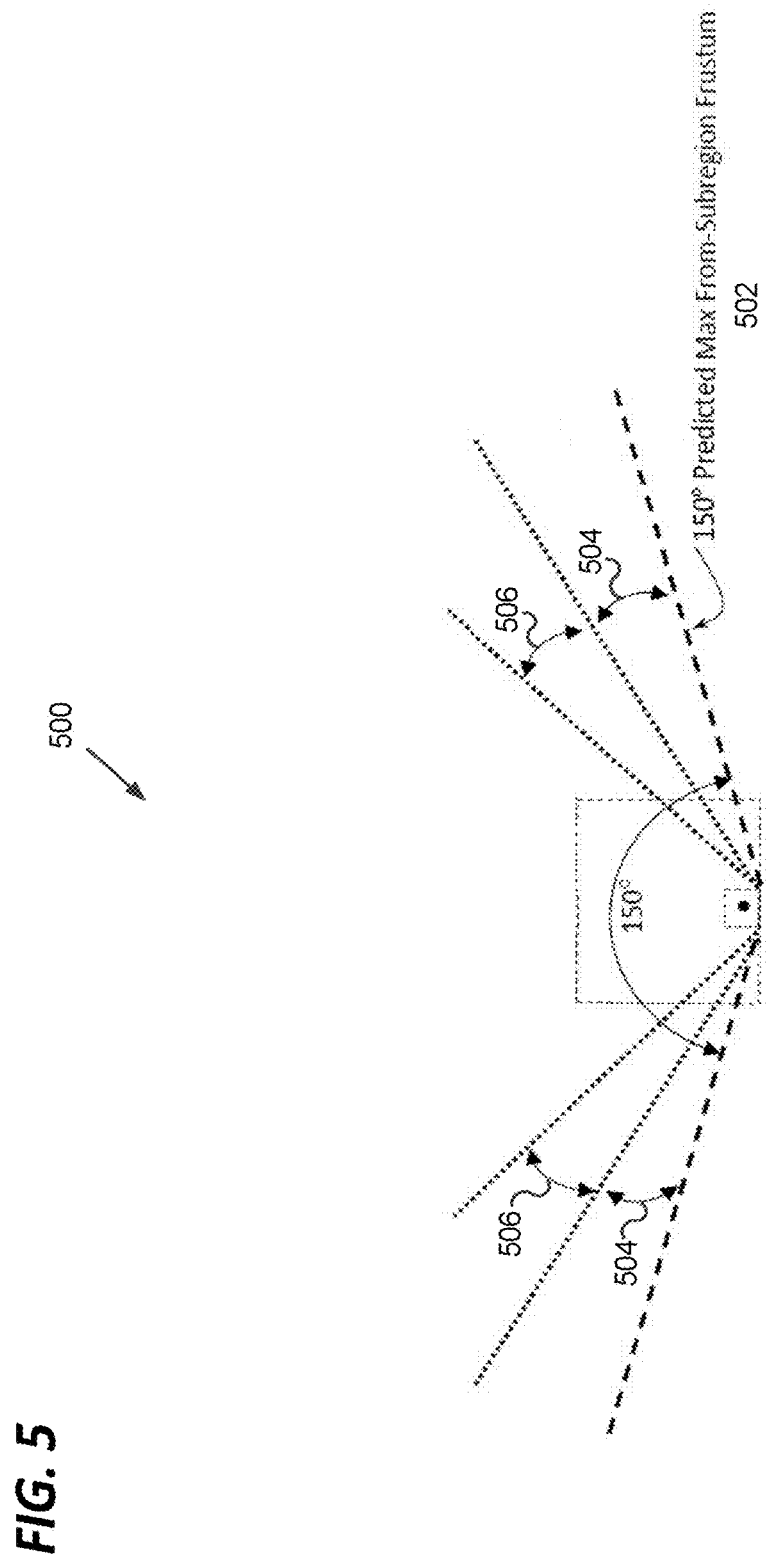
FIG. 5 is an exemplary illustration of an additional angular region of an extended frustum, according to certain aspects.

FIG. 5 is an exemplary illustration of an additional angular region of an extended frustum 500, according to certain aspects. In exemplary disclosed aspects, this limitation of human visual performance (as well as the limited spatiotemporal performance of some robotic vision systems, including 3D map-matching navigation systems) can be exploited by sending low level-of-detail surface information if the surfaces fall outside the region of the extended view frustum, as determined, in exemplary aspects, using one or more of the following pieces of information: the ping latency, the maximum viewpoint translation velocity and acceleration, the maximum angular velocity, and acceleration of the view direction vector. For example, FIG. 5 shows an additional angular region of extended view frustum 502 that spans an additional 15 degrees 504 on each side of the extended 120 degree frustum 402 shown in FIG. 4.

In exemplary aspects, the visibility event server transmits surfaces that fall in the subfrustum between 120 degrees and the maximally extended frustum of 150 degrees 504 at a lower level-of-detail than the other visibility event surface data that fall within the 120 degree extended frustum. The disclosed method thus provides a region of uncertainty between 90 degrees and 120 degrees of the subfrustum 506 and an additional buffer region against view direction vector rotation between 120 degrees and 150 degrees of the subfrustum 504, which may be useful if the directional visibility gradient (e.g., the rate of exposure of surfaces per degree of view direction vector rotation) is high, or if the available bandwidth has a high degree of variability (e.g., network jitter). In such exemplary aspects, the low level-of-detail surface information can potentially be replaced by a higher level-of-detail representation.

Figure 6:
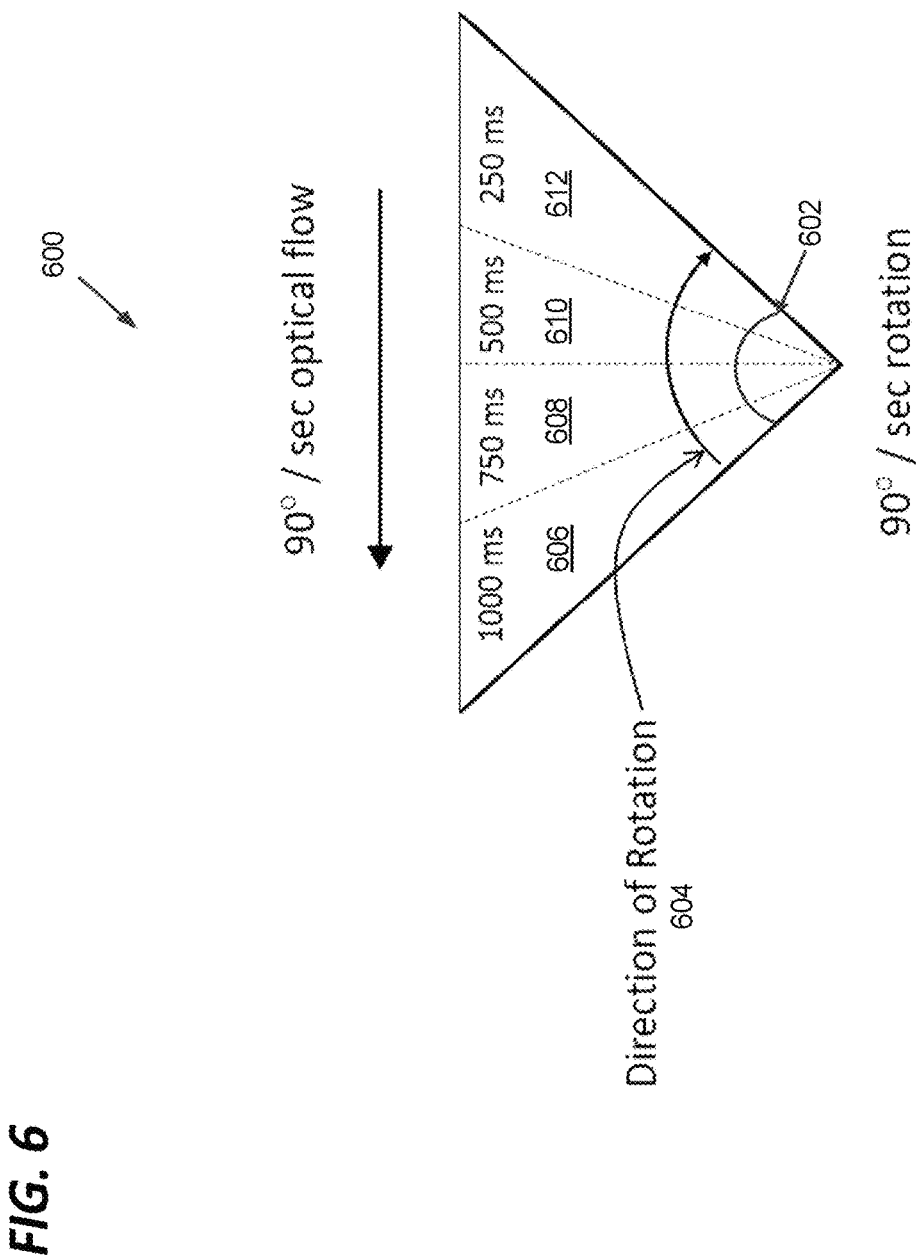
FIG. 6 is an exemplary illustration of a top-down view of a view frustum having a horizontal field of view of 90 degrees and undergoing rotation in the horizontal plane at a rate of 90 degrees per second, according to certain aspects.
Figure 7:
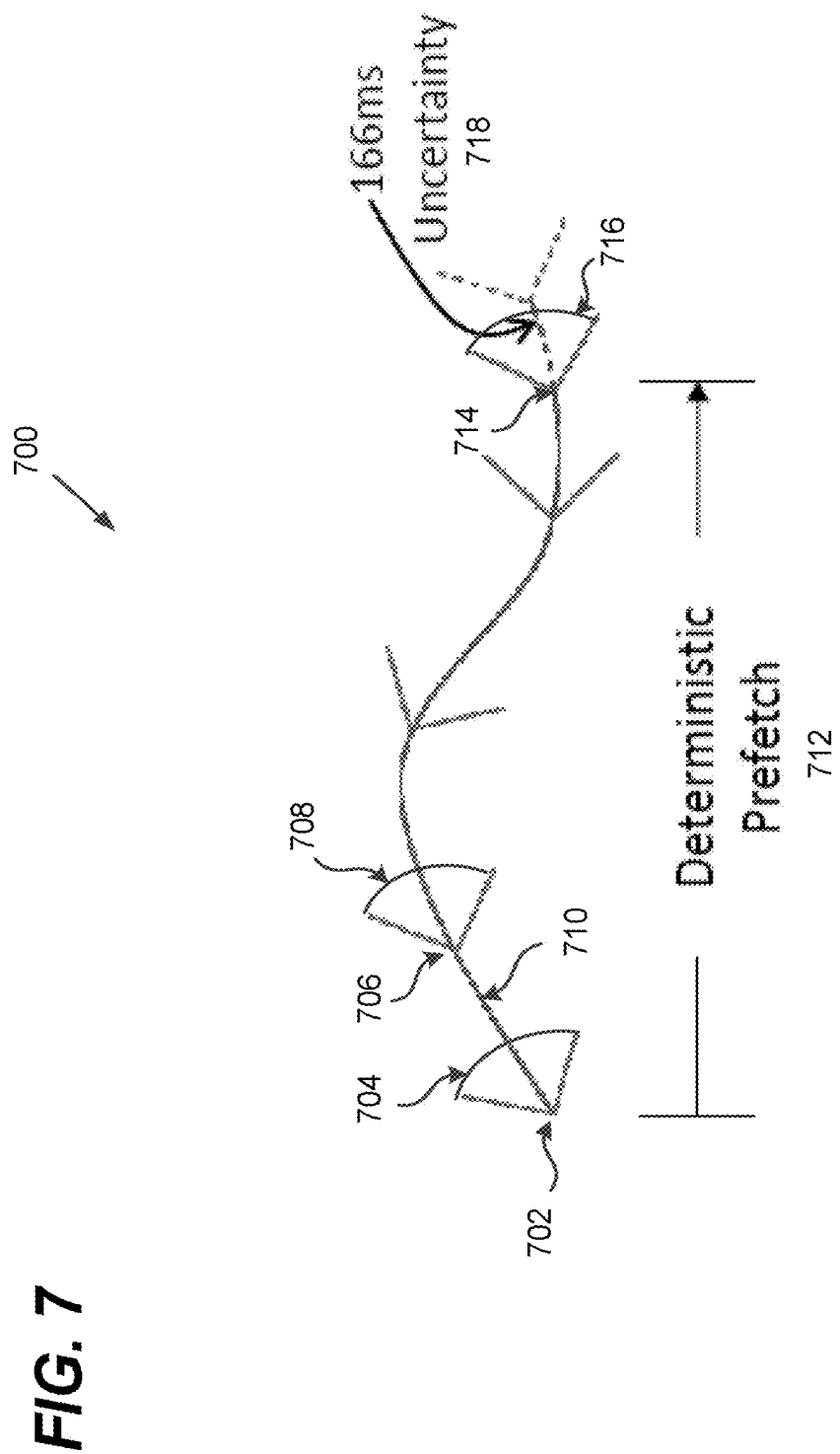
FIG. 7 is an exemplary illustration of a server representation of client viewpoint position and orientation, according to certain aspects.

FIG. 6 is an exemplary illustration of a top-down view of a view frustum having a horizontal field of view of 90 degrees and undergoing rotation in the horizontal plane at a rate of 90 degrees per second 600, according to certain aspects. FIG. 6 shows a top-down view of a view frustum having a horizontal field of view of 90 degrees 602, and undergoing rotation in the horizontal plane at a rate of 90 degrees per second 604 in a direction from a first region 606 toward a fourth region 612. In this exemplary case, surfaces to the right-hand side of the view frustum 602 will undergo incursion into the rotating frustum at a first region 606, whereas surfaces near the left-hand extreme of the view frustum 602 at the first region 606 will exit the frustum 602 during frustum rotation. In the exemplary case shown in FIG. 6, those surfaces in the first region 606 have been in the frustum 602 for between 750 ms and 1000 ms as a consequence of exposure via the second region 608, the third region 610 and the fourth region 612 during the rotation. In the second region 608, for example, the surfaces have been in the frustum 602 for between 500 ms and 750 ms; in the third region 610, the surfaces have been in the frustum 602 for between 250 ms and 500 ms; and in the fourth region 612, the surfaces have been in the frustum 602 for between 0 ms and 250 ms. Surfaces that have been in the frustum 602 for only a brief period of time have also been exposed to the graphical display in communication with the client device 108 for a concomitantly brief period of time FIG. 7 is an exemplary illustration of a server representation of client viewpoint position and orientation 700, according to certain aspects. In certain aspects of the present disclosure, placing reasonable limits on the current viewpoint 702 and the viewpoint at the second location 706 enhances the predictability of the navigation. The limits can also decrease the area and/or volume of the predicted pursuit path of navigation 710. The reasonable limits on locomotive performance can significantly decrease the transmission bandwidth requirement for visibility event packet streaming. In some aspects, the reduce transmission bandwidth requirement is used to transmit higher level-of-detail representations of newly visible surfaces, in the field of view, that are precisely under conditions when the user can perceive additional details via the graphical display in communication with the client device 108.

The server representation of client viewpoint position and orientation 700 describes a pursuit path camera model in which the area and/or volume of navigational prediction collapses to a precise navigational pursuit path. The server representation of client viewpoint position and orientation 700 includes a current viewpoint 702, a current frustum 704, the viewpoint at a second location 706, a second frustum 708, a pursuit path of navigation 710, deterministic prefetch 712, a future viewpoint 714, a future frustum 716, and probabilistic prefetch 718. The current viewpoint 702 follows a navigation path indicated by a future viewpoint 714. In certain aspects of the present disclosure, the current viewpoint 702 follows two seconds behind a future viewpoint 714, which is controlled by a user. The current viewpoint 702 can provide a first frustum 704 which indicates the field of view via the camera model of the current viewpoint 702.

As commands are determined by the circuitry of the server 106, via the reception of inputs from the input device 104, the circuitry modifies the position of the future viewpoint 714 directly. The current viewpoint 702 can change location as a result of the movement of the future viewpoint 714. For example, the current viewpoint 702 can move along a pursuit path 710 towards a second viewpoint 706. The viewpoint at the second location 706 can include a second frustum 708 in which the field of via the camera model of the viewpoint at the second location 706 is processed. In some aspects, the fields of view are processed by the circuitry of the server 106 to be displayed via the graphical display in communication with the client device 108.

The current viewpoint 702, the viewpoint at the second location 706 and the future viewpoint 714 travel along the pursuit path 710, which corresponds to the commands received by the circuitry of the server 106. Additionally, the circuitry can be configured to pre-signal navigational intent with respect to the location modification of the future viewpoint 714. The server representation of client viewpoint position and orientation 700 can predict navigational intent with minute uncertainty, such as 166 milliseconds. The low value of uncertainty allows network latency to be concealed in which camera motion can be anticipated through the processing of the predicted pursuit path corresponding to the modification of the future viewpoint 714.

The position and orientation of the future viewpoint 702 is known to the server 106 with dilution of precision that reflects the 166 ms RTT between the client device 108 and the server 106. The circuitry of the server 106 can determine the position and orientation of the future viewpoint to within ½*RTT, however, any visibility event packet transmitted from the server 106 to the client device 108 will be delayed an additional ½*RTT, making the effective precision bounds limited to RTT. Consistent with certain aspects of the present disclosure, it is assumed that the dilution of precision is determined by the full RTT.

In some aspects, the circuitry of the server 106 determines representations of the future viewpoint 714 and transmits the representations to the client device 108. The representations can be less than RTT old (time elapsed from the current time) and have a dilution of precision that is a function of (RTT−elapsed time). The server 106 representation of the future viewpoint 714 includes a future frustum 716 and corresponding probabilistic prefetch 718 which can be utilized to determine a predictive path of uncertainty. This predictive path of uncertainty utilizes the probabilistic prefetch 718 in which the future viewpoint 714 position and orientation states less than RTT time has elapsed from the current time is shown as a dashed trajectory with a future frustum 716, otherwise referred to as a superimposed navigational cone of uncertainty, reflecting the server's 106 effective uncertainty of position/orientation of the future viewpoint 714.

As such, when the RTT exceeds the elapsed time, then the server's 106 representation of the current viewpoint 702 is undiluted by the RTT uncertainty, and the server's 106 representation of the deterministic prefetch 712 portion of the pursuit path 710 can be represented by the server 106 as a space curve with a specific view direction vector for each viewpoint on the space curve.

As limits are placed on the current viewpoint 702 and the viewpoint at the second location 706, the predictability of navigation is enhanced. The area and/or volume of the corresponding current frustum 704 and the second frustum 708 is then decreased. The decrease in area and/or volume of the current frustum 704 and the second frustum 708 further places limits onto the predicted pursuit path of navigation 710, effectively decreasing the bandwidth required for visibility event packet streaming.

Additionally, the predicted pursuit path 710 can be utilized to defer the transmission of significant portions of the visibility event packets. The visibility event protocol defined by a navigation driven predictive prefetch of precomputed visibility event packets is an incremental and progressive method of streaming content. In some aspects of the present disclosure, a series of partial and/or deferred visibility event packets that reflect predicted sequences of viewcell-to-viewcell boundaries are processed via the circuitry of the server 106. As such, runtime conservative culling methods are employed in which some parts of a particular visibility event packet, corresponding to a first viewcell boundary, may go untransmitted, even as the viewpoint penetrates later transited viewcell boundaries.

Figure 8A:
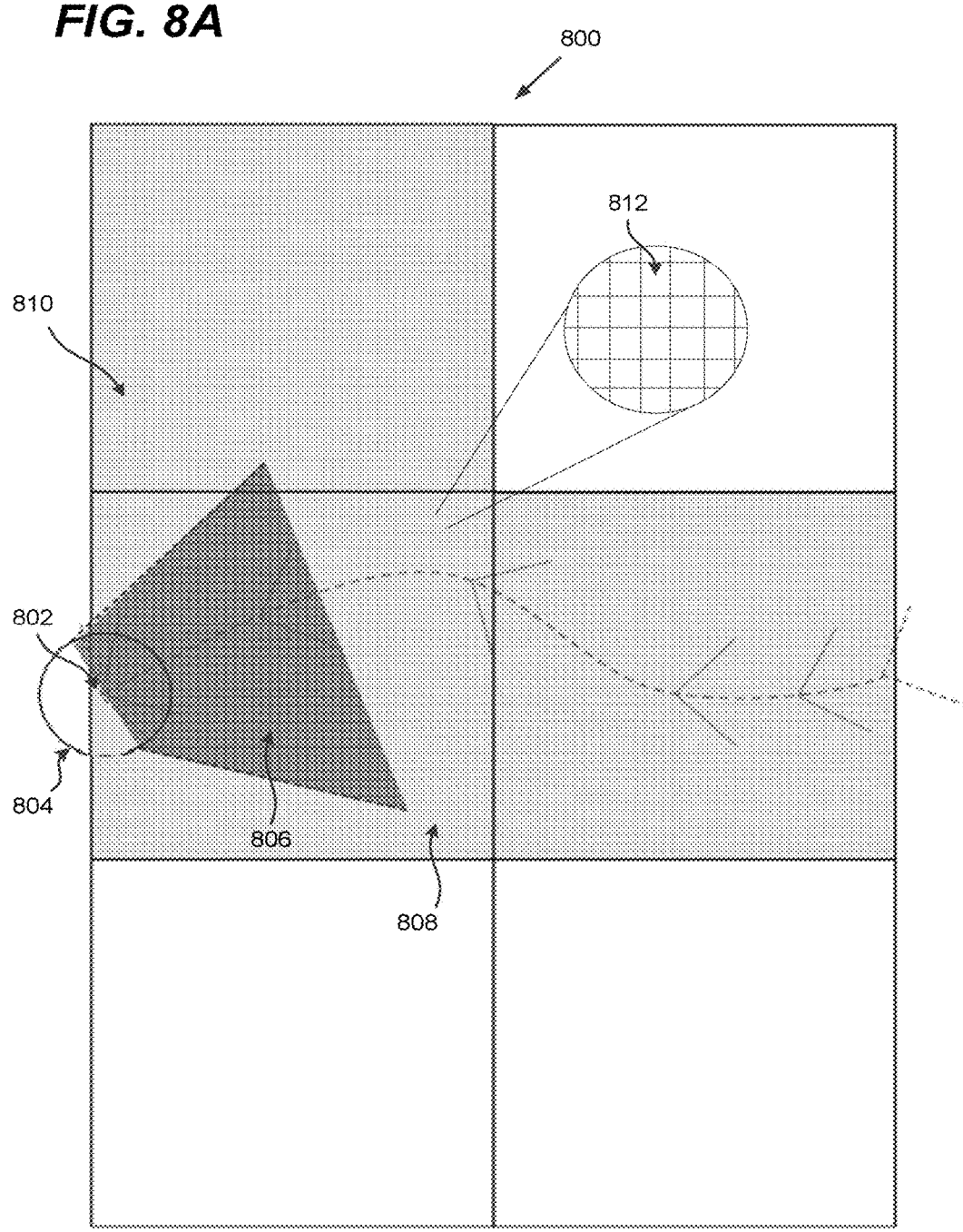
FIG. 8A is an exemplary illustration of a predictive prefetch pursuit path from a first viewcell without camera model navigation prediction, according to certain aspects.

FIG. 8A is an exemplary illustration of a predictive prefetch pursuit path from a first viewcell without camera model navigation prediction 800, according to certain aspects. The predictive prefetch pursuit path without camera model navigation prediction 800 describes the first stage of a server-side navigation prediction during an exemplary ground-constrained navigation. The predictive prefetch pursuit path without camera model navigation prediction 800 can include a current viewpoint 802, an area of location uncertainty 804, a navigation prediction region 806, a first viewcell 808, a second viewcell 810, and a visibility event packet 812. The current viewpoint 802 follows a navigation path indicated by a future viewpoint. In certain aspects of the present disclosure, the current viewpoint 802 follows two seconds behind a future viewpoint, which is controlled by a user.

An area of location uncertainty 804 surrounds the current viewpoint 802 and includes a radius corresponding to the network latency. As such, greater network latency can yield a greater area of location uncertainty 804 and vice-versa. The navigation prediction region 806 includes a region in which the circuitry predicts possible pursuit paths. In some aspects, the navigation prediction region 806 can include a function of the locomotive performance of the viewpoint and the network latency.

The navigation prediction region 806 can be utilized to indicate viewcells the pursuit path may pass through. In certain aspects, the viewcells of the navigation prediction region 806 indicates which viewcells will be included in the prefetch. In FIG. 8A, at the current viewpoint 802, the navigation prediction region 806 is located in a first viewcell 808 and a second viewcell 810. The first viewcell 808 and the second viewcell 810 each include event visibility packets 812. In this instance, a plurality of visibility event packets 812 can be included in each viewcell.

Figure 8B:
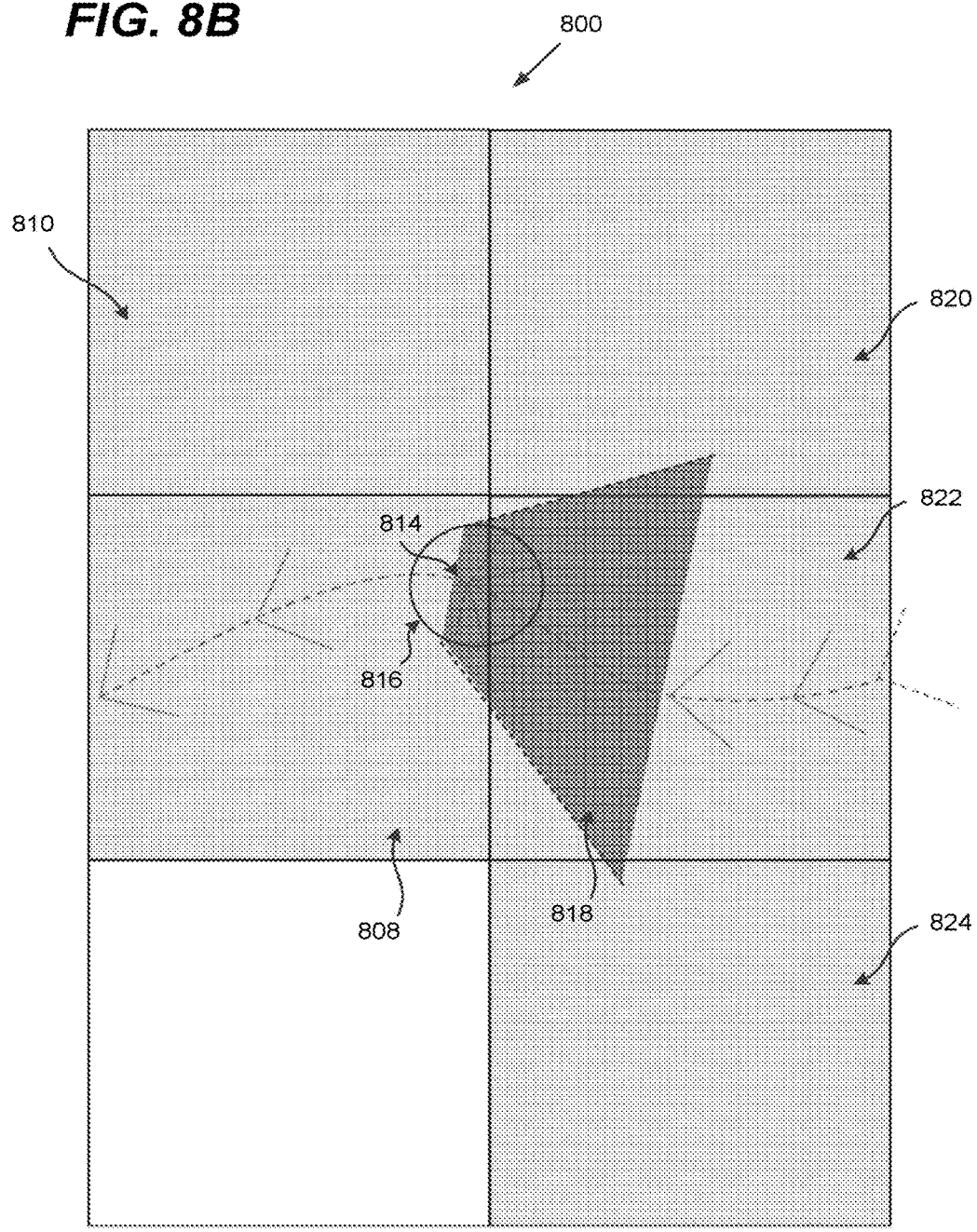
FIG. 8B is an exemplary illustration of a predictive prefetch pursuit path from a second viewcell without camera model navigation prediction, according to certain aspects.

FIG. 8B is an exemplary illustration of a predictive prefetch pursuit path from a second viewcell without camera model navigation prediction 800, according to certain aspects. The predictive prefetch pursuit path without camera model navigation prediction 800 describes the second stage of a server-side navigation prediction during the exemplary ground-constrained navigation. The predictive prefetch pursuit path without camera model navigation prediction 800 can include a viewpoint at a second location 814, an area of location uncertainty 816, a navigation prediction region 818, a first viewcell 808, a second viewcell 810, a third viewcell 820, a fourth viewcell 822, and a fifth viewcell 824. The viewpoint at the second location 814 follows a navigation path indicated by a future viewpoint. The viewpoint at the second location 814 is located along the same navigation path as the current viewpoint 802. In certain aspects of the present disclosure, the viewpoint at the second location 814 follows two seconds behind a future viewpoint, which is controlled by a user.

The area of location uncertainty 816 surrounds the viewpoint at a second location 814 and includes a radius corresponding to the network latency. The navigation prediction region 818 includes a region in which the circuitry predicts possible pursuit paths of the future viewpoint and the current viewpoint. The navigation prediction region 818 can be utilized to indicate viewcells the pursuit path may pass through. In certain aspects, the viewcells of the navigation prediction region 818 indicates which viewcells will be included in the prefetch.

In FIG. 8B, at the second viewpoint location 814, the navigation prediction region 818 is located in the first viewcell 808, a third viewcell 820, a fourth viewcell 822, and a fifth viewcell 824. Further, as FIG. 8B represents the second stage of a server-side navigation prediction during ground constrained navigation, the viewcells of FIG. 8A are also included in the processing of the predictive prefetch pursuit path without camera model navigation prediction 800. Thus, the first viewcell 808, the second viewcell 810, the third viewcell 820, the fourth viewcell 822, and the fifth viewcell 824 sum together to form the regions included in the prefetch of the predictive prefetch pursuit path without camera model navigation prediction 800. In this instance, five viewcells and the corresponding visibility event packets of each may be included in the prefetch region of the desired pursuit path of navigation.

Figure 9:
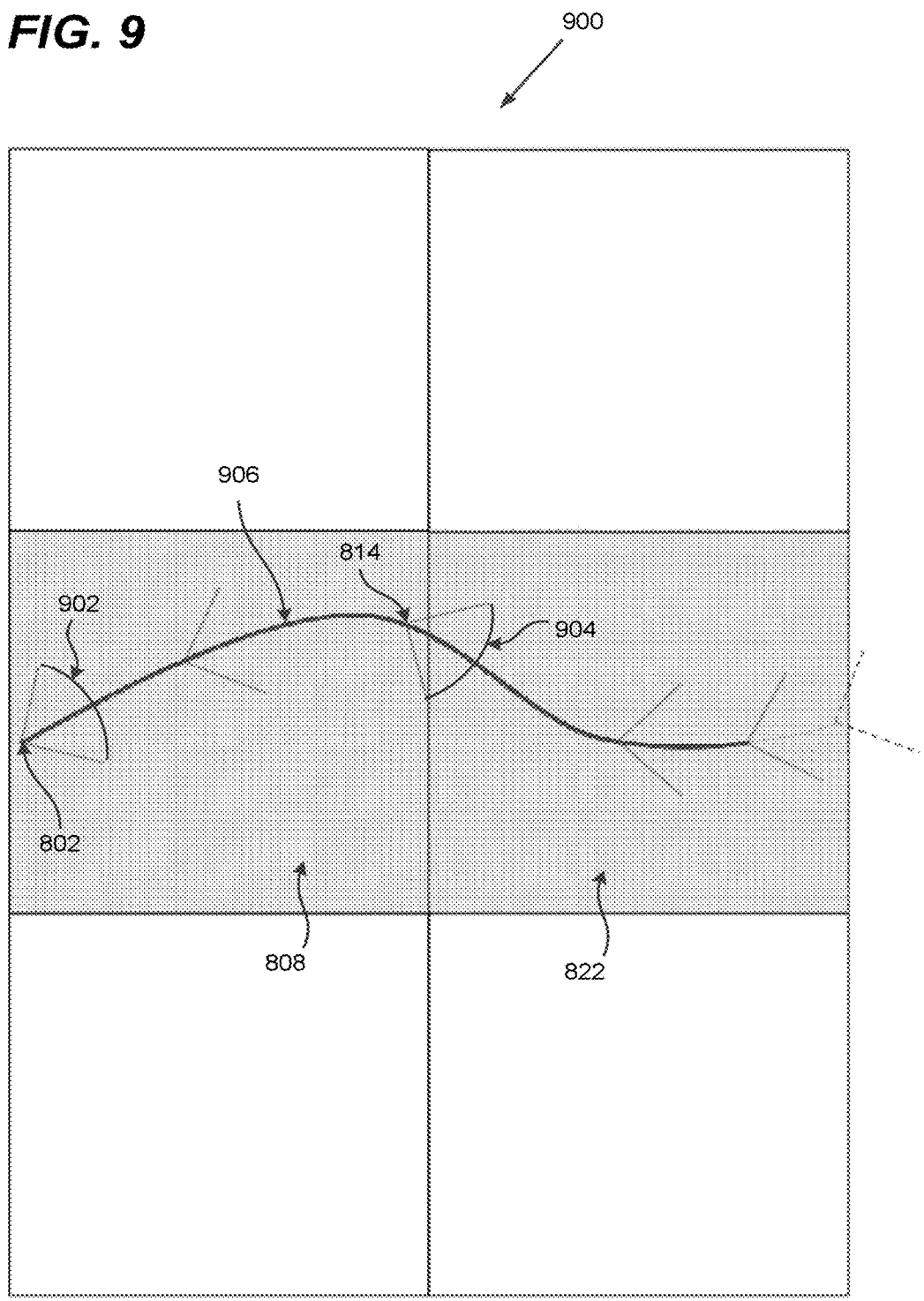
FIG. 9 is an exemplary illustration of a predictive prefetch pursuit path from a first viewcell to a second viewcell with camera model navigation prediction, according to certain aspects.

FIG. 9 is an exemplary illustration of a predictive prefetch pursuit path from a first viewcell to a second viewcell with camera model navigation prediction 900, according to certain aspects. The predictive prefetch pursuit path with camera model navigation prediction 900 describes a server-side navigation prediction during an exemplary ground-constrained navigation utilizing camera model navigation prediction. Further, the predictive prefetch pursuit path with camera model navigation prediction 900 describes the utilization of the camera model navigation prediction to collapse the prefetch region of FIGS. 8A and 8B including five viewcells and the corresponding visibility event packets of each. The predictive prefetch pursuit path with camera model navigation prediction 900 can include a current viewpoint 802, a viewpoint at a second location 814, a first viewcell 808, a fourth viewcell 822, a first frustum 902, a second frustum 904, and a pursuit path of navigation 906.

The viewpoint at the first location 802 follows a navigation path indicated by a future viewpoint. In certain aspects of the present disclosure, the current viewpoint 802 follows two seconds behind the future viewpoint that is controlled by a user. The current viewpoint 802 can provide a first frustum 902, which indicates the field of view via the camera model of the current viewpoint 802. The current viewpoint 802 can move along the navigation path towards a second location. The viewpoint at the second location 814 can include a second frustum 904 in which the field of via the camera model of the viewpoint at the second location 814 is processed. In some aspects, the fields of view are processed by the circuitry of the server 106 to be displayed via the graphical display in communication with the client device 108.

The pursuit path of navigation 906 can be utilized to indicate viewcells which may be accessed by the circuitry of the server 106. In certain aspects, the viewcells of the pursuit path of navigation 906 indicate which viewcells will be included in the predictive prefetch. At the current viewpoint 802, the pursuit path of navigation 906 is located in a first viewcell 808. At the second viewpoint location 814, the pursuit path of navigation 906 is located in the first viewcell 808 and the fourth viewcell 822. The first viewcell 808 and the fourth viewcell 822 each include event visibility event packets. In this instance, a plurality of visibility event packets 812 can be included in each viewcell.

The predictive prefetch pursuit path with camera model navigation prediction 900 collapses the prefetch region of FIGS. 8A and 8B, including five viewcells, to a predictive prefetch region including only two viewcells. As such, FIG. 9 includes a predictive prefetch region that collapses the area and/or the volume of the navigational prediction to a precise navigational path that spans a smaller number prefetch regions including a smaller number of viewcells and corresponding visibility event packets.

Figure 10:
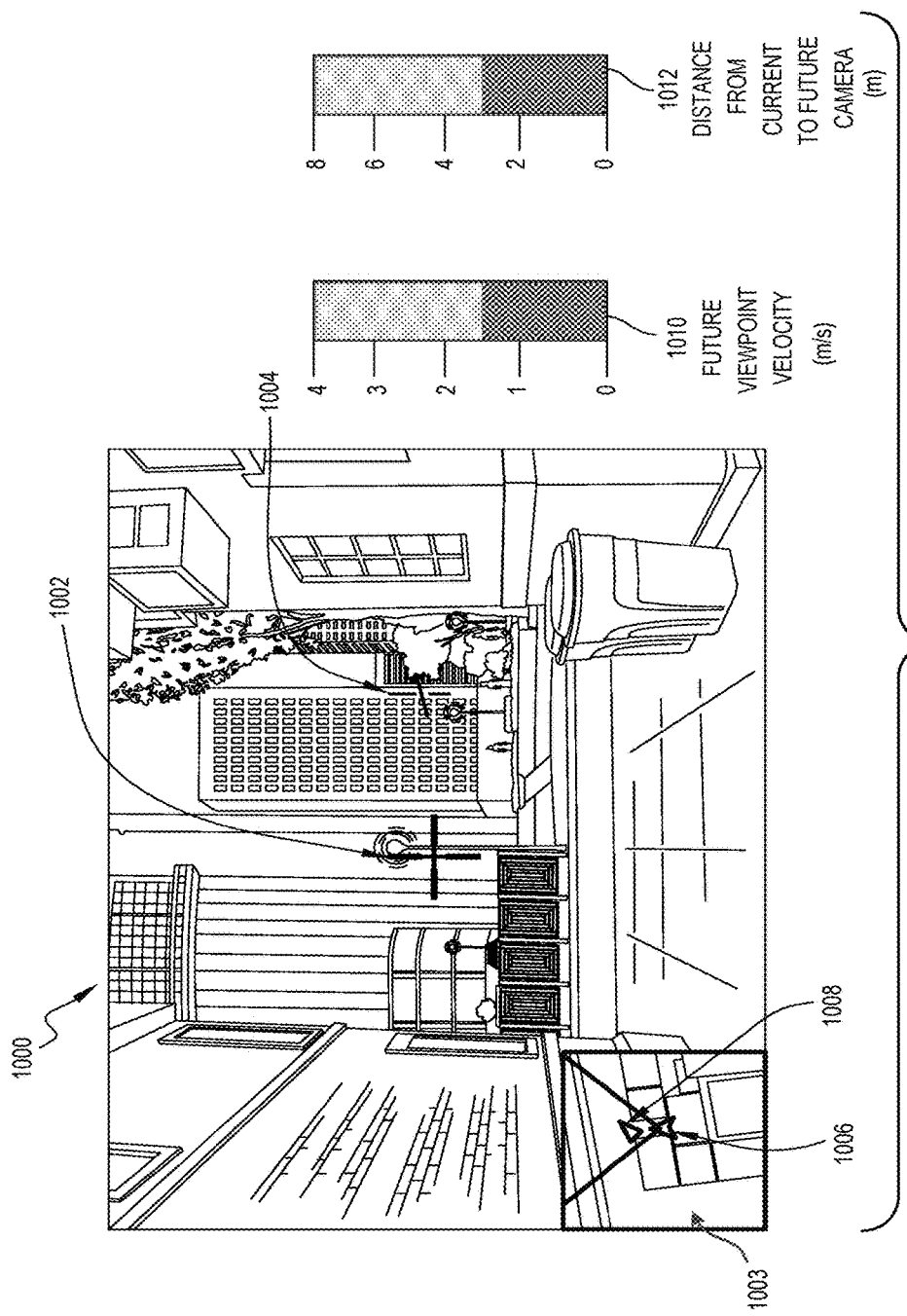
FIG. 10 is an exemplary illustration of an on-screen representation of a future viewpoint as viewed from within a perspective 3D environment, computed from the current viewpoint position and orientation, according to certain aspects.

FIG. 10 is an exemplary illustration of an on-screen representation of a future viewpoint as viewed from within a perspective 3D environment 1000, according to certain aspects. The on-screen representation of the future viewpoint as seen from the image computed from the current viewpoint position and orientation 1000 can include a current viewpoint 1002 and a future viewpoint 1004. In certain aspects, the future viewpoint 1004 is depicted as a set of two axes, one axis indicating vertical and the other indicating the direction of motion of the future viewpoint 1004. In some aspects, the direction of motion of the future viewpoint 1004 can correspond to the view direction of the current viewpoint 1002. As described herein, the future viewpoint 1004 may be under real-time control of the user via an input device 104 in communication with a client device 108.

The rendered image depicted in FIG. 10 is viewed from within a perspective 3D environment, as generated by the circuitry of the server 106 and rendered on the client device 108 using the current viewpoint 1002 position and orientation. The current viewpoint 1002 that is used to generate the image is identical to the future viewpoint 1004 position and orientation determined by real-time input of the client user 2000 ms ago. That is, using the exemplary imposed delay of 2000 ms, the values of position and orientation for the future viewpoint 1004 position that were determined by real-time input via the input device 104 in communication with the client device 108 2000 ms ago, are now used as the values of the current viewpoint 1002 position and orientation to compute the current image.

The central crosshair or reticle 1002 in FIG. 10 corresponds to a reticle representation of the current viewpoint position and reflects a first-person view projection center obtained using the viewpoint position and view direction vector that was input by the user via the input device 104 in communication with the client device 108 2000 ms ago.

Thus, in exemplary aspects, the user maintains responsive real-time control over the future viewpoint 1004 and the first-person like image is computed from the current viewpoint 1002, which is determined from the future viewpoint 1004 and a suitable fixed or variable delay.

In exemplary aspects, the future viewpoint 1004 may be depicted as a graphical axial type structure in a heads up display manner as shown in FIG. 10. In certain aspects, the depiction of the future viewpoint 1004 is as a physical device such as a scout drone, or probe moving ahead of the current viewpoint 1002.

FIG. 10 also shows an inset HUD map representation 1003 in the lower left hand corner of the image which depicts the location and orientation of the current viewpoint 1006 (unhatched arrow) and the location and orientation of the future viewpoint 1008 (hatched arrow).

FIG. 10 also depicts a bar graph with bars indicating the current velocity of the future viewpoint 1010 and the current distance from the future viewpoint to the current viewpoint 1012.

Figure 11:
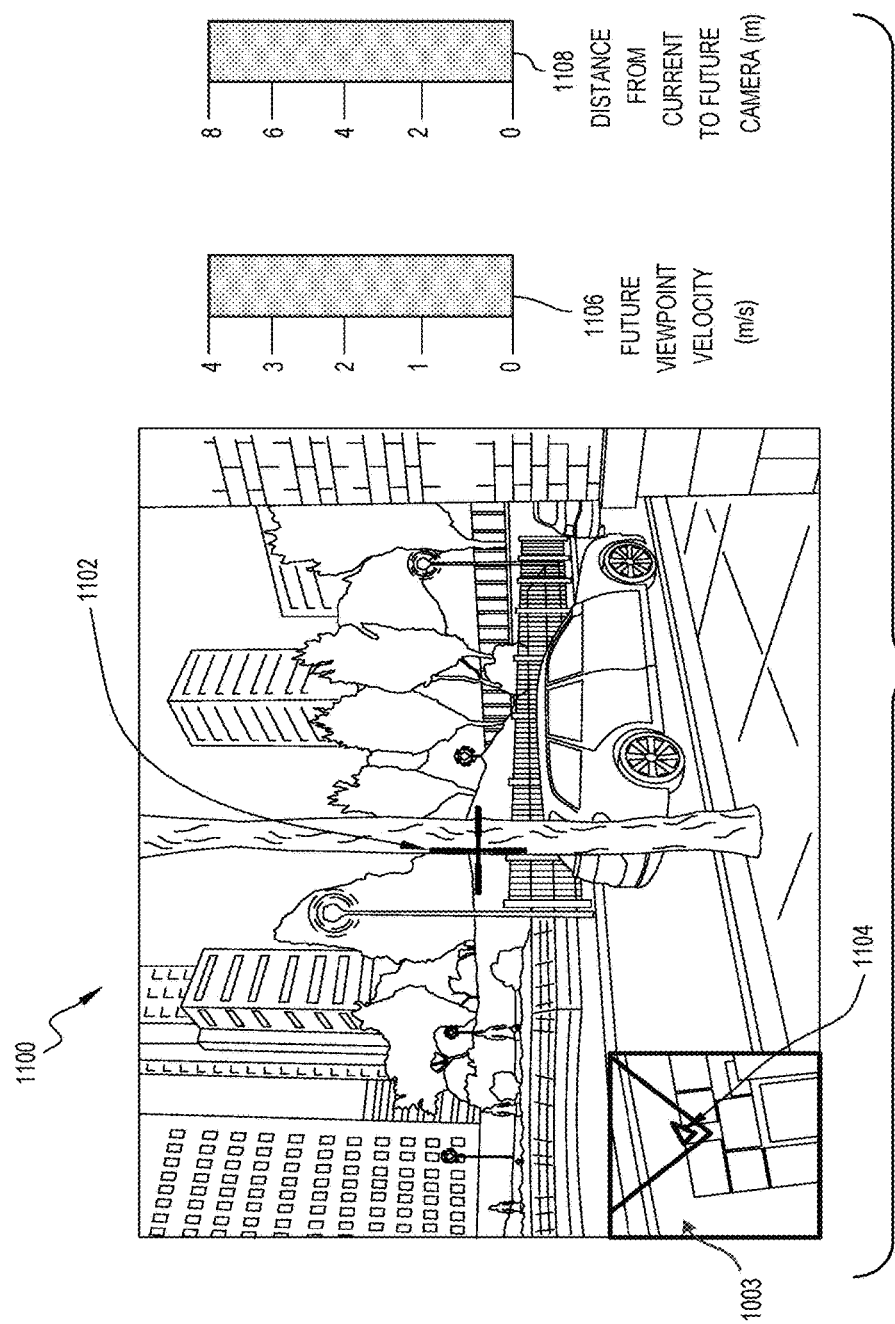
FIG. 11 is an exemplary illustration of a perspective image, according to certain aspects.

FIG. 11 is an exemplary illustration of a perspective image 1100, according to certain aspects. The perspective image 1100 is generated on the client device 108 using the viewpoint and view direction values of the future viewpoint 1004 shown in FIG. 10. In FIG. 10, the future viewpoint 1004 is controlled in real-time by the user via the input device 104 in communication with the client device 108, and the image is generated using the viewpoint and view direction vector values of the future viewpoint 1004 that had been under real-time control of the user 2000 ms ago. FIG. 11 illustrates the same modeled environment as that depicted in FIG. 10, but at a time 2000 ms later than shown in FIG. 10. In the exemplary aspect shown in FIG. 11, the user has stopped the future viewpoint 2000 ms before (e.g., at the time corresponding to FIG. 10). Once the future viewpoint is stopped in real-time by the user, then the current viewpoint follows the pursuit path until it is congruent with the future viewpoint 1102. In certain aspects, the time that it would take for the current viewpoint to catch up to the future viewpoint along the pursuit path is equal to the imposed delay, which in this example is 2000 ms.

In FIG. 11, the axes representing the future viewpoint become superimposed on the crosshair representing the current viewpoint 1102 used to compute the image, once the current viewpoint drifts to the location of the future viewpoint and comes to a stop. FIG. 11 also illustrates two bar graphs which indicate that at the illustrated time, the future viewpoint has come to a stop 1106 and that the distance between the future viewpoint and the current client viewpoint has become zero 1108. In other words, both the future viewpoint and the current viewpoint have come to a stop. FIG. 11 also illustrates a HUD top-down map 1103 showing that the graphical representation of the future viewpoint (hatched) is superimposed over the current viewpoint 1104.

Figure 12:
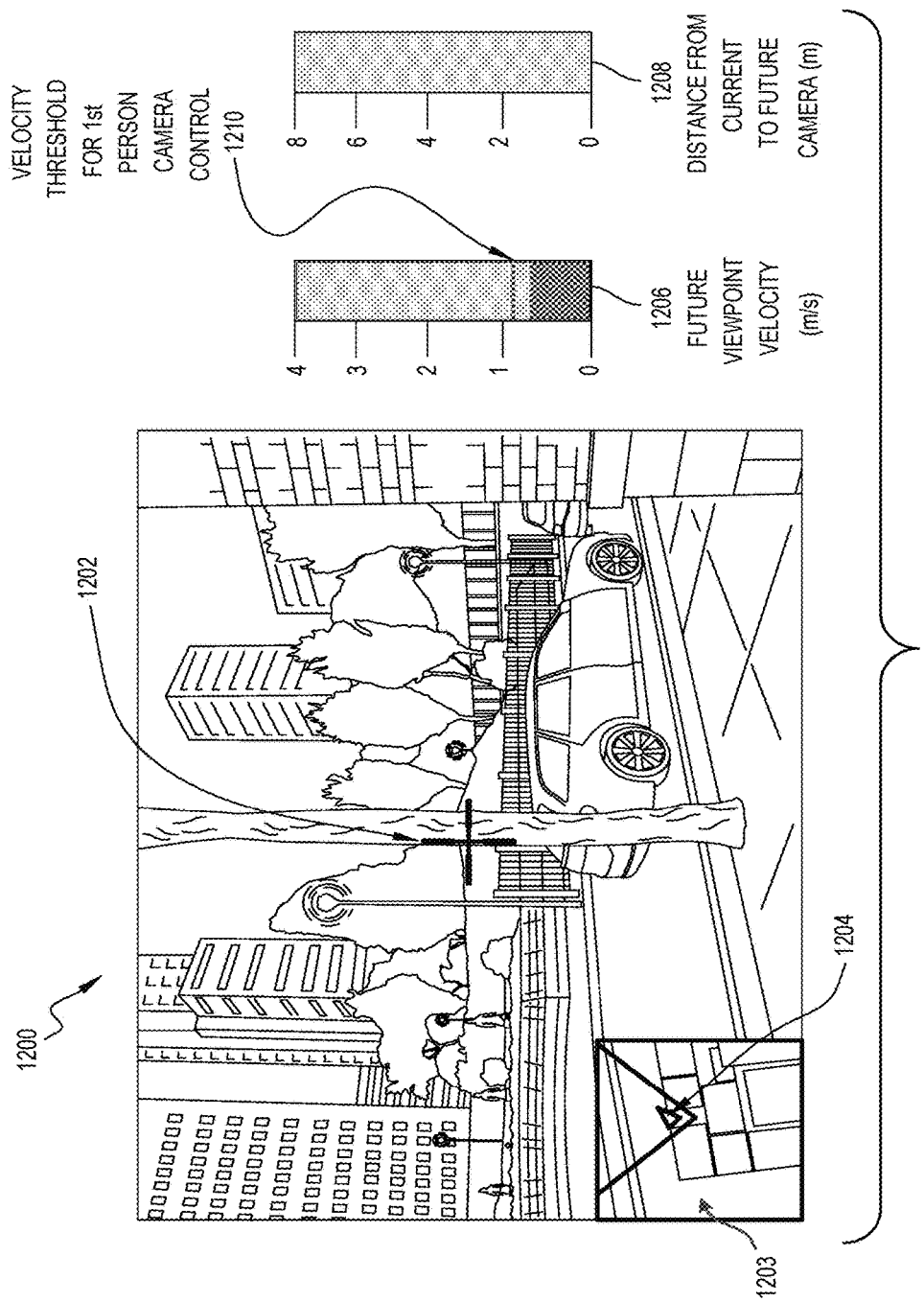
FIG. 12 is an exemplary illustration of a perspective image, according to certain aspects.

FIG. 12 is an exemplary illustration of a perspective image 1200, according to certain aspects. FIG. 12 shows the same modeled environment as that depicted in FIG. 11, although at a time that is shortly after the time shown in FIG. 11. At this time, the user has accelerated the future viewpoint via an input device 104 in communication with a client device 108 from the stop condition shown in FIG. 11 to a low velocity, which in this example is less than one meter per second. In the exemplary aspect shown in FIG. 12, at low camera velocities the pursuit path camera model system employs a normal first-person camera model with no imposed delay between the real-time controlled future viewpoint and the current viewpoint 1202 used to determine the image. As such, the current viewpoint is under real-time control of the user, without an imposed delay. At low velocities, there is less dilution of precision of the current viewpoint as known by the server 106 for any RTT latency between the server 106 and the client device 108. Under these conditions, a normal first-person camera under real-time control can be employed without incurring a large increase in bandwidth requirement.

FIG. 12 also illustrates two bar graphs which indicate that at the illustrated time, the future viewpoint has been accelerated to a nonzero velocity 1206 that is below a velocity threshold for first-person camera control 1210. As such, the distance between the future viewpoint and the current client viewpoint remains at zero 1208. FIG. 12 further illustrates a HUD top-down map 1203 showing that the graphical representation of the future viewpoint (hatched) is superimposed over the current viewpoint 1204. In exemplary aspects, at higher camera velocities the real-time controlled camera is separated from the current camera used to generate the view, and the real-time controlled camera becomes the future viewpoint.

Figure 13:
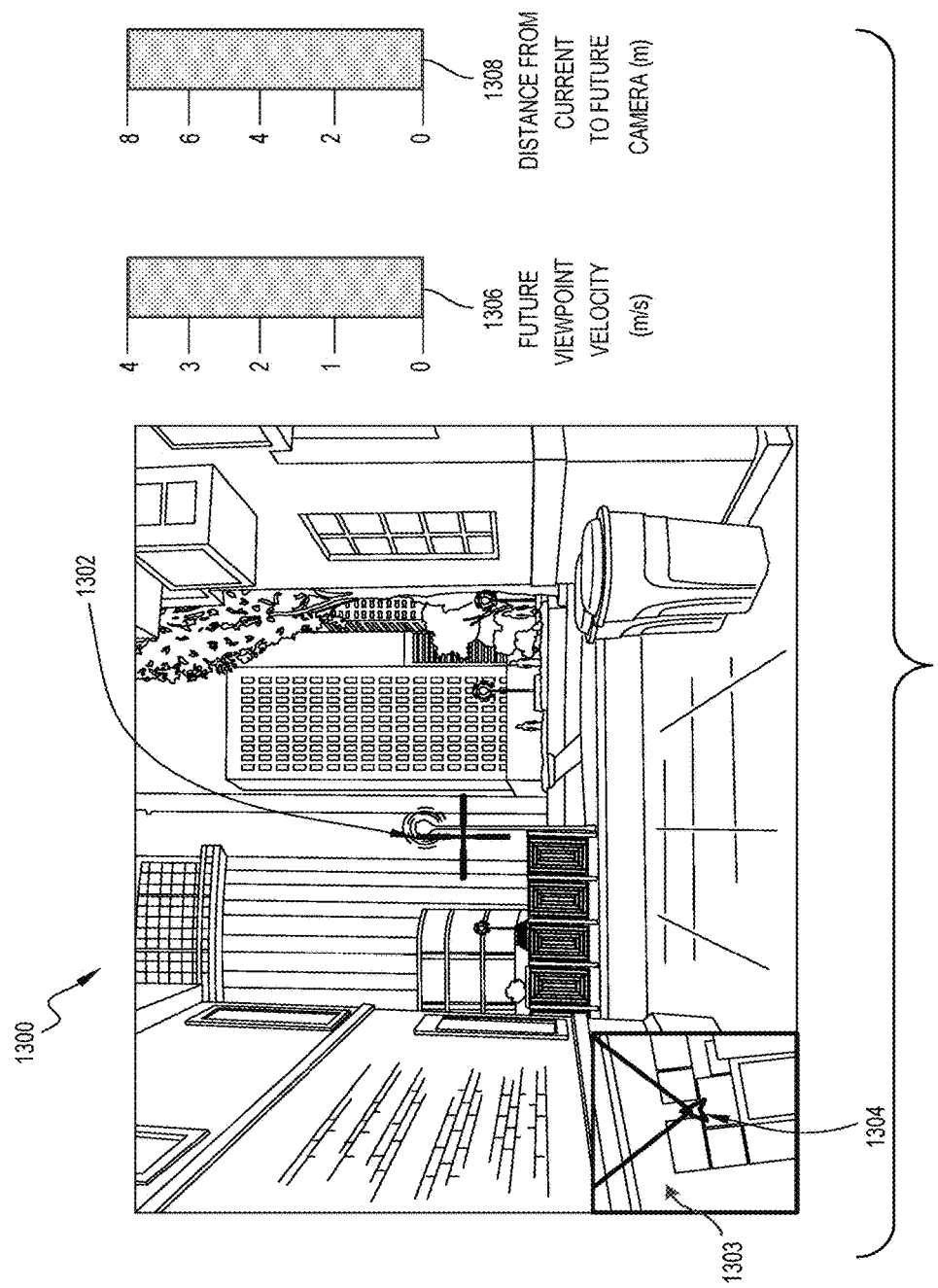
FIG. 13 is an exemplary illustration of a perspective image, according to certain aspects.

FIG. 13 is an exemplary illustration of a perspective image 1300, according to certain aspects. FIG. 13 is a perspective image showing a current viewpoint in which the user has indicated a braking input to control the future viewpoint via the input device 104 in communication with the client device 108. In exemplary aspects, a braking input (for a fast reverse indication input to a joystick) immediately stops the current viewpoint. As such, the braking indication that is input by the user rapidly or immediately gives the user real-time control of the current viewpoint, making the current viewpoint stop. In exemplary aspects, the future viewpoint then moves to the location of the current viewpoint (for example by moving backwards along the pursuit path space curve represented by recorded values of the future viewpoint) until the future viewpoint is congruent with the current viewpoint 1302. FIG. 13 illustrates this exemplary aspect at the time that the future viewpoint reticle representation becomes congruent to the current viewpoint represented by the crosshair 1302. FIG. 13 also illustrates a top-down HUD map 1303 showing that the future viewpoint (hatched triangle in lower left HUD map) is superimposed over the current viewpoint 1304. The bar graph of FIG. 13 indicates that the future viewpoint has stopped 1306 and the current viewpoint has stopped, yielding a velocity of zero for each, and that no separation exists between the current viewpoint and the future viewpoint 1308.

Figure 14:
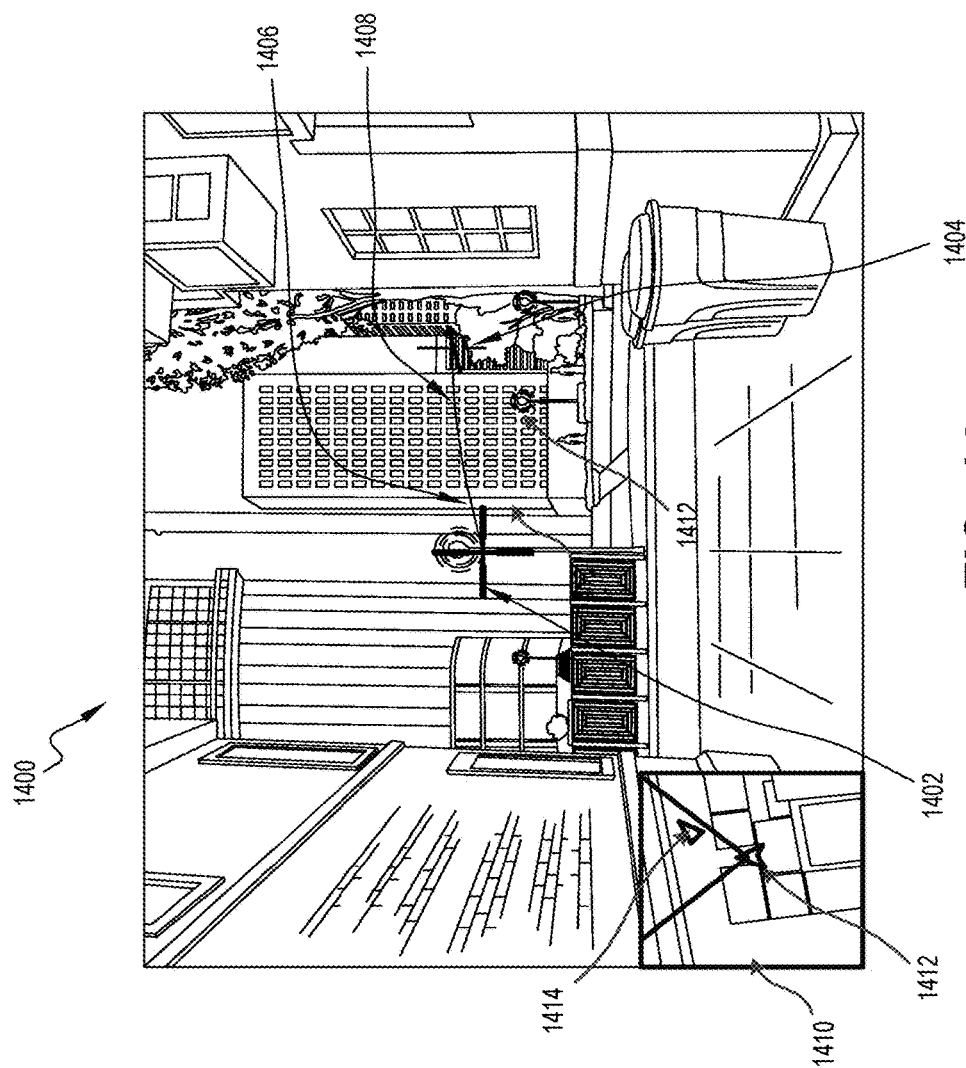
FIG. 14 is an exemplary illustration of a perspective image, according to certain aspects.

FIG. 14 is an exemplary illustration of a perspective image 1400, according to certain aspects. As such, FIG. 14 illustrates a perspective image generated from the viewpoint and view direction vector of the same current viewpoint as shown in FIG. 12. FIG. 14 further illustrates a pursuit path (the path along which the current viewpoint 1402 is set to move) that is segmented into two portions. The first portion illustrates a safe portion 1406, and the second portion corresponds to a threat portion 1408 of the pursuit path in which the circuitry of the server 106 has determined a high threat to be present. This threat portion 1408 is labeled "threat portion of pursuit path" and is indicated by a dashed line trajectory. In certain aspects of the present disclosure, this threat portion 1408 of the pursuit path may be indicated using alternate coloration or be given other visual emphasis. This visual indicator can warn the user to slow the future viewpoint 1404 so that the current viewpoint 1402 does not proceed to the threat portion 1408 of the pursuit path, instead proceeding to the safe portion 1406 of the pursuit path. In certain aspects of the present disclosure, the methods of pursuit path camera model navigation can display the graphical representation of the future viewpoint 1404 as an actual scout drone, vehicle, or robot, which is being controlled to sense danger ahead, or to engage threats ahead of the user at their current viewpoint 1402 location.

FIG. 14 also shows an inset HUD map representation 1410 in the lower left hand corner of the image which depicts the location and orientation of the current viewpoint 1412 (unhatched arrow) and the location and orientation of the future viewpoint 1414 (hatched arrow).

Figure 15:
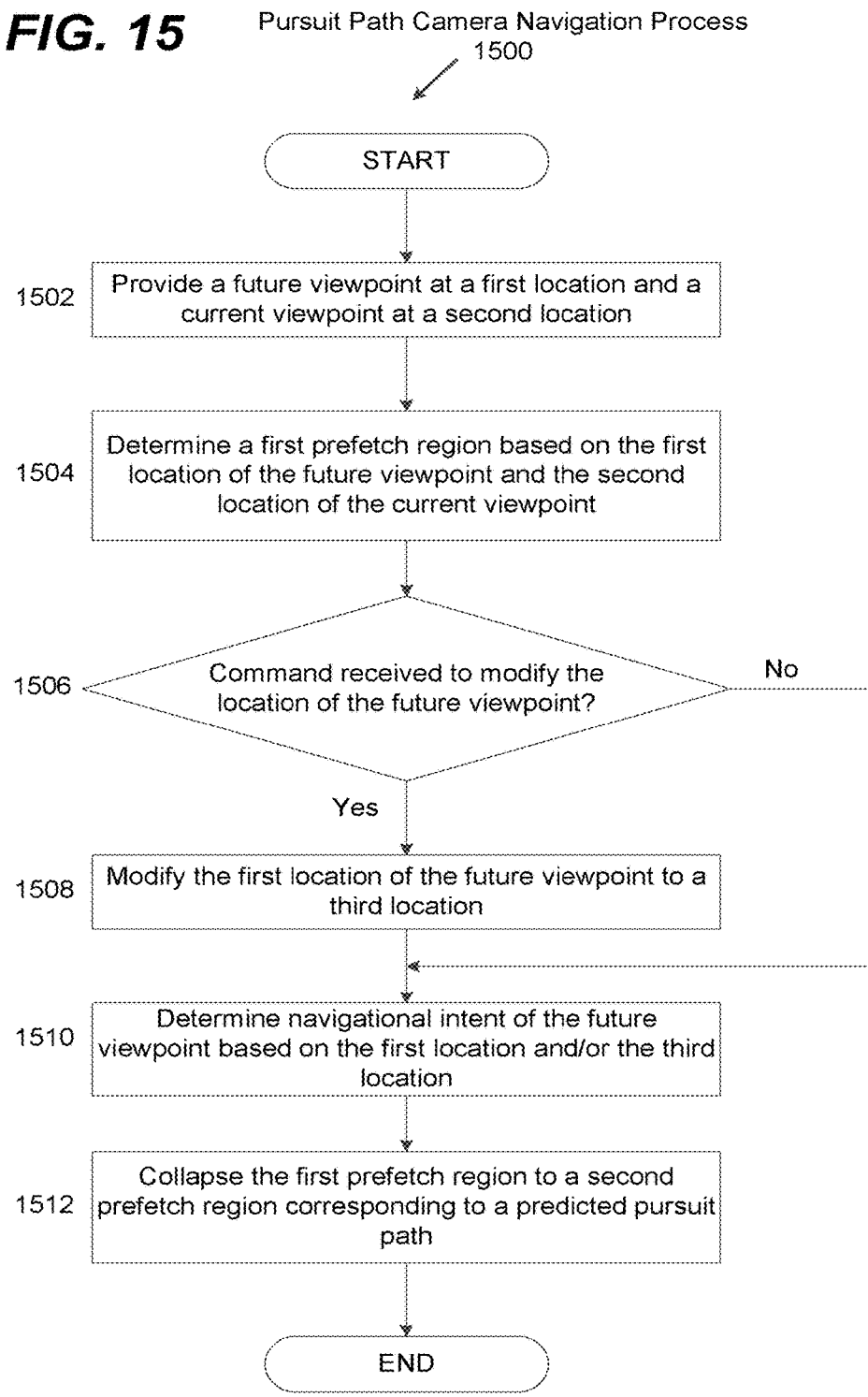
FIG. 15 is an algorithmic flowchart of a server representation of a client viewpoint position and orientation process, according to certain exemplary aspects.

FIG. 15 is an algorithmic flowchart of a server representation of a client viewpoint position and orientation process 1500, according to certain exemplary aspects. The server representation of client viewpoint position and orientation process 1500 describes camera navigation model including a current viewpoint and a future viewpoint in which the control of the current viewpoint and the future viewpoint is utilized to determine a predicted path of navigation. At step 1502, the circuitry of the server 106 can be configured to provide a future viewpoint at a first location and a current viewpoint at a second location. The future viewpoint can include one or more future viewpoints and can also be referred to as a reticle, a probe, an avatar, a future camera, a scout camera, a probe camera, a third person camera, and the like. The current viewpoint can include one or more viewpoints and can also be referred to as a current view direction, a camera view, an actual viewpoint, an actual camera, a current camera, a first person camera, and the like.

At step 1504, the circuitry can be configured to determine a first prefetch region based on the first location of the future viewpoint and the second location the current viewpoint. The first prefetch region can include viewcells and visibility event packets corresponding to the viewcells based on the first location of the future viewpoint and the second location of the current viewpoint. The first prefetch region can also include an area and/or a volume based on the locations of the future viewpoint and the current viewpoint. The first prefetch region can further include a region that is stored in memory of the server 106 and accessed by the circuitry of the server 106, prior to the processing and/or rendering of the region at the client device 108.

At step 1506, a determination is made of whether a command has been received by the circuitry to modify the location of the future viewpoint. The command can correspond to one or more inputs transmitted by an input device 104 in communication with a client device 108 to be received by the circuitry of the server 106. The commands can provide local control of the future viewpoint and can include commands such as braking, coasting, acceleration and the like. If the circuitry has received a command to modify the location of the future viewpoint, resulting in a "yes" at step 1506, the pursuit path camera navigation process 1500 proceeds to step 1508. Otherwise, if the circuitry has not received a command to modify the location of the future viewpoint, resulting in a "no" at step 1506, the pursuit path camera navigation process 1500 proceeds to step 1510.

At step 1508, the circuitry can be configured to modify the first location of the future viewpoint to a third location. The circuitry can further be configured to receive commands to modify the location of the future viewpoint at a particular velocity. For example, the camera model can be adapted at intermediate velocities including jog velocities for dismounted navigation in close quarters, moderate driving velocities, and the like. In some aspects, at low velocities, such as 1 meter per second, the future viewpoint can be superimposed upon the position of the current viewpoint. In this instance, a normal first-person camera model is used. In certain aspects of the present disclosure, the current viewpoint can be configured to follow the location of the future viewpoint. As such, the commands provide direct control of the future viewpoint location and indirect control of the current viewpoint location.

At step 1510, the circuitry can be configured to determine navigational intent of the future viewpoint, based on the first location and/or the third location of the future viewpoint. For example, the command of braking can include an immediate deceleration of the future viewpoint in response to the joystick being pulled backwards. In another example, the command of acceleration can include an immediate acceleration of the future viewpoint in response to the joystick being moved in the forwards direction. In another example, the command of coasting can include the current viewpoint coasting towards the location of the future viewpoint as a result of the joystick being moved to a neutral position.

At step 1512, the circuitry can be configured to collapse the first prefetch region to a second prefetch region corresponding to a pursuit path that is predicted using camera model navigation. The second prefetch region can correspond to a predicted pursuit path based on the navigational intent determined via the circuitry of the server 106. In collapsing the area and/or volume of the first prefetch region to a second prefetch region including a precise, navigational path, the pursuit path camera model navigation system 100 can utilize path prediction to promote the reduction of network latency enable the reduction of bandwidth requirements.

Figure 16:
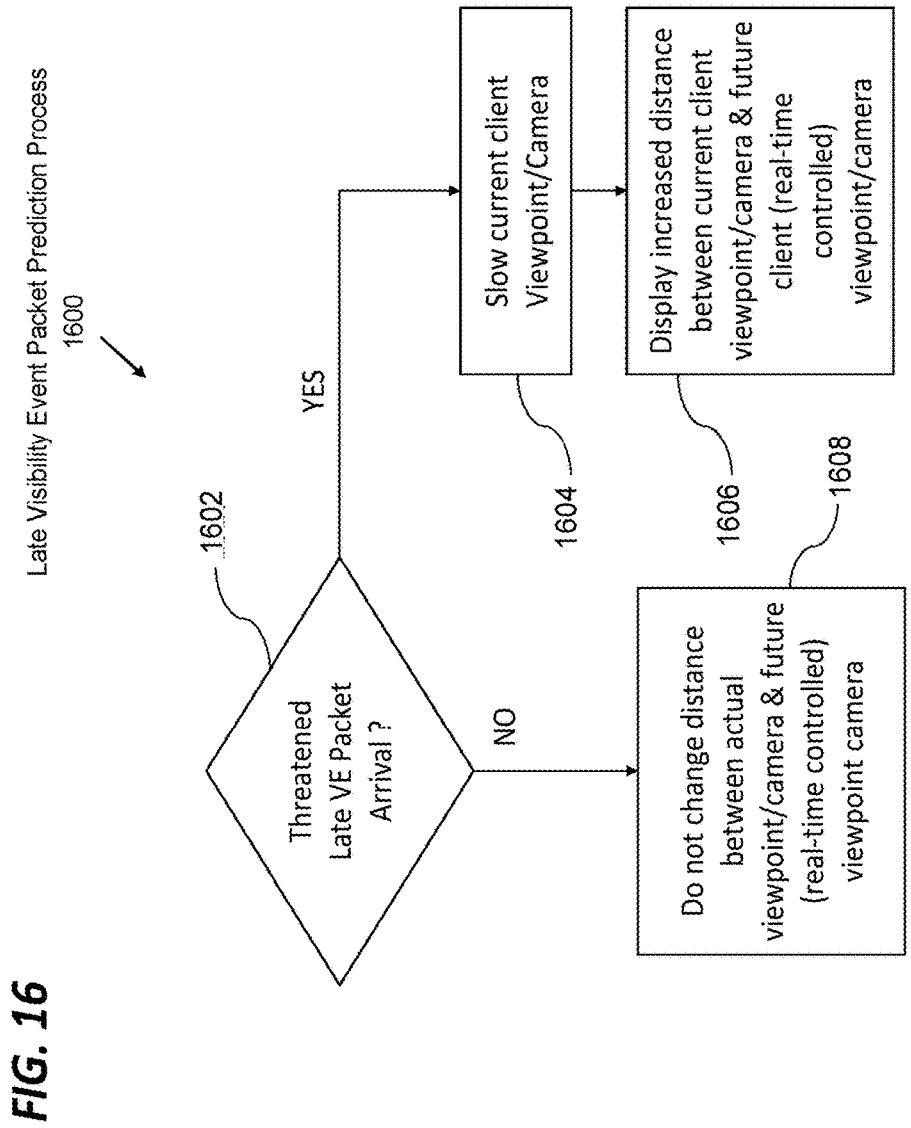
FIG. 16 is an algorithmic flowchart of a late visibility event packet prediction process, according to certain exemplary aspects.

FIG. 16 is an algorithmic flowchart of a late visibility event packet prediction process 1600, according to certain exemplary aspects. FIG. 16 describes a method of controlling the progress of the current viewpoint under conditions in which late visibility event packet arrival from the server 106 to the client device 108 is predicted. The probability of late packet arrival during visibility event streaming increases when the client device 108 is receiving inputs via the input device 104 indicating navigation in regions of the modeled environment in which a high visibility gradient is present. In exemplary aspects, the local visibility gradient is a function of the rate at which surfaces become unoccluded when moving from viewcell to viewcell in the local region.

At step 1602, a determination is made of whether late packet arrival is threatened at the client device. If the probability of a late visibility event packet arrival at the client device exceeds a predetermined value, resulting in a "yes" at step 1602, the late visibility event packet prediction process 1600 proceeds to step 1604. Otherwise, if the probability of a late visibility event packet arrival does not exceed the predetermined value, resulting in a "no" at step 1602, the late visibility event packet prediction process 1600 proceeds to step 1608.

At step 1604, the current viewpoint is slowed during periods of possible late visibility event packet arrival at the client.

At step 1606, an increased distance is displayed between the current viewpoint and the future viewpoint at the client device 108 via the circuitry of the server 106.

At step 1608, the current viewpoint is not slowed at the client device 108 via the circuitry of the server 106.

In certain aspects of the present disclosure, the speed of the future viewpoint is not reduced under these conditions, but remains under real-time control of the user. The preferential slowing of the current viewpoint will result in an increase in the physical separation between the current viewpoint (again, being used to determine the viewing parameters to generate the current image) and the future viewpoint (still under complete control of the user). This increased separation is an indication to the user to slow the future viewpoint to maintain a maximum separation between the current viewpoint and the future viewpoint. This voluntary slowing realizes a feedback loop that will decrease the bandwidth requirement for visibility event packet streaming and prevent late visibility event packet arrival, while preserving responsive real-time control of the future viewpoint by the user. In other aspects, it can be possible for the speed of the future viewpoint to be quickly slowed if late packet arrival is threatened.

Figure 17:
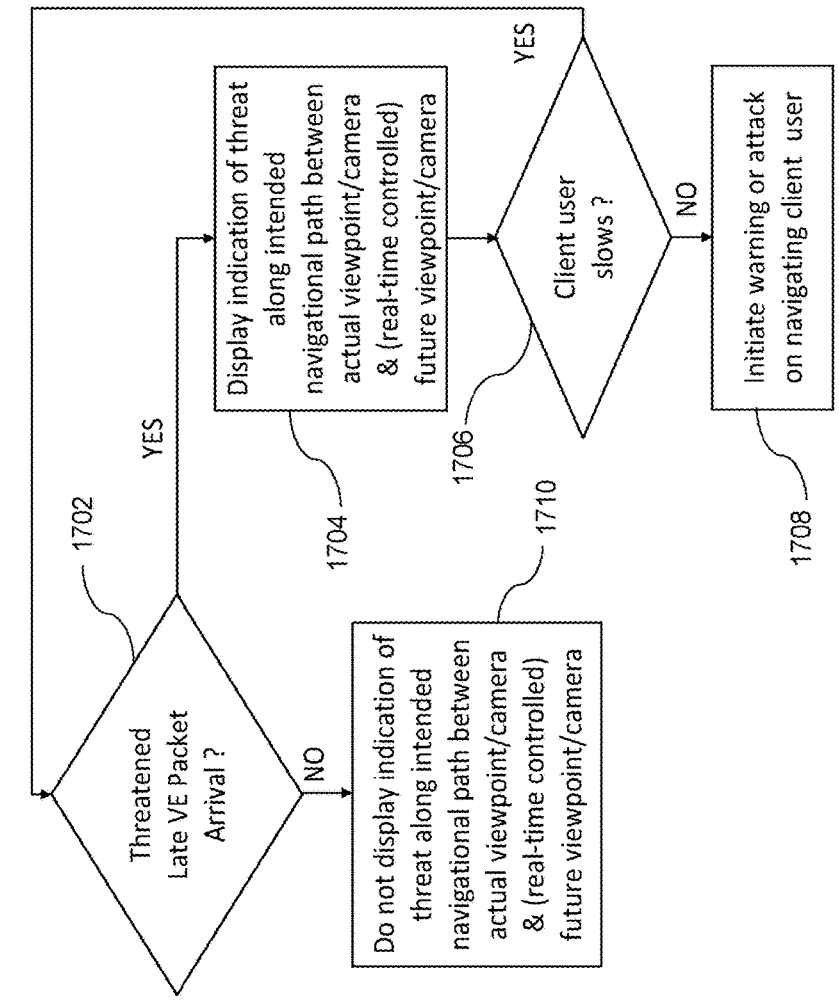
FIG. 17 is an algorithmic flowchart of a late visibility event packet prediction process, according to certain exemplary aspects.

FIG. 17 is an algorithmic flowchart of a late visibility event packet prediction process 1700, according to certain exemplary aspects. FIG. 17 is a process describing an alternate method of controlling the progress of the current viewpoint under conditions in which late visibility event packet arrival from the server 106 to the client device 108 is predicted. The probability of late packet arrival during visibility event streaming increases when the user is navigating in regions of the modeled environment having a high visibility gradient. In exemplary aspects, the local visibility gradient is a function of the rate at which surfaces become unoccluded when moving from viewcell to viewcell in the local region.

At step 1702, a determination is made of whether late packet arrival is threatened at the client device. If the probability of a late visibility event packet arrival at the client device exceeds a predetermined value, resulting in a "yes" at step 1702, the late visibility event packet prediction process 1700 proceeds to step 1704. Otherwise, if the probability of a late visibility event packet arrival does not exceed the predetermined value, resulting in a "no" at step 1702, the late visibility event packet prediction process 1700 proceeds to step 1710.

At step 1704, an indication of threat is displayed along the intended navigational path. In certain exemplary aspects, the intended navigational path is displayed as the space curve representing the pursuit path trajectory between the future viewpoint (under real-time control of the user) and the current viewpoint (which is specified by an earlier future viewpoint but under an imposed delay). The portion of the pursuit path is displayed as a space curve connecting the future viewpoint/and the current viewpoint in a heads-up display on-screen, but with a warning color indicating the portion of the pursuit path on which there is increased threat.

At step 1706, a determination is made of whether the user has slowed the future viewpoint sufficiently to prevent late packet arrival via the input device 104 in communication with the client device 108. If the user is determined to not have sufficiently slowed the future viewpoint and therefore allow late packet arrival to occur, resulting in a "no" at step 1706, the late visibility event packet prediction process proceeds to step 1708. Otherwise, if the user is determined to have sufficiently slowed the future viewpoint, to prevent late packet arrival, resulting in a "yes" at step 1706, the late visibility event packet prediction process proceeds to step 1702.

At step 1708, the circuitry of the server 106 is configured to transmit a warning or attack to the client device 108. In certain aspects of the present disclosure, the warning or attack slows the user at the client device 108 and prevents late packet arrival.

At step 1710, the circuitry of the server 106 is configured to transmit an indication of increased threat to the user via the client device 108.

Referring to FIG. 17, in an adventure, first-person shooter, stealth, or tactical shooter game, or other interactive entertainment, the late visibility event packet prediction process 1700 exploits a natural congruence between the local visibility event gradient (rate at which surfaces become unoccluded with viewpoint motion) and the threat gradient (the rate at which a user becomes exposed to enemy positions from which it was previously occluded). Consequently, the late visibility event packet prediction process 1700 allows implementation of the pursuit path camera model in a way that is consistent with the game mechanic of a stealth game or shooter game, and its use as a method to prevent late packet arrival can be transparent to the user.

Figure 18:
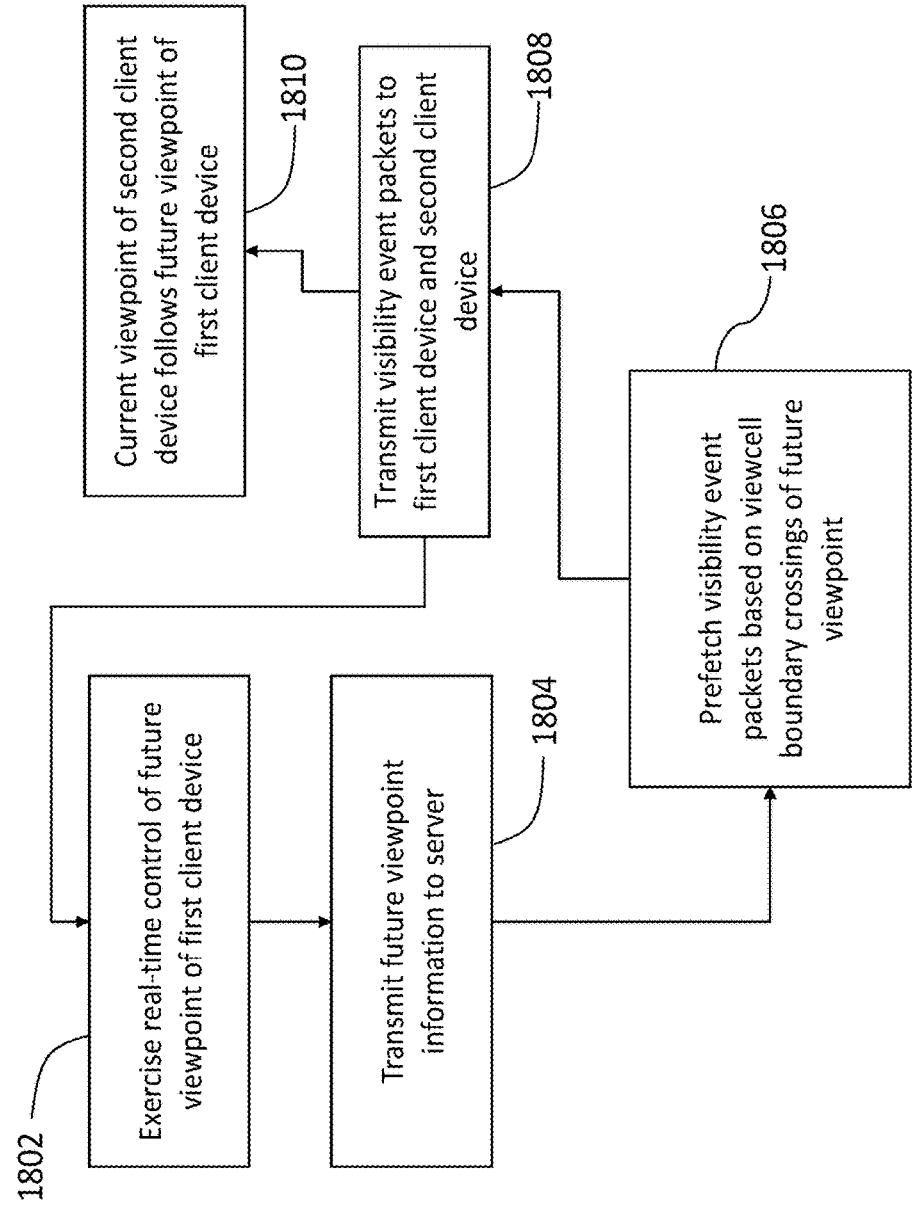
FIG. 18 is an algorithmic flowchart of a pursuit path camera model coop mode process, according to certain exemplary aspects.

FIG. 18 is an algorithmic flowchart of a pursuit path camera model coop mode process 1800, according to certain exemplary aspects. FIG. 18 describes a process in which a first user of a first client device and a second user of a second client device participate in the same game or simulation. In some aspects, the first user controls the first client device via a first input device and the second user controls the second client device via a second input device. At step 1802, the user of the primary client device exercises real-time control of the future viewpoint. The real-time control of the future viewpoint can include commands such as braking, coasting, acceleration and the like.

At step 1804, the viewpoint location and view direction vector orientation of the future viewpoint is transmitted from the first client device to the server 106.

At step 1806, the circuitry of the server 106 can be configured to prefetch visibility event packets corresponding to the viewcell boundaries crossed by the future viewpoint of the first client device. In some aspects, the server 106 prefetches the visibility event packets to the first client device, the second client device, or both.

At step 1808, visibility event packets including a representation of the future viewpoint are transmitted from the circuitry of the server 106 to the first client device and the second client device. The representation of the future viewpoint can be configured to assist the second user of the second client device in following the future viewpoint as it is controlled at the first client device. In certain aspects, the future viewpoint is directly controlled by the first user of the first client device.

At step 1810, the current viewpoint follows the future viewpoint that is controlled by the first user of the first client device. As such, the second user of the second client device can passively spectate the future viewpoint as it is controlled by the first user of the first client device. In other aspects, the second user of the second client device can actively control an avatar within view of the current viewpoint.

Figure 19:
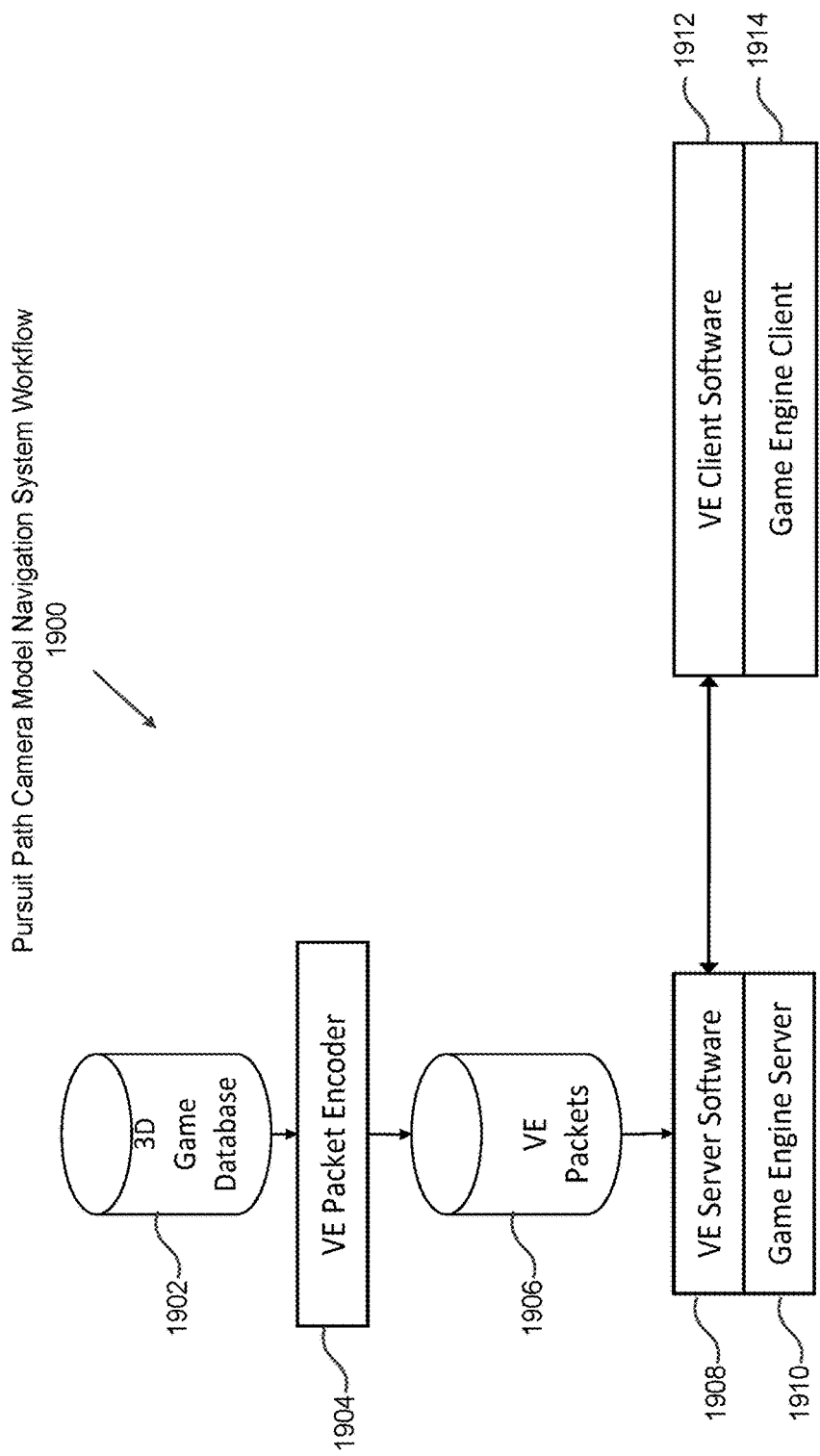
FIG. 19 is a block diagram of a pursuit path camera model navigation system workflow, according to certain exemplary aspects.

FIG. 19 is a diagram of a pursuit path camera model navigation system workflow 1900, according to certain exemplary aspects. FIG. 19 describes a high-level architectural block diagram of the pursuit path camera model navigation system. The pursuit path camera model navigation system can accommodate third-person camera models as well as modified first-person camera models. The pursuit path camera model navigation system 100 can be used for games and simulations in both entertainment and serious visualization applications. In certain aspects of the present disclosure, the server 106 of the pursuit path camera model navigation system 100 can include circuitry that is configured to process and transmit game surfaces, content and the like of a 3D game database 1902 to client devices 108.

The circuitry can be configured to deliver the game surfaces and the content of the 3D game database 1902 via a visibility event data stream employing visibility event packets 1906 that are encoded using first-order visibility propagation via a visibility event packet encoder 1904. The circuitry of the server 106 can further be configured to run a visibility event server software 1908 in which the visibility event packets 1906 are processed in a game engine 1910 of the server 106. The processed visibility event packets 1906 of the server 106 can be transmitted to a client device 108 in which a visibility event client software 1912 renders the processed visibility event packets 1906 in a game engine 1914 of the client device 108. In certain aspects of the present disclosure, the transfer of visibility event data can include the transmission of viewpoint location and speed from the client device 108 to the server 106.

In certain aspects, the pursuit path camera model can be utilized in a tactical game or simulation, in which the team leader or other team member of the game or simulation indicates navigational intent to the system by controlling the future viewpoint. Alternatively, or in addition, the intended navigational path may be expressed and/or displayed on a 2D map of the area. In some aspects of the pursuit path camera model in a game or simulation, human or robotic agents, vehicles, or aircraft are dispatched to provide cover along the intended route expressed by the pursuit path. In other aspects of a game or simulation using the pursuit path camera model, the dispatched units scout positions from which the simulated human avatar or simulated vehicle, located at the viewpoint, will become vulnerable to enemy detection and/or attack along the intended navigational path. For example, a human avatar or simulated vehicle may become vulnerable to a ranged kinetic attack. In some aspects, the first person viewpoint of a game or simulation using the pursuit path camera model may be slowed to prevent the human avatar or simulated vehicle from entering a portion of the intended navigational path that has not yet been covered by the dispatched human or robotic units. Alternatively, the velocity of the pursuit path future viewpoint can be slowed.

The pursuit path camera model enables a location of a current viewpoint to be modified in an environment. The pursuit path camera model includes a future viewpoint that is set at a predetermined quantity of time ahead of the current viewpoint. The location of the future viewpoint can be modified via commands received by the circuitry of the server 106. In certain aspects, a current viewpoint is configured to follow the future viewpoint. As such, the current viewpoint can be configured to change location as a result of a change in location of the future viewpoint. The pursuit path camera model can significantly increase the predictability of navigation through the pre-signaling of navigational intent to the server 106 via the future viewpoint control.

Figure 20:
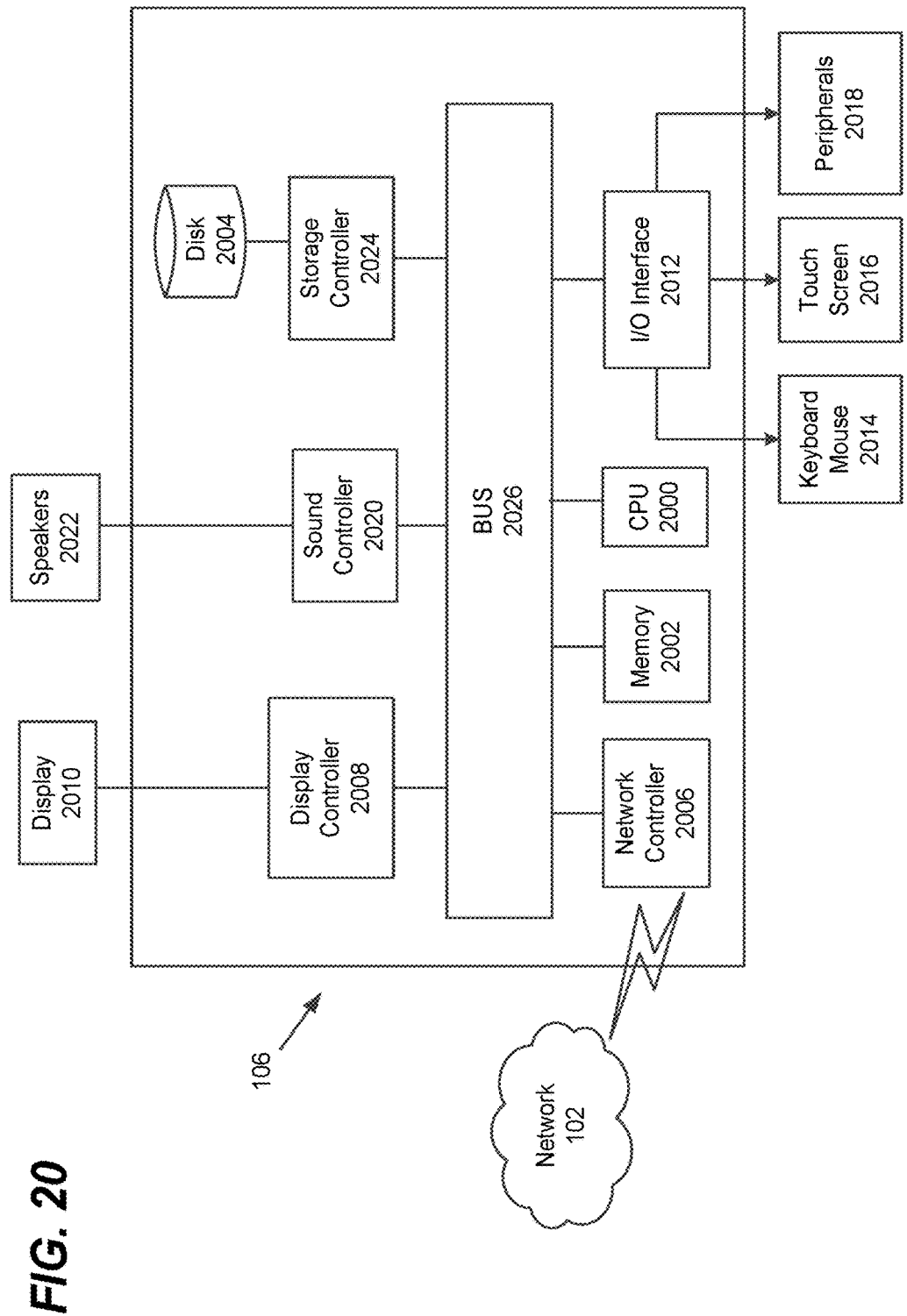
FIG. 20 is a hardware block diagram of a server, according to certain exemplary aspects.

FIG. 20 is a hardware block diagram of a server, according to certain exemplary aspects. In FIG. 20, the server 106 includes a CPU 2000, which performs the processes described above/below. The process data and instructions may be stored in memory 2002. These processes and instructions may also be stored on a storage medium disk 2004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk, or any other information processing device with which the server 106 communicates, such as a server or computer.

Further, the claimed advancements may be provided as a utility application, background daemon, or component of an operating system, or combination thereof, executing in conjunction with CPU 2000 and an operating system such as MICROSOFT WINDOWS, UNIX, SOLARIS, LINUX, APPLE MAC-OS, and other systems known to those skilled in the art.

The hardware elements in order to achieve the server 106 may be realized by various circuitry elements, known to those skilled in the art. For example, CPU 2000 may be a XENON or CORE processor from Intel of America or an OPTERON processor from AMD of America, or may be other processor types that would be recognized by one of ordinary skill in the art. Alternatively, the CPU 2000 may be implemented on an FPGA, ASIC, PLD or using discrete logic circuits, as one of ordinary skill in the art would recognize. Further, CPU 2000 may be implemented as multiple processors cooperatively working in parallel to perform the instructions of the inventive processes described above.

The server 106 in FIG. 20 also includes a network controller 2006, such as an Intel Ethernet PRO network interface card from Intel Corporation of America, for interfacing with a network 102. As can be appreciated, the network 102 can be a public network, such as the Internet, or a private network such as an LAN or WAN network, or any combination thereof and can also include PSTN or ISDN sub-networks. The network 102 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The server 106 further includes a display controller 2008, such as a NVIDIA GeForce GTX or Quadro graphics adaptor from NVIDIA Corporation of America for interfacing with display 2010, such as a Hewlett Packard HPL2445w LCD monitor. A general purpose I/O interface 2012 interfaces with a keyboard and/or mouse 2014 as well as a touch screen panel 2016 on or separate from display 2010. General purpose I/O interface also connects to a variety of peripherals 2018 including printers and scanners, such as an OfficeJet or DeskJet from Hewlett Packard.

A sound controller 2020 is also provided in the server 106, such as Sound Blaster X-Fi Titanium from Creative, to interface with speakers/microphone 2022 thereby providing sounds and/or music.

The general purpose storage controller 2024 connects the storage medium disk 2004 with communication bus 2026, which may be an ISA, EISA, VESA, PCI, or similar, for interconnecting all of the components of the server 106. A description of the general features and functionality of the display 2010, keyboard and/or mouse 2014, as well as the display controller 2008, storage controller 2024, network controller 2006, sound controller 2020, and general purpose I/O interface 2012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 21.

Figure 21:
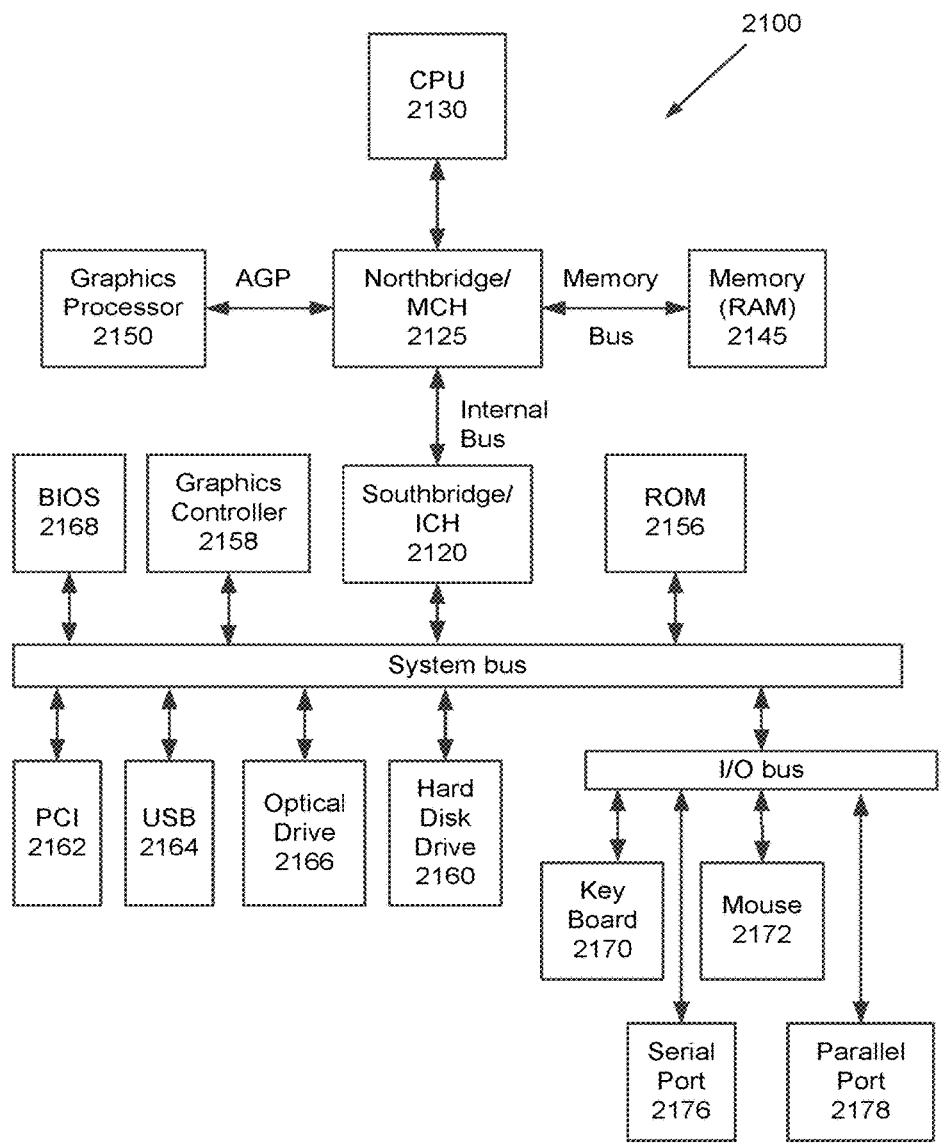
FIG. 21 is a hardware block diagram of a data processing system, according to certain exemplary aspects.

FIG. 21 is a hardware block diagram of a data processing system 2100, according to certain exemplary aspects. FIG. 21 shows a schematic diagram of a data processing system 2100, for performing pursuit path camera model navigation. The data processing system 2100 is an example of a computer in which code or instructions implementing the processes of the illustrative aspects may be located.

In FIG. 21, data processing system 2100 employs a hub architecture including a north bridge and memory controller hub (NB/MCH) 2125 and a south bridge and input/output (I/O) controller hub (SB/ICH) 2120. The central processing unit (CPU) 2130 is connected to NB/MCH 2125. The NB/MCH 2125 also connects to the memory 2145 via a memory bus, and connects to the graphics processor 2150 via an accelerated graphics port (AGP). The NB/MCH 2125 also connects to the SB/ICH 2120 via an internal bus (e.g., a unified media interface or a direct media interface). The CPU Processing unit 2130 may contain one or more processors and even may be implemented using one or more heterogeneous processor systems.

Figure 22:
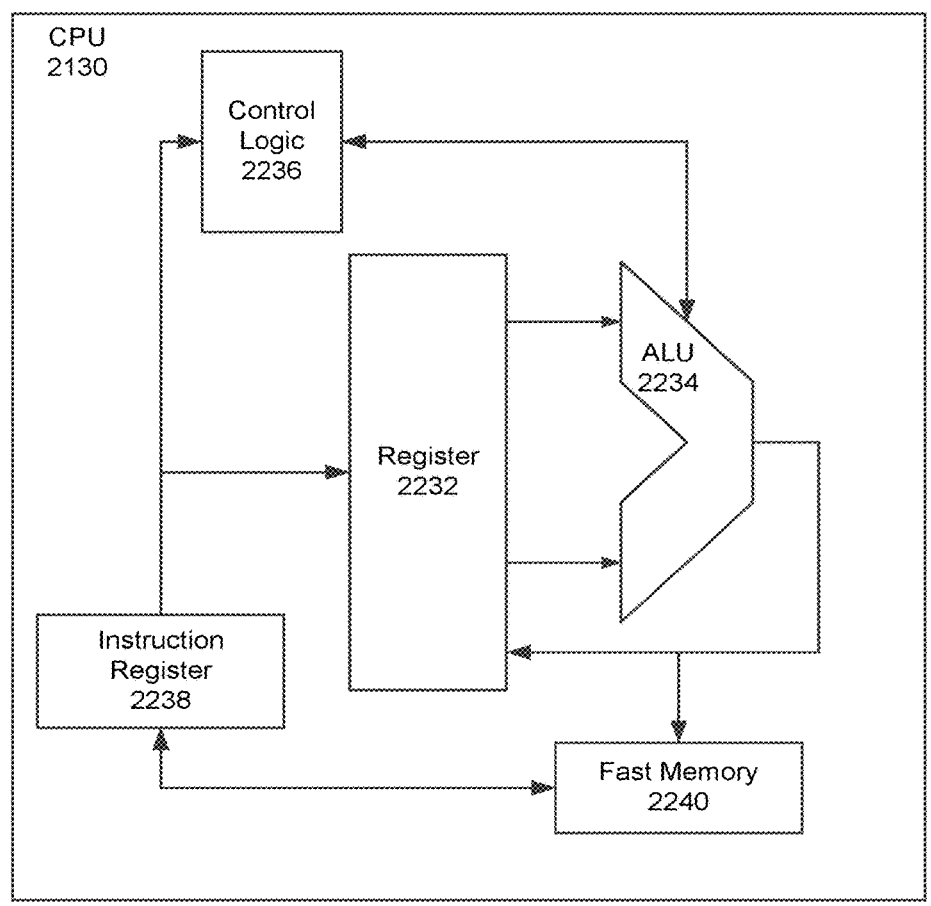
FIG. 22 is a hardware block diagram of a CPU, according to certain exemplary aspects.

FIG. 22 is a hardware block diagram of a CPU, according to certain exemplary aspects. FIG. 22 shows one implementation of CPU 2130. In one implementation, the instruction register 2238 retrieves instructions from the fast memory 2240. At least part of these instructions are fetched from the instruction register 2238 by the control logic 2236 and interpreted according to the instruction set architecture of the CPU 2130. Part of the instructions can also be directed to the register 2232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 2234 that loads values from the register 2232 and performs logical and mathematical operations on the loaded values according to the instructions. The results from these operations can be feedback into the register and/or stored in the fast memory 2240. According to certain implementations, the instruction set architecture of the CPU 2130 can use a reduced instruction set architecture, a complex instruction set architecture, a vector processor architecture, a very large instruction word architecture. Furthermore, the CPU 2130 can be based on the Von Neuman model or the Harvard model. The CPU 2130 can be a digital signal processor, an FPGA, an ASIC, a PLA, a PLD, or a CPLD. Further, the CPU 2130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 21, the data processing system 2100 can include that the SB/ICH 2120 is coupled through a system bus to an I/O Bus, a read only memory (ROM) 2156, universal serial bus (USB) port 2164, a flash binary input/output system (BIOS) 2168, and a graphics controller 2158. PCI/PCIe devices can also be coupled to SB/ICH 2120 through a PCI bus 2162.

The PCI devices may include, for example, Ethernet adapters, add-in cards, and PC cards for notebook computers. The Hard disk drive 2160 and CD-ROM 2166 can use, for example, an integrated drive electronics (IDE) or serial advanced technology attachment (SATA) interface. In one implementation the I/O bus can include a super I/O (SIO) device.

Further, the hard disk drive (HDD) 2160 and optical drive 2166 can also be coupled to the SB/ICH 2120 through a system bus. In one implementation, a keyboard 2170, a mouse 2172, a parallel port 2178, and a serial port 2176 can be connected to the system bust through the I/O bus. Other peripherals and devices that can be connected to the SB/ICH 2120 using a mass storage controller such as SATA or PATA, an Ethernet port, an ISA bus, a LPC bridge, SMBus, a DMA controller, and an Audio Codec.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits executing program code and/or computer instructions to execute the functions, processes and algorithms described herein. Additionally, an implementation may be performed on modules or hardware not identical to those described. Accordingly, other implementations are within the scope that may be claimed.

The above disclosure also encompasses the aspects listed below.

(1) A method of pursuit path camera model navigation, including: providing, via processing circuitry of at least one server, at least one future viewpoint located at a first location and at least one current viewpoint located at a second location; calculating, via the circuitry, a first prefetch region including one or more viewcells and one or more visibility event packets corresponding to the one or more viewcells, the first prefetch region corresponding to the first location of the at least one future viewpoint and the second location of the at least one current viewpoint; receiving, via the circuitry, one or more commands to modify the first location of the at least one future viewpoint to a third location at a first velocity; calculating, via the circuitry, navigational intent of the at least one future viewpoint based on the one or more commands; and calculating, via the circuitry, a second prefetch region including the one or more viewcells and the one or more visibility event packets by collapsing the calculated first prefetch region into the second prefetch region, the second prefetch region corresponding to a predicted pursuit path based on the calculated navigational intent.

(2) The method of (1), wherein the second location of the at least one current viewpoint follows the first location of the at least one future viewpoint at a second velocity.

(3) The method of either (1) or (2), wherein the one or more commands provide local control of the at least one future viewpoint.

(4) The method of any one of (1) to (3), wherein the first prefetch region includes at least one of an area and a volume based on the first location of the at least one future viewpoint and the second location of the at least one current viewpoint.

(5) The method of any one of (1) to (4), wherein the one or more commands are detected via an input device in communication with the at least one server, the input device including at least one of a joystick, an eye tracker and a gesture recognition device.

(6) The method of any one of (1) to (5), wherein the one or more commands include at least one of turning, braking, coasting and acceleration.

(7) The method of any one of (1) to (6), wherein the braking includes an immediate deceleration of the at least one future to reduce the first velocity.

(8) The method of any one of (1) to (7), wherein the coasting includes maintaining the second velocity moving the at least one current viewpoint towards the third location of the at least one future viewpoint.

(9) The method of any one of (1) to (8), wherein the acceleration includes an acceleration of the at least one future viewpoint to increase the first velocity.

(10) A non-transitory computer-readable storage medium, having stored thereon, instruction that when executed by a computing device, cause the computing device to perform a method of pursuit path camera model navigation including: providing, via processing circuitry of at least one server, at least one future viewpoint located at a first location and at least one current viewpoint located at a second location; calculating, via the circuitry, a first prefetch region including one or more viewcells and one or more visibility event packets corresponding to the one or more viewcells, the first prefetch region corresponding to the first location of the at least one future viewpoint and the second location of the at least one current viewpoint; receiving, via the circuitry, one or more commands to modify the first location of the future viewpoint to a third location at a first velocity; calculating, via the circuitry, a navigational intent of the at least one future viewpoint based on the one or more commands; and calculating, via the circuitry, a second prefetch region including the one or more viewcells and the one or more visibility event packets by collapsing the calculated first prefetch region into the second prefetch region, the second prefetch region corresponding to a predicted pursuit path based on the navigational intent.

(11) The non-transitory computer-readable storage medium of (10), wherein the second location of the at least one current viewpoint follows the first location of the at least one future viewpoint at a second velocity.

(12) The non-transitory computer-readable storage medium of either (10) or (11), wherein the one or more commands provide local control of the at least one future viewpoint.

(13) The non-transitory computer-readable storage medium of any one of (10) to (12), wherein the first prefetch region includes at least one of an area and a volume based on the first location of the at least one future viewpoint and the second location of the at least one current viewpoint.

(14) The non-transitory computer-readable storage medium of any one of (10) to (13), wherein the one or more commands are detected via an input device in communication with the at least one server, the input device including at least one of a joystick, an eye tracker and a gesture recognition device.

(15) The non-transitory computer-readable storage medium of any one of (10) to (14), wherein the one or more commands include at least one of turning, braking, coasting and acceleration.

(16) The non-transitory computer-readable storage medium of any one of (10) to (15), wherein the braking includes an immediate deceleration of the at least one future viewpoint to reduce the first velocity.

(17) The non-transitory computer-readable storage medium of any one of (10) to (16), wherein the coasting includes maintain the second velocity moving the at least one current viewpoint towards the third location of the at least one future viewpoint.

(18) The non-transitory computer-readable storage medium of any one of (10) to (17), wherein the acceleration includes an immediate acceleration of the at least one future viewpoint to increase the first velocity.

(19) A pursuit path camera model navigation system, including: an input device in communication with at least one server and including at least one of a joystick, an eye tracker and a gesture recognition device; the at least one server including processing circuitry configured to: provide at least one future viewpoint located at a first location and at least one current viewpoint located at a second location, calculate a first prefetch region including one or more viewcells and one or more visibility event packets corresponding to the one or more viewcells, the first prefetch region corresponding to the first location of the at least one future viewpoint and the second location of the at least one current viewpoint, receive one or more commands to modify the first location of the at least one future viewpoint to a third location at a first velocity via the input device, calculate a navigational intent of the at least one future viewpoint based on the one or more commands, and calculate a second prefetch region including the one or more viewcells and the one or more visibility event packets by collapsing the calculated first prefetch region into the second prefetch region, the second prefetch region corresponding to a predicted pursuit path based on the calculated navigational intent; and at least one client device in communication with the at least one server and at least one graphical display.

(20) The system of (19), wherein the first prefetch region includes at least one of an area and a volume based on the first location of the at least one future viewpoint and the second location of the at least one current viewpoint.

(21) A method, conducted on a client device, of receiving at least one future visibility event packet from a server, the at least one future visibility event packet including renderable graphics information occluded from a first viewcell visited by a future viewpoint and not occluded from a second viewcell visited by the future viewpoint, including: calculating, via circuitry of the client device, the future viewpoint from a viewpoint and view direction determined by a current viewpoint; transmitting, via the circuitry of the client device, information representing the position of the future viewpoint from the client device to the server; receiving, via circuitry of the server, the at least one future visibility event packet; and transforming, via the circuitry of the server, the current viewpoint to follow, after a predetermined delay period, a path of the future viewpoint.

(22) The method of (21), further comprising decreasing the delay period when a translational velocity of the future viewpoint falls below a predetermined threshold.

(23) The method of either (21) or (22), further comprising increasing the delay period when the at least one future visibility event packet is predicted to arrive after the renderable graphics information should become unoccluded.

(24) The method of any one of (21) to (23), further comprising displaying an indication of a threat at the client device when the at least one future visibility event packet is predicted to arrive after the renderable graphics information should become unoccluded.

(25) The method of any one of (21) to (24), wherein the indication includes an indication of a threat along a portion of a space curve between the future viewpoint and the current viewpoint.

(26) The method of any one of (21) to (25), further comprising: displaying a warning of a threat at the client device when the at least one future visibility event packet is predicted to arrive after the renderable graphics should become unoccluded, and calculating a simulated attack including at least one of slowing and stopping of the future viewpoint when the user does not directly slow the future viewpoint in response to the warning.

(27) A method, conducted on a server, of prefetching at least one future visibility event packet to a client device, the at least one future visibility event packet including renderable graphics information occluded from a first viewcell visited by a future viewpoint and not occluded from a second viewcell visited by the future viewpoint, including: transmitting, via circuitry of the client device, the renderable graphics information representing the position of the future viewpoint from the client device to the server; and transmitting, via circuitry of the server, the at least one future visibility event packet from the server to the client device.

(28) A method, conducted on a first client device, of receiving at least one future visibility event packet from a server, the at least one future visibility event packet including renderable graphics information occluded from a first viewcell visited by a future viewpoint and not occluded from a second viewcell visited by the future viewpoint, including: calculating, via circuitry of a first client device, the future viewpoint from a viewpoint and view direction determined by a current viewpoint; transmitting, via the circuitry of the first client device, information representing the position of the future viewpoint from the first client device to the server; transmitting, via circuitry of the server, at least one visibility event packet comprising renderable graphics information from the server to a second client device; and transforming, via the circuitry of the first client device and circuitry of the second client device, the current viewpoint position to follow a path of the future viewpoint after a predetermined delay period.

(29) A method, conducted on a client device, of receiving at least one future visibility event packet from a server, the at least one future visibility event packet including renderable graphics information occluded from a first viewcell visited by a future viewpoint and not occluded from a second viewcell visited by a future viewpoint, including: calculating, via circuitry of the client device, the future viewpoint from a viewpoint and view direction determined by a current viewpoint; displaying, via the circuitry of the client device, a representation of the future viewpoint at the client device; transmitting, via the circuitry of the client device, information representing the position of the future viewpoint from the client device to the server; transforming, via circuitry of the server, the current viewpoint position to follow a path of the future viewpoint after a specified delay period; halting, via the circuitry of the client device, the current viewpoint to a fixed position when a user inputs a braking command at the client device; and transforming, via the circuitry of the client device, the future viewpoint to the fixed position of the current viewpoint in response to the braking command.

(30) A method, conducted on a client device, of receiving at least one partial future visibility event packet from a server, the at least one partial future visibility event packet including a subset of a complete future visibility event packet, the complete future visibility event packet including renderable graphics information occluded from a first viewcell visited by a future viewpoint and not occluded from a second viewcell visited by the future viewpoint, including: calculating, via circuitry of the client device, the future viewpoint from a viewpoint and view direction determined by a current viewpoint; transmitting, via the circuitry of the client device, information representing an orientation of the future viewpoint from the client device to the server; and transmitting, via circuitry of the server, the at least one partial future visibility event packet that intersects a maximal view frustum from the server to the client device, wherein the maximal view frustum includes a volume of space intersected by the maximal view frustum of the future viewpoint during movement of the future viewpoint in the second viewcell.

(31) A method, conducted on a server, of prefetching at least one partial future visibility event packet to a client device, the at least one partial future visibility event packet including a subset of a complete future visibility event packet, the complete future visibility event packet including renderable graphics information occluded from a first viewcell visited by a future viewpoint and not occluded from a second viewcell visited by a future viewpoint, including: transmitting, via circuitry of the client device, information representing the orientation of the future viewpoint from the client device to the server; and transmitting, via circuitry of the server, the at least one partial future visibility event packet that intersects a maximal view frustum from the server to the client device, wherein the maximal view frustum includes a volume of space intersected by the maximal view frustum of the future viewpoint during movement of the future viewpoint in the second viewcell.

The invention claimed is:

1. A method of pursuit path camera model navigation, comprising:

providing, via processing circuitry of at least one server, at least one future viewpoint located at a first location and at least one current viewpoint located at a second location;

calculating, via the circuitry, a first prefetch region including one or more viewcells and one or more visibility event packets corresponding to the one or more viewcells, the first prefetch region corresponding to the first location of the at least one future viewpoint and the second location of the at least one current viewpoint;

receiving, via the circuitry, one or more commands to modify the first location of the at least one future viewpoint to a third location at a first velocity;

calculating, via the circuitry, a navigational intent of the at least one future viewpoint based on the one or more commands;

calculating, via the circuitry, a second prefetch region including the one or more viewcells and the one or more visibility event packets by collapsing the calculated first prefetch region into the second prefetch region, the second prefetch region corresponding to a predicted pursuit path after a predetermined delay period based on the calculated navigational intent; and decreasing the predetermined delay period when a translational velocity of the at least one future viewpoint falls below a predetermined threshold.

2. The method of claim 1, wherein the second location of the at least one current viewpoint follows the first location of the at least one future viewpoint at a second velocity.

3. The method of claim 2, wherein the one or more commands include at least one of turning, braking, coasting, and acceleration.

4. The method of claim 3, wherein the braking includes an immediate deceleration of the at least one future viewpoint to reduce the first velocity.

5. The method of claim 3, wherein the coasting includes maintaining the second velocity moving the at least one current viewpoint towards the third location of the at least one future viewpoint.

6. The method of claim 3, wherein the acceleration includes an immediate acceleration of the at least one future viewpoint to increase the first velocity.

7. The method of claim 1, wherein the one or more commands provide local control of the at least one future viewpoint.

8. The method of claim 1, wherein the first prefetch region includes at least one of an area and a volume based on the first location of the at least one future viewpoint and the second location of the at least one current viewpoint.

9. The method of claim 1, wherein the one or more commands are detected via an input device in communication with the at least one server, the input device including at least one of a joystick, an eye tracker, and a gesture recognition device.

10. A non-transitory computer-readable storage medium, having stored thereon instructions that when executed by a computing device, cause the computing device to perform a method of pursuit path camera model navigation, comprising:

providing, via processing circuitry of at least one server, at least one future viewpoint located at a first location and at least one current viewpoint located at a second location;

calculating, via the circuitry, a first prefetch region including one or more viewcells and one or more visibility event packets corresponding to the one or more viewcells, the first prefetch region corresponding to the first location of the at least one future viewpoint and the second location of the at least one current viewpoint;

receiving, via the circuitry, one or more commands to modify the first location of the future viewpoint to a third location at a first velocity;

calculating, via the circuitry, a navigational intent of the at least one future viewpoint based on the one or more commands; and calculating, via the circuitry, a second prefetch region including the one or more viewcells and the one or more visibility event packets by collapsing the calculated first prefetch region into the second prefetch region, the second prefetch region corresponding to a predicted pursuit path after a predetermined delay period based on the navigational intent; and decreasing the predetermined delay period when a translational velocity of the at least one future viewpoint falls below a predetermined threshold.

11. The non-transitory computer-readable storage medium of claim 10, wherein the second location of the at least one current viewpoint follows the first location of the at least one future viewpoint at a second velocity.

12. The non-transitory computer-readable storage medium of claim 11, wherein the one or more commands include at least one of turning, braking, coasting, and acceleration.

13. The non-transitory computer-readable storage medium of claim 12, wherein the braking includes an immediate deceleration of the at least one future viewpoint to reduce the first velocity.

14. The on-transitory computer-readable storage medium of claim 12, wherein the coasting includes maintaining the second velocity moving the at least one current viewpoint towards the third location of the at least one future viewpoint.

15. The non-transitory computer-readable storage medium of claim 12, wherein the acceleration includes an immediate acceleration of the at least one future viewpoint to increase the first velocity.

16. The non-transitory computer-readable storage medium of claim 10, wherein the one or more commands provide local control of the at least one future viewpoint.

17. The non-transitory computer-readable storage medium of claim 10, wherein the first prefetch region includes at least one of an area and a volume based on the first location of the at least one future viewpoint and the second location of the at least one current viewpoint.

18. The non-transitory computer-readable storage medium of claim 10, wherein the one or more commands are detected via an input device in communication with the at least server, the input device including at least one of a joystick, an eye tracker, and a gesture recognition device.

19. A pursuit path camera model navigation system, comprising:

an input device in communication with at least one server and including at least one of a joystick, an eye tracker, and a gesture recognition device;

the at least one server including processing circuitry configured to:
provide at least one future viewpoint located at a first location and at least one current viewpoint located at a second location, calculate a first prefetch region including one or more viewcells and one or more visibility event packets corresponding to the one or more viewcells, the first prefetch region corresponding to the first location of the at least one future viewpoint and the second location of the at least one current viewpoint, receive one or more commands to modify the first location of the at least one future viewpoint to a third location at a first velocity via the input device, calculate a navigational intent of the at least one future viewpoint based on the one or more commands, and calculate a second prefetch region including the one or more viewcells and the one or more visibility event packets by collapsing the calculated first prefetch region into the second prefetch region, the second prefetch region corresponding to a predicted pursuit path after a predetermined delay period based on the calculated navigational intent, and decreasing the predetermined delay period when a translational velocity of the at least one future viewpoint falls below a predetermined threshold; and at least one client device in communication with the at least one server and at least one graphical display.

20. The system of claim 19, wherein the first prefetch region includes at least one of an area and a volume based on the first location of the at least one future viewpoint and the second location of the at least one current viewpoint.

21. A method, conducted on a client device, of receiving at least one future visibility event packet from a server, the at least one future visibility event packet including renderable graphics information occluded from a first viewcell visited by a future viewpoint and not occluded from a second viewcell visited by the future viewpoint, comprising:

calculating, via circuitry of the client device, the future viewpoint from a viewpoint and view direction determined by a current viewpoint;

transmitting, via the circuitry of the client device, information representing a position of the future viewpoint from the client device to the server;

receiving, via circuitry of the client device, the at least one future visibility event packet;

transforming, via the circuitry of the server, the current viewpoint to follow, after a predetermined delay period, a path of the future viewpoint; and decreasing the delay period when a translational velocity of the future viewpoint falls below a predetermined threshold.

22. The method of claim 21, further comprising increasing the delay period when the at least one future visibility event packet is predicted to arrive after the renderable graphics information should become unoccluded.

23. The method of claim 21, further comprising displaying an indication of a threat at the client device when the at least one future visibility event packet is predicted to arrive after the renderable graphics information should become unoccluded.

24. The method of claim 23, wherein the indication includes an indication of a threat along a portion of a space curve between the future viewpoint and the current viewpoint.

25. The method of claim 21, further comprising:
displaying a warning of a threat at the client device when the at least one future visibility event packet is predicted to arrive after the renderable graphics should become unoccluded, and
calculating a simulated attack including at least one of slowing and stopping of the future viewpoint when the user does not directly slow the future viewpoint in response to the warning.

26. A method, conducted on a server, of transmitting at least one future visibility event packet to a client device, the at least one future visibility event packet including renderable graphics information occluded from a first viewcell visited by a future viewpoint and not occluded from a second viewcell visited by the future viewpoint, comprising:

transmitting, via circuitry of the client device, renderable graphics information representing a position of the future viewpoint from a viewpoint and view direction determined by a current viewpoint, from the client device to the server; and then transmitting, via circuitry of the server, the at least one future visibility event packet, from the server to the client device, wherein the circuitry of the server transforms the current viewpoint to follow, after a predetermined delay period, a path of the future viewpoint; and decreasing the predetermined delay period when a translational velocity of the at least one future viewpoint falls below a predetermined threshold.

27. A method, conducted on a first client device, of receiving at least one future visibility event packet from a server, the at least one future visibility event packet including renderable graphics information occluded from a first viewcell visited by a future viewpoint and not occluded from a second viewcell visited by the future viewpoint, comprising:

calculating, via circuitry of a first client device, the future viewpoint from a viewpoint and view direction determined by a current viewpoint;

transmitting, via the circuitry of the first client device, information representing a position of the future viewpoint from the first client device to the server;

transmitting, via circuitry of the server, at least one visibility event packet comprising renderable graphics information from the server to a second client device;

transforming, via the circuitry of the first client device and circuitry of the second client device, the current viewpoint position to follow a path of the future viewpoint after a predetermined delay period; and decreasing the predetermined delay period when a translational velocity of the future viewpoint falls below a predetermined threshold.

28. A method, conducted on a client device, of receiving at least one future visibility event packet from a server, the at least one future visibility event packet including renderable graphics information occluded from a first viewcell visited by a future viewpoint and not occluded from a second viewcell visited by a future viewpoint, comprising:

calculating, via circuitry of the client device, the future viewpoint from a viewpoint and view direction determined by a current viewpoint;

displaying, via the circuitry of the client device, a representation of the future viewpoint at the client device;

transmitting, via the circuitry of the client device, information representing the position of the future viewpoint from the client device to the server;

transforming, via circuitry of the server, the current viewpoint position to follow a path of the future viewpoint after a specified delay period;

halting, via the circuitry of the client device, the current viewpoint to a fixed position when a user inputs a braking command at the client device;

transforming, via the circuitry of the client device, the future viewpoint to the fixed position of the current viewpoint in response to the braking command; and decreasing the specified delay period when a translational velocity of the future viewpoint falls below a predetermined threshold.

29. A method, conducted on a client device, of receiving at least one partial future visibility event packet from a server, the at least one partial future visibility event packet including a subset of a complete future visibility event packet, the complete future visibility event packet including renderable graphics information occluded from a first viewcell visited by a future viewpoint and not occluded from a second viewcell visited by the future viewpoint, comprising:

calculating, via circuitry of the client device, the future viewpoint from a viewpoint and view direction determined by a current viewpoint;

transmitting, via the circuitry of the client device, information representing an orientation of the future viewpoint from the client device to the server;

transmitting, via circuitry of the server, the at least one partial future visibility event packet that intersects ah maximal view frustum from the server to the client device, wherein the maximal view frustum includes a volume of space intersected by the maximal view frustum of the future viewpoint during movement of the future viewpoint in the second viewcell, wherein the circuitry of the server transforms the current viewpoint to follow, after a predetermined delay period, a path of the future viewpoint; and decreasing the predetermined delay period when a translational velocity of the future viewpoint falls below a predetermined threshold.

30. A method, conducted on a server, of prefetching at least one partial future visibility event packet to a client device, the at least one partial future visibility event packet including a subset of a complete future visibility event packet, the complete future visibility event packet including renderable graphics information occluded from a first viewcell visited by a future viewpoint and not occluded from a second viewcell visited by a future viewpoint, comprising:

transmitting, via circuitry of the client device, information representing the orientation of the future viewpoint based on a viewpoint and view direction determined by a current viewpoint, from the client device to the server;

transmitting, via circuitry of the server, the at least one partial future visibility event packet that intersects a maximal view frustum from the server to the client device, wherein the maximal view frustum includes a volume of space intersected by the maximal view frustum of the future viewpoint during movement of the future viewpoint in the second viewcell, wherein the circuitry of the server transforms the current viewpoint to follow, after a predetermined delay period, a path of the future viewpoint; and decreasing the predetermined delay period when a translational velocity of the future viewpoint falls below a predetermined threshold.

\* \* \* \* \*